United States Patent
Reedy et al.

(10) Patent No.: US 10,043,022 B2
(45) Date of Patent: Aug. 7, 2018

(54) SYSTEMS AND METHODS FOR DIGITAL CONTENT DELIVERY

(71) Applicant: R.R. Donnelley & Sons Company, Chicago, IL (US)

(72) Inventors: Timothy J. Reedy, Milton, GA (US); Douglas O. Smith, McDongh, GA (US); Lynne M. Andrews, Roselle, IL (US); Michael K. Logan, Chester Springs, PA (US); Steven A. Keca, Aurora, IL (US)

(73) Assignee: R.R. Donnelley & Sons Company, Chicago, IL (US)

( * ) Notice: Subject to any disclaimer, the term of this patent is extended or adjusted under 35 U.S.C. 154(b) by 0 days.

(21) Appl. No.: 13/786,087

(22) Filed: Mar. 5, 2013

(65) Prior Publication Data
US 2013/0254897 A1   Sep. 26, 2013

Related U.S. Application Data

(60) Provisional application No. 61/606,932, filed on Mar. 5, 2012.

(51) Int. Cl.
*G06F 21/62*   (2013.01)
*G06F 21/10*   (2013.01)

(52) U.S. Cl.
CPC .......... *G06F 21/6218* (2013.01); *G06F 21/10* (2013.01)

(58) Field of Classification Search
CPC ...................................................... G06F 21/10
See application file for complete search history.

(56) References Cited

U.S. PATENT DOCUMENTS

| | | | |
|---|---|---|---|
| 5,917,912 | A | 6/1999 | Ginter et al. |
| 6,052,735 | A | 4/2000 | Ulrich et al. |
| 6,327,599 | B1 | 12/2001 | Warmus et al. |
| 6,421,693 | B1 | 7/2002 | Nishiyama et al. |

(Continued)

FOREIGN PATENT DOCUMENTS

| | | |
|---|---|---|
| EP | 2063365 | 5/2009 |
| JP | 2003203162 | 7/2003 |

(Continued)

OTHER PUBLICATIONS

Patent Cooperation Treaty, "International Preliminary Report on Patentability," issued in connection with Patent Cooperation Treaty Application No. PCT/US2013/029161, dated Sep. 9, 2014, 6 pages.

(Continued)

*Primary Examiner* — Simon P Kanaan
(74) *Attorney, Agent, or Firm* — McCracken & Gillen LLC

(57) ABSTRACT

Methods, apparatus, systems and machine readable medium for the delivery of digital content are disclosed herein. An example method includes receiving a first document from a first document source, classifying the first document with a first tag based on a type of the document, classifying the first document with a second tag based on a first intended recipient, encrypting the first document, publishing the first document for receipt by the first intended recipient, verifying an identity of the first intended recipient and granting the first recipient access to the first document based on the verified identity.

26 Claims, 45 Drawing Sheets

(56) References Cited

U.S. PATENT DOCUMENTS

| | | | |
|---|---|---|---|
| 6,763,370 B1 | 7/2004 | Schmeidler et al. | |
| 6,769,014 B1 | 7/2004 | Chang et al. | |
| 6,779,019 B1 | 8/2004 | Mousseau et al. | |
| 6,883,003 B2 | 4/2005 | Nagahara | |
| 7,124,101 B1 | 10/2006 | Mikurak | |
| 7,136,897 B1 | 11/2006 | Raghunandan | |
| 7,137,064 B2 | 11/2006 | Kuppinger et al. | |
| 7,146,327 B1 | 12/2006 | Howard et al. | |
| 7,171,615 B2 | 1/2007 | Jensen et al. | |
| 7,181,445 B2 | 2/2007 | Bebo et al. | |
| 7,185,271 B2 | 2/2007 | Lee et al. | |
| 7,240,100 B1 | 7/2007 | Wein et al. | |
| 7,346,660 B2 | 3/2008 | Kulkarni | |
| 7,505,056 B2 | 3/2009 | Kurzweil et al. | |
| 7,603,352 B1* | 10/2009 | Vassallo et al. | |
| 7,634,541 B2 | 12/2009 | Chen et al. | |
| 7,702,128 B2 | 4/2010 | Cohen et al. | |
| 7,739,343 B2 | 6/2010 | Gardner et al. | |
| 7,742,485 B2 | 6/2010 | Zhang | |
| 7,814,116 B2* | 10/2010 | Hauser | G06F 17/30716 705/14.66 |
| 7,814,515 B2 | 10/2010 | Ohyama et al. | |
| 7,840,890 B2 | 11/2010 | Lund | |
| 7,885,925 B1 | 2/2011 | Strong et al. | |
| 7,949,669 B2 | 5/2011 | Tischer | |
| 7,953,390 B2 | 5/2011 | White et al. | |
| 7,953,394 B2 | 5/2011 | Jordan, Jr. | |
| 8,201,077 B2 | 6/2012 | Reddy et al. | |
| 8,240,557 B2 | 8/2012 | Fernandes et al. | |
| 8,370,912 B2 | 2/2013 | Turnbull et al. | |
| 8,443,185 B2 | 5/2013 | Maller | |
| 8,452,779 B1 | 5/2013 | Kelley et al. | |
| 8,996,350 B1 | 3/2015 | Dub et al. | |
| 9,639,821 B2 | 5/2017 | Sipe et al. | |
| 2002/0010679 A1* | 1/2002 | Felsher | G06F 19/322 705/51 |
| 2002/0023010 A1 | 2/2002 | Rittmaster et al. | |
| 2002/0049717 A1 | 4/2002 | Routtenberg et al. | |
| 2002/0188635 A1* | 12/2002 | Larson | G06F 17/30864 715/234 |
| 2003/0110128 A1 | 6/2003 | Foth et al. | |
| 2003/0236725 A1 | 12/2003 | Hickox et al. | |
| 2004/0044958 A1 | 3/2004 | Wolf et al. | |
| 2004/0088255 A1 | 5/2004 | Zielke et al. | |
| 2004/0229194 A1* | 11/2004 | Yang | G09B 7/02 434/118 |
| 2004/0254851 A1 | 12/2004 | Himeno et al. | |
| 2004/0255152 A1* | 12/2004 | Kanamori | G06F 21/10 726/26 |
| 2005/0203765 A1 | 9/2005 | Maritzen et al. | |
| 2005/0203976 A1 | 9/2005 | Hyun et al. | |
| 2005/0234860 A1* | 10/2005 | Roever | G06F 21/10 |
| 2006/0149770 A1* | 7/2006 | Jang | G06F 17/2229 |
| 2006/0159272 A1 | 7/2006 | Ishiguro et al. | |
| 2006/0178918 A1 | 8/2006 | Mikurak | |
| 2006/0200754 A1 | 9/2006 | Kablesh et al. | |
| 2006/0242178 A1 | 10/2006 | Butterfield et al. | |
| 2007/0072588 A1 | 3/2007 | Gorty et al. | |
| 2008/0028017 A1* | 1/2008 | Garbow et al. | 709/201 |
| 2008/0080718 A1 | 4/2008 | Meijer et al. | |
| 2008/0141117 A1 | 6/2008 | King et al. | |
| 2008/0235351 A1 | 9/2008 | Banga et al. | |
| 2008/0301193 A1* | 12/2008 | Massand | 707/200 |
| 2009/0024473 A1 | 1/2009 | Friedman | |
| 2009/0138730 A1 | 5/2009 | Cook et al. | |
| 2009/0214034 A1* | 8/2009 | Mehrotra et al. | 380/255 |
| 2009/0267923 A1 | 10/2009 | Van Schaack et al. | |
| 2009/0327336 A1 | 12/2009 | King et al. | |
| 2010/0037324 A1* | 2/2010 | Grant et al. | 726/27 |
| 2010/0082713 A1 | 4/2010 | Frid-Nielsen et al. | |
| 2010/0179962 A1 | 7/2010 | Schuster | |
| 2010/0198655 A1 | 8/2010 | Ketchum et al. | |
| 2010/0274750 A1* | 10/2010 | Oltean et al. | 706/47 |
| 2010/0293049 A1 | 11/2010 | Maher et al. | |
| 2010/0318372 A1 | 12/2010 | Band et al. | |
| 2011/0040805 A1* | 2/2011 | Carter | G06F 17/30867 707/808 |
| 2011/0040980 A1 | 2/2011 | Kerr et al. | |
| 2011/0093324 A1* | 4/2011 | Fordyce et al. | 705/14.27 |
| 2011/0125934 A1 | 5/2011 | Yu et al. | |
| 2011/0138175 A1 | 6/2011 | Clark et al. | |
| 2011/0288946 A1 | 11/2011 | Baiya et al. | |
| 2012/0030187 A1* | 2/2012 | Marano et al. | 707/709 |
| 2012/0054109 A1* | 3/2012 | Selsby | 705/80 |
| 2012/0173655 A1 | 7/2012 | McEntee | |
| 2012/0226969 A1 | 9/2012 | Begole et al. | |
| 2013/0024326 A1 | 1/2013 | Dearing et al. | |
| 2013/0060684 A1 | 3/2013 | Oskolkov et al. | |
| 2013/0060772 A1* | 3/2013 | Clark | G06Q 10/06 707/736 |
| 2013/0304647 A1 | 11/2013 | Cohen et al. | |
| 2014/0059587 A1 | 2/2014 | Davis et al. | |
| 2014/0223573 A1 | 8/2014 | Reedy et al. | |

FOREIGN PATENT DOCUMENTS

| | | |
|---|---|---|
| KR | 1020050106659 | 11/2005 |
| WO | 2006078852 | 7/2006 |
| WO | 2009038261 | 3/2009 |
| WO | WO 2013/134290 | 9/2013 |

OTHER PUBLICATIONS

Patent Coopeation Treaty, "International Search Report," in connection with International Application No. PCT/US2013/029161, dated Dec. 17, 2013, 3 pages.

Patent Coopeation Treaty, "Written Opinion," in connection with International Application No. PCT/US2013/029161, dated Dec. 17, 2013, 5 pages.

European Patent Office, "European Search Report", issued in connection with European Patent Application No. 13710733.0, dated Nov. 5, 2015, 7 pages.

United States Patent and Trademark Office, "Final Office Action," issued in connection with U.S. Appl. No. 14/243,685, dated Mar. 15, 2016, 27 pages.

International Searching Authority, "Written Opinion of the International Searching Authority," issued in connection with PCT Application No. PCT/US2015/023126, dated Jul. 9, 2015, 11 pages.

International Searching Authority, "International Search Report," issued in connection with PCT Application No. PCT/US2015/023126, dated Jul. 9, 2015, 7 pages.

Microsoft, "Integrating Microsoft Dynamics Mobile 2008 with Business Solutions," White Paper, Feb. 2008, retrieved on Jul. 16, 2015, [http://nav.dk/files/MicrosoftDynamicsMobileIntegration_WP.pdf], 26 pages.

United States Patent and Trademark Office, "Non-Final Office Action," issued in connection with U.S. Appl. No. 14/243,685, dated Sep. 1, 2015, 49 pages.

United States Patent and Trademark Office, "Non-Final Office Action," issued in connection with U.S. Appl. No. 14/243,685, dated Sep. 17, 2015, 49 pages.

International Searching Authority, "International Preliminary Report on Patentability," issued in connection with PCT Patent Application No. PCT/US2015/023126, dated Oct. 4, 2016, 10 pages.

U.S. Appl. No. 09/388,191, Dreyer et al.

USPTO non-final Office action dated Jan. 3, 2017, for U.S. Appl. No. 14/243,685, filed Apr. 2, 2014, Applicant, R.R. Donnelley & Sons Company, (36 pages).

Extended European Search Report for European Application No. EP 15774176, dated Oct. 18, 2017 (6 pages).

* cited by examiner

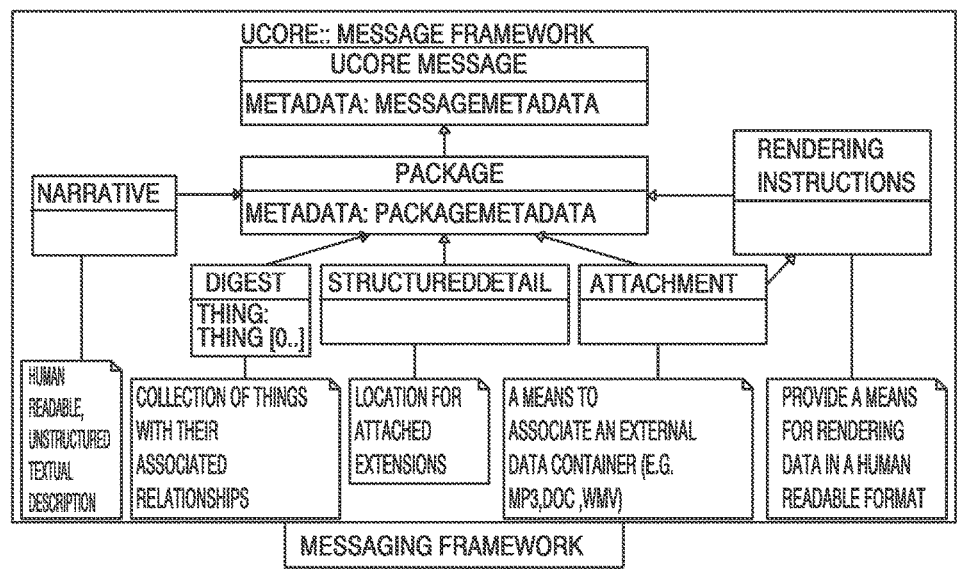
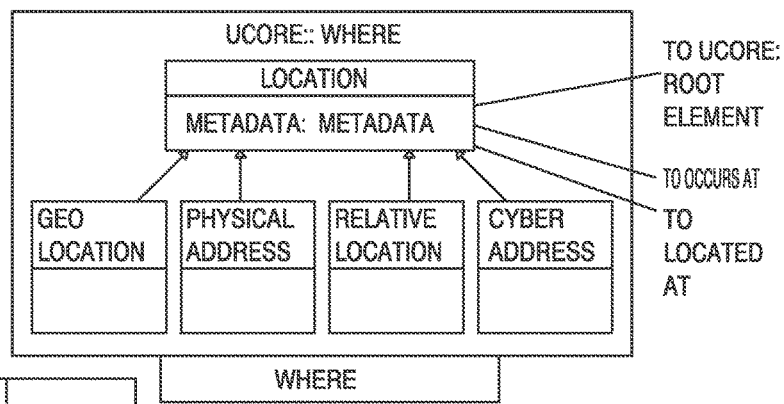
Fig. 12a

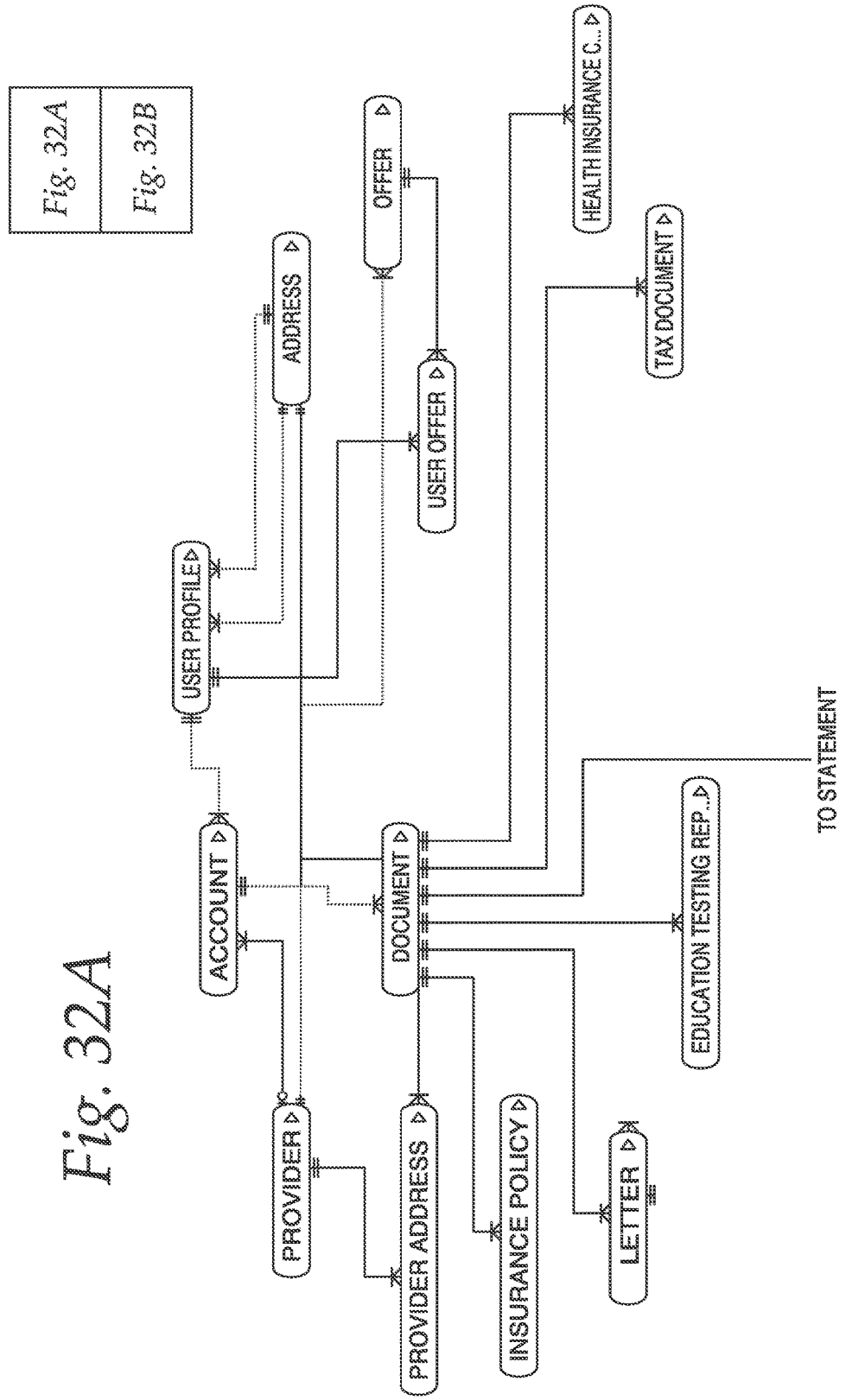

SYSTEMS AND METHODS FOR DIGITAL CONTENT DELIVERY

RELATED APPLICATION

This patent arises from U.S. Provisional Application No. 61/606,932 filed on Mar. 5, 2012, which is hereby incorporated herein by reference in its entirety.

FIELD OF THE DISCLOSURE

This disclosure relates generally to content delivery, and, more particularly, to systems and methods for digital content delivery.

BACKGROUND

Electronic mailboxes are known means for enabling people to receive and send electronic or digital content such as emails. Cloud storage has developed to enable people to store digital content on remote storage media over a network, which may be accessible from a plurality of devices communicatively coupled to the network. These known systems rely on the individual to organize the received content.

BRIEF DESCRIPTION OF THE DRAWINGS

FIGS. 12a and 12b are block diagrams of an example data model used in the example system of FIG. 1 and the example processes.

FIGS. 32A and 32B are block diagrams of an example data structure that can be used to implement the examples disclosed herein.

DETAILED DESCRIPTION

Figure 1:
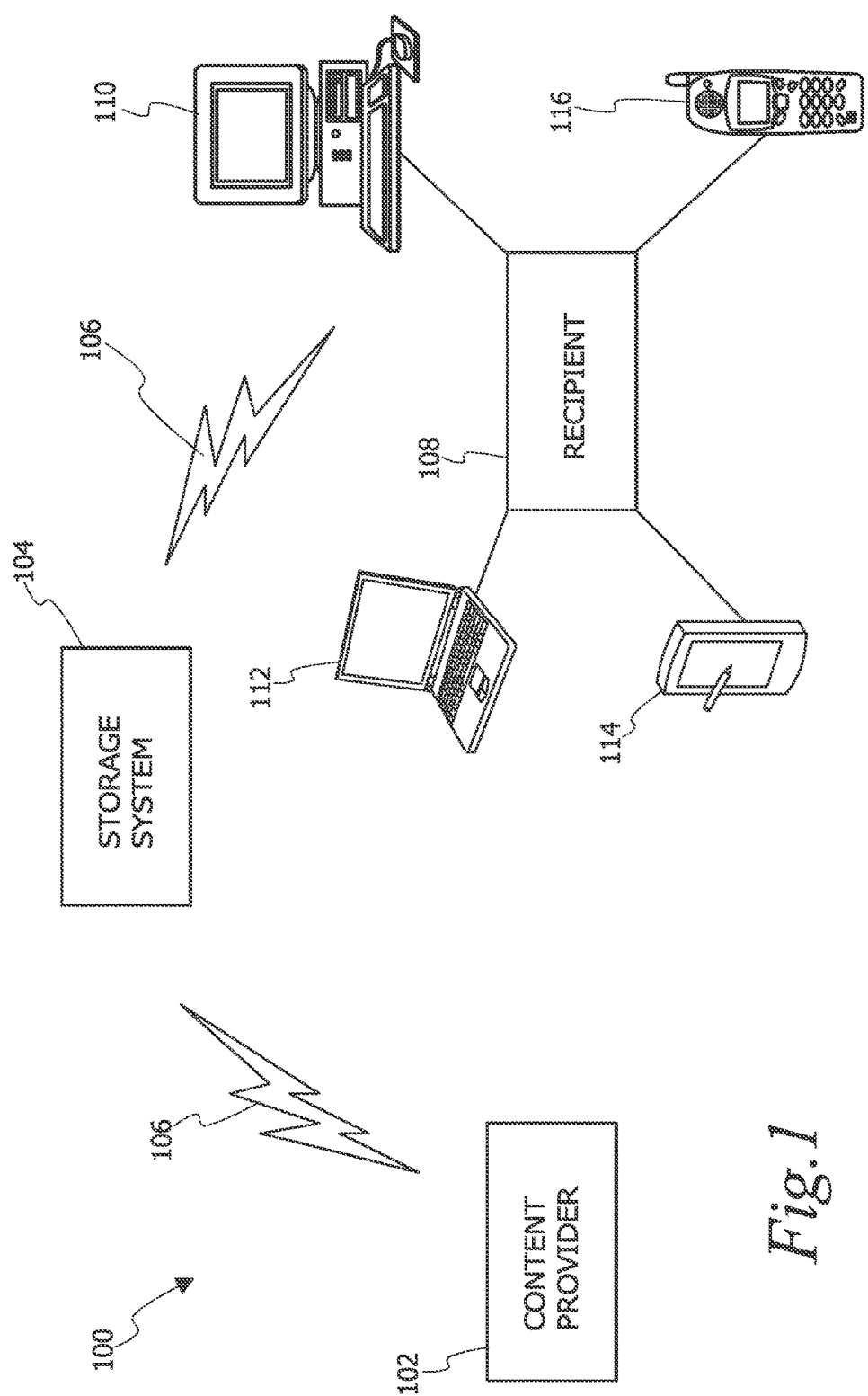
FIG. 1 shows an example digital content delivery system in accordance with the teachings of these disclosures.

Disclosed herein are methods, systems, apparatus, and machine readable medium for digital content delivery to assist in, perform and/or provide the production, organization, analysis and distribution of digital content. In some examples, as disclosed herein, the content provider may include and/or provide one or more hubs, entities, people, systems, applications and/or programs, etc. whose processes, methods, functions, etc. may be performed automatically, manually and/or partially automatically and partially manually. Alternatively, the content provider may provide the content to the hubs, entities, people, systems, applications and/or programs, etc.

In some examples, the content provider may ingest, preprocess, tag/classify, approve and/or publish content. Ingesting the content may include authenticating, encrypting and/or staging the content. Preprocessing the content may include validating, sorting and/or grouping, cleansing, filtering, enriching, transforming and/or analyzing the content. Tagging and/or classifying the content may include tagging, classifying and/or indexing the content. Approving the content may include authorizing and/or staging the content. Publishing the content may include transforming, publishing and/or synchronizing the content.

In some examples, the content provider may tag data for later use. In some examples, the content provider may be an intermediary between a company (e.g., a utility company) and a user. Thus, in some examples, the information to be delivered is conveyed from the company to the content provider. The content provider may add metatags, organize, analyze, sort, and/or filter, etc., the data (e.g., the metadata) and/or enable user accessibility thereto. In other examples, information (e.g., print readable documents, print-ready forms) with metatags is conveyed from the company to the content provider. The content provider may add, organize, analyze, sort, and/or filter, etc., the data (e.g., the metadata) and/or enable user accessibility thereto. In other examples, metadata is conveyed from the company to the content delivery company. The content provider, using the metadata and an associated template, may create viewable documents and/or organize, analyze, sort, and/or filter, etc., the data (e.g., the metadata) and/or enable user accessibility thereto.

In some examples, the tagged data may be formatted in a standardized format to enable use on multiple systems, interoperability of different applications, etc. The standardized format may enable the tagged data to be searchable, useable, filterable, analyzable, synchronizable, etc., by a user, a third party, a content provider, etc. Some of the information obtained by a third party and/or content provider may include and/or be used for trend analytics, targeted advertising, etc. For example, based on a user's bills including tagged metadata relating to a baby, the content provider may send targeted advertising and/or coupons (e.g., print, electronic, etc.) to the user relating to a baby (e.g., clothes, toys, etc.).

In some examples, documents and/or data may be tagged (e.g., by the content provider, another entity associated with the content provider, etc.). In some examples, a user may aggregate the tagged data from multiple sources (e.g., utility companies, phone companies, etc.) and/or perform analytics thereon. In some examples, the user may search the aggregated data to view and/or perform analytics on a subset of the tagged data. For example, the user may filter the tagged data and determine all bills that are due within the next month. For example, the user can analyze the data to determine an amount spent on coffee over the last year. For example, the user can determine a difference in the amount spent on coffee in 2010 versus an amount spent on coffee in 2011. For example, the user, using the tagged metadata, can analyze his or her bank accounts and/or investments. Using the metadata, the analyzed, searched, filtered, etc., data may be viewable in any suitable form (e.g., graphs, charts, graphics, etc.).

In some examples, tagged data from multiple users (e.g., people in a household) may be combined and the two or more users may aggregate the tagged data from multiple sources (e.g., utility companies, phone companies, etc.) and/or perform analytics thereon. In some examples, the users may search the aggregated data to view and/or perform analytics on a subset of the tagged data.

In some examples, a third party may aggregate the tagged data, from one or more users, and perform analytics thereon (e.g., analyze trends, credit card purchases, purchases at one or more retailers, etc.). In some examples, a third party may search tagged data, from one or more users, and perform analytics on a subset of the tagged data. The user may or may not be aware of the analysis of the data by third parties.

In some examples, tagged data may be segregated based on user preferences. Also, in some examples, electronic delivery of content may or may not be used. In a print delivery example, though the documents are intended for print delivery, the documents are tagged, and the tagged data is saved. The user is provided access to the tagged data to provide the user the benefits of the tagging. For example, the user may be provided with this content (e.g., the tagged data) and/or benefits by logging into a website.

Document publishers and content delivery companies have access to volumes of data related to intended recipients (e.g., consumers) of the published documents and/or content. Document publishers and content delivery companies incur costs associated with the production of the documents and/or content and the delivery to the intended recipients. The example systems and methods disclosed herein reduce the cost involved in delivering content to the consumer. The example systems and methods disclosed herein provide many benefits including, for example, delivering content at a reduced cost, increasing consumer satisfaction, delivering content that is relevant and in a timely manner, securely handling all the content and delivering the content reliably. The examples disclosed herein also create new personalized channels of delivery and may be used to analyze content in the system to generate insight into customer/recipient needs and appropriate or relevant actions in accordance thereto.

In some examples, the content provider has several underlying functions. For example, a robust content filtering and processing service is provided that ingests and normalizes content, extracting key attributes to create metadata to enable the intelligence of the content and/or portions or pieces of the content. In addition, a registration system supports the establishment of an account for consumers/recipients and the management of a consent database for routing content/communications. In addition, the examples include a distribution hub to manage the distribution of content to recipient accounts and the management of third party storage providers. A cloud storage solution is provided to store content and related metadata, which is accessible from a recipient interface via a software application. In addition, the example system includes security features to support high levels of security, as disclosed in greater detail below.

One function of the example system is content filtering and ingestion. The example system provides a new way of distributing content as well as providing a new way for recipients to interact with content. Raw content, which may or may not include index data that describes the content, is processed by identifying the content and its format(s). The system includes a database for managing the profile of content producers. Example content producers include creditors, utility companies, banks, schools, publishers of books, periodicals, newsletters and/or any other producer of content. A content producer uploads, pushes or otherwise transmits content to the content provider that is set-up with certain parameters including expected formats, rules for extracting content, expected delivery timing, error handling, etc. The content is also extractable. For content in print-ready forms (e.g., PDF, AFP, etc.), the example content provider extracts key elements of the document (e.g., recipient name, recipient address, content owner, important document-specific data such as date, purpose, dollar value, balance due, etc.), also known as data tagging. For content that is in data form (e.g., XML, flat file, etc), the appropriate fields are identified and extracted from the original file to serve as the data tags.

The example content provider (e.g., system) also includes ingesting of the content. Data tags are used to tie the content and the metadata to a registered recipient. Both the content and the metadata are ingested into a content and data storage solution and linked to the recipient's account. In addition, the system performs a normalization function. In some examples, content is output in a format for long term storage as the official rendition of the content. For example, a bill may be provided to the content provider as AFP data, and the long term storage format may be as a PDF.

Another aspect of the example system, as detailed below, is recipient/user registration and management. The example system supports a user/recipient base that includes consumers. The system facilitates registration and billing as well as the storage of recipient or user profile management. With respect to registration, in some examples the recipients download a consumer software application or app. Once the app is downloaded, the app connects with the system registration that collects recipient/consumer information to establish an account, create a profile and establish a billing account for any ongoing services. With respect to billing, the system manages any ongoing billing or any initial app-related fees that are not managed through a third party (such as, for example, an app store). Also, with respect to the user profile, the registration process includes the collection and storage of consumer profile information including confidential and/or sensitive information. This information supports security and consent management so the system can properly route content, content provider selections (such as for example, club and/or offer members), product/service selections, and/or any ongoing usage statistics that inform the consumer's profile. In some examples, the included metrics include one or more of a name, a physical address (used to route address-based content), an email, billing information, account number(s) for content producer(s), a storage option, service selections (e.g., paid features) and/or cookie information on usage that supports customer relationship management (CRM) process(es).

As detailed below, the example system includes a hub for processing content to intelligently route content from the content producers to the recipients and to store metadata. The hub performs many functions including, for example, maintaining and managing workflows so that content is in the correct format and is available to the appropriate recipient and pushed to the recipient's selected cloud storage option. The hub manages the expiration, syndication, metadata management, business rules and/or movement of content to the recipients.

The hub also maintains connections to various cloud storage options so that content is seamlessly pushed to cloud storage while also being retrieved and used by the content provider app. Recipients will be able to choose where they want to store content according to their needs and/or desires. In addition, the hub and/or the content provider provides quality control (QC) tools. As a distributor and manager of content, the content provider provides a quality controlled environment that tracks movement of content and makes such information available throughout the system. The content provider validates delivery and access of content by recipients and removes/replaces content that may have been delivered in error up to the point where the recipient has accessed the content and moved the content to his or her selected storage option. In some examples, the content provider also has the ability to delete content out of the recipient's cloud storage folders. In addition, the hub includes internal storage that is not managed or selected by the recipient. The internal storage area will archive all content-related metadata as well as provide a temporary holding area for all content until the content has been accessed initially by the recipient and/or after a threshold number of days (or any suitable and/or desired time period) has passed. Once one of these events has occurred, the content is moved to recipient's selected cloud provider. All content-related metadata is to be held for a threshold number of months, years, or other suitable time period and/or until the recipient's account is closed.

The example system also provides cloud storage solutions, as disclosed herein to archive the content and make the content available to the recipient. For maximum consumer/recipient flexibility, the example system disclosed herein seamlessly connects with a plurality of cloud storage and device sync providers for those recipients who have a preferred storage solution/provider. Also, the example system maintains its own cloud storage solution (the internal cloud) that is integrated with the application downloaded by the recipients. The recipients are able to select either path.

The internal cloud may be used to archive a recipient's content. The internal cloud may be a default option at registration, or the recipient may be requested to explicitly select the internal cloud. The internal cloud may be accessed from any device where the app has been downloaded. The system manages content by automatically expanding based on spaced needs and/or by the recipient selecting the space options. In some examples, syncing of content between recipient devices is enabled and in other examples, syncing is not enabled between the recipient devices, and content is accessible via a live connection.

The cloud storage also includes a lockbox, in some examples. The lockbox is a storage area for the recipient to upload highly valuable, personal, sensitive and/or confidential content such as, for example, contract(s), will(s), one or more insurance policies, etc. The lockbox is secure and with guaranteed back-up and availability to ensure that the recipient has confidence that his or her documents are always accessible and will not be lost. The lockbox functions like a safety deposit box where only the recipient can gain access to the content(s). The content provider does not have access or visibility into the content or the upload/download activity.

The cloud storage also includes third party cloud storage. Consumers/recipients may use cloud storage options such as, for example, DropBox, SugarSync, Box.net as well as others. The example system integrates these third party cloud storage systems via application program interfaces (APIs) created using the third party cloud's Software Developers Kit (SDK). The example system manages the folder structure within these cloud storage products and pushes content into those folders. Upon registration, if a recipient selects one of the third party cloud solutions, the recipient enters his or her login credentials, which will be stored within his or her profile, and the system pushes the native folder structure to the recipient's cloud account. The app downloaded by the consumer connects with the cloud solution's folder structure that has been created to access native content directly from the folders. The cloud provider can syndicate content across devices based on the recipient's selections at the folder level. The example system also pushes content into the folder structure once the content has been viewed by the recipient or if the content has reached a time limit, as noted above.

The examples disclosed herein also incorporate security features. As a management tool for highly personal and/or valuable content, the example system adheres to very high security levels in the creation, storage, and/or movement of content. For example, an index is created of metadata from supplied content. When extracting key data points from print or image files, or converting supplied data, the system employs redundant processes to validate that the correct information was extracted for the intended recipient and associated with the correct recipient. When delivering content to a recipient, there are multiple validation points that are used to confirm that the content does belong to that specific person. For example, in some examples, there are at least three factors that tie a recipient to a piece of content such as a name, a physical address, an account number, etc. Also, all storage of metadata, content, and/or user profile information is encrypted at rest, e.g., the data is encrypted at all points including when the data is stored and not moving through a network. Furthermore, content is not viewable outside of the app downloaded by the recipient. The app maintains an encryption key that enables the viewing of content only on a device that has the app installed and where the recipient is signed in.

As set forth herein, an example method includes receiving a first document from a first document source, classifying the first document with a first tag based on a type of the document, classifying the first document with a second tag based on a first intended recipient, encrypting the first document, publishing the first document for receipt by the first intended recipient, verifying an identity of the first intended recipient and granting the first recipient access to the first document based on the verified identity.

In some examples, the method includes extracting first data from the first document based on first content of the first document and granting the first intended recipient access to the first data. In some examples, the method includes receiving a second document from the first document source, classifying the second document with a third tag based on a type of the document, classifying the second document with the second tag based on the first intended recipient, encrypting the second document, publishing the second document for receipt by the first intended recipient, re-verifying the identity of the first recipient and granting the first recipient access to the second document based on the re-verified identity.

In some examples, the method includes extracting first data from the first document based on first content of the first document, extracting second data from the second document based on second content of the second document and granting the first intended recipient access to the first data and the second data.

In some examples, the method includes performing an analysis the first data and the second data and generating third data based on the analysis. In some examples, the third data includes information different than the first content and the second content. In some examples, the method includes granting the first intended recipient access to the third data. In some examples, the method includes receiving a request from the first intended recipient to modify a presentation of at least one of the first document, the second document, the first data, the second data or the third data and modifying the presentation based on the request. In some examples, the third data generated at the request of the first recipient.

In some examples, the method includes receiving a second document from the first document source, classifying the second document with a third tag based on a type of the document, classifying the second document with the fourth tag based on a second intended recipient, encrypting the second document, publishing the second document for receipt by the second intended recipient, verifying the identity of the second recipient and granting the second recipient access to the second document based on the verified identity.

In some examples, the method includes receiving a second document from a second document source different than the first document source, classifying the second document with a third tag based on a type of the document, classifying the second document with the second tag based on the first intended recipient, encrypting the second document, publishing the second document for receipt by the first intended recipient, re-verifying the identity of the first recipient and granting the first recipient access to the second document based on the re-verified identity.

In some examples, the method includes receiving a second document from a second document source different than the first document source, classifying the second document with a third tag based on a type of the document, classifying the second document with the fourth tag based on a second intended recipient, encrypting the second document, publishing the second document for receipt by the second intended recipient, verifying the identity of the second recipient and granting the second recipient access to the second document based on the verified identity.

In some examples, the method includes receiving a second document for presentation to the first intended recipient, the second document provided by the first document source or a second document source, the second document based on a profile of the first intended recipient. In some examples, the second document is unsolicited by the first intended recipient.

In some examples, the method includes storing the first document in a database accessible by the first intended recipient through a plurality of devices. In some examples, the method includes receiving a second document from the first intended recipient and storing the second document in the database. In some examples, the method includes encrypting the second document to deny access by any other entity other than the first intended recipient. In some examples, classifying the first document with a first tag includes reading a first tag embedded by the first document source.

An example system includes a hub to receive a first document from a first document source, an encoder to encrypt the first document, a publisher to publish the first document for receipt by a first intended recipient and a processor. The processor in the example system is to classify the first document with a first tag based on a type of the document, classify the first document with a second tag based on the first intended recipient, verify an identity of the first intended recipient and grant the first recipient access to the first document based on the verified identity.

In some examples, the processor is to extract first data from the first document based on first content of the first document and grant the first intended recipient access to the first data. In some examples, the hub is to receive a second document from the first document source, the encoder is to encrypt the second document, and the publisher is to publish the second document for receipt by the first intended recipient. In such example system, the processor is to classify the second document with a third tag based on a type of the document, classify the second document with the second tag based on the first intended recipient, re-verify the identity of the first recipient and grant the first recipient access to the second document based on the re-verified identity.

In some examples, the processor is to extract first data from the first document based on first content of the first document, extract second data from the second document based on second content of the second document and grant the first intended recipient access to the first data and the second data. In some examples, the processor is to perform an analysis the first data and the second data and generate third data based on the analysis. In some examples, the third data includes information different than the first content and the second content. In some examples, the processor is to grant the first intended recipient access to the third data.

In some examples, the hub to receive a request from the first intended recipient to modify a presentation of at least one of the first document, the second document, the first data, the second data or the third data and the processor to modify the presentation based on the request. In some examples, the processor is to generate the third data at the request of the first recipient.

In some examples, the hub is to receive a second document from the first document source, the encoder is to encrypt the second document, and the publisher is to publish the second document for receipt by a second intended recipient. In such example systems, the processor is to classify the second document with a third tag based on a type of the document, classify the second document with the fourth tag based on the second intended recipient, verify the identity of the second recipient and grant the second recipient access to the second document based on the verified identity.

In some examples, the hub is to receive a second document from a second document source different than the first document source, the encoder is to encrypt the second document, and the publisher is to publish the second document for receipt by the first intended recipient. In such example systems, the processor is to classify the second document with a third tag based on a type of the document, classify the second document with the second tag based on the first intended recipient, re-verify the identity of the first recipient and grant the first recipient access to the second document based on the re-verified identity.

In some examples, the hub is to receive a second document from a second document source different than the first document source, the encoder is to encrypt the second document, and the publisher is to publish the second document for receipt by a second intended recipient. In such example systems, the processor is to classify the second document with a third tag based on a type of the document, classify the second document with the fourth tag based on the second intended recipient, verify the identity of the second recipient and grant the second recipient access to the second document based on the verified identity.

In some examples, the hub is to receive a second document for presentation to the first intended recipient, the second document provided by the first document source or a second document source, the second document based on a profile of the first intended recipient. In some examples, the second document unsolicited by the first intended recipient.

In some examples, the system includes a database to store the first document, the database accessible by the first intended recipient through a plurality of devices. In some examples, the hub is to receive a second document from the first intended recipient and the database is to store the second document. In some examples, the encoder is to encrypt the second document to deny access by any other entity other than the first intended recipient.

An example tangible machine readable storage medium including, for example, a storage device and/or storage disc, includes instructions, which when read, cause a machine to receive a first document from a first document source, classify the first document with a first tag based on a type of the document, classify the first document with a second tag based on a first intended recipient, encrypt the first document, publish the first document for receipt by the first intended recipient, verify an identity of the first intended recipient and grant the first recipient access to the first document based on the verified identity.

In some examples, the instructions also cause the machine to extract first data from the first document based on first content of the first document and grant the first intended recipient access to the first data. In some examples, the instructions also cause the machine to receive a second document from the first document source, classify the second document with a third tag based on a type of the document, classify the second document with the second tag based on the first intended recipient, encrypt the second document, publish the second document for receipt by the first intended recipient, re-verify the identity of the first recipient and grant the first recipient access to the second document based on the re-verified identity.

In some examples, the instructions also cause the machine to extract first data from the first document based on first content of the first document, extract second data from the second document based on second content of the second document and grant the first intended recipient access to the first data and the second data.

In some examples, the instructions also cause the machine to perform an analysis the first data and the second data and generate third data based on the analysis. In some examples, the third data includes information different than the first content and the second content. In some examples, the instructions also cause the machine to grant the first intended recipient access to the third data.

In some examples, the instructions also cause the machine to receive a request from the first intended recipient to modify a presentation of at least one of the first document, the second document, the first data, the second data or the third data; and modify the presentation based on the request.

In some examples, the instructions also cause the machine to generate the third data at the request of the first recipient. In some examples, the instructions also causes the machine receive a second document from the first document source, classify the second document with a third tag based on a type of the document, classify the second document with the fourth tag based on a second intended recipient, encrypt the second document, publish the second document for receipt by the second intended recipient, verify the identity of the second recipient and grant the second recipient access to the second document based on the verified identity.

In some examples, the instructions also cause the machine to receive a second document from a second document source different than the first document source, classify the second document with a third tag based on a type of the document, classify the second document with the second tag based on the first intended recipient, encrypt the second document, publish the second document for receipt by the first intended recipient, re-verify the identity of the first recipient and grant the first recipient access to the second document based on the re-verified identity.

In some examples, the instructions also cause the machine to receive a second document from a second document source different than the first document source, classify the second document with a third tag based on a type of the document, classify the second document with the fourth tag based on a second intended recipient, encrypt the second document, publish the second document for receipt by the second intended recipient, verify the identity of the second recipient and grant the second recipient access to the second document based on the verified identity.

In some examples, the instructions also cause the machine to receive a second document for presentation to the first intended recipient, the second document provided by the first document source or a second document source, the second document based on a profile of the first intended recipient. In some examples, the second document is unsolicited by the first intended recipient. In some examples, the instructions also cause the machine to store the first document in a database accessible by the first intended recipient through a plurality of devices. In some examples, the instructions also cause the machine to receive a second document from the first intended recipient and store the second document in the database. In some examples, the instructions also cause the machine to encrypt the second document to deny access by any other entity other than the first intended recipient.

Turning to the figures, FIG. 1 shows an example system 100 that includes a content delivery provider 102. The content delivery provider 102 is communicatively coupled to a storage system 104 such as, for example, a cloud storage provider. The content delivery provider 102 is communicatively coupled to the storage system 104 via any known or later developed wired or wireless communication channels 106, including, for example, internet communication channels. The example system 100 also includes a recipient 108 who is communicatively coupled to the storage system 104 via the communication channels 106. The recipient 108 may access the storage system 104 via one or more devices including, for example, a desktop computer or an interactive television 110, a laptop computer or netbook 112, a tablet 114, a smart phone 116 or any other device with suitable communications functionality now known or later developed. The recipient 108 downloads or otherwise installs a software application (also known as an app) on his or her devices 110, 112, 114, 116. In some examples, the app is specific to a particular content provider 102. In addition, the content provider 102 is able to securely deliver, sync, interact with, and retrieve document(s) from the devices 110, 112, 114, 116 of the recipient 108.

In some examples, the content provider 102 prepares the content for transmission such as, for example, by tagging key elements of the content such as, for example, details describing one or more attributes of a document (further value and detail of which is described in greater detail below). The content provider 102 may also encrypt the content prior to transmission of the content via the storage system 104. The storage system 104 includes one or more cloud storage service providers including, for example, Windows Live, box, iCloud, DropBox, SugarSync, Amazon cloud drive and/or any other cloud. The storage system 104 may be selected by the recipient 108 such that, in some examples, the content provider 102 delivers content to a plurality of recipients via a plurality of storage systems. Each of the recipient devices 110, 112, 114, 116 is able to access the storage system 104 via the communication channels 106, as described above. Each device 110, 112, 114, 116 utilizes a specific decryption key that enables the content to be viewed by the recipient. The decryption key may be specific to each recipient 108 and/or to each device 110, 112, 114, 116.

In some examples, the content provider 102 can add metadata tags to documents and/or other content received from one or more document or content source(s) and use the metadata to create and store information beyond what appears on the face of any document. For example, the content provider 102 may add metadata to invoices or bills that indicate who the creditor is, a categorization of the billing, and an amount of the bill. The content provider 102 is able to sort, calculate and manage content. The content provider 102 may present coordinated content to the recipient 108 for many purposes and based on different criteria. For example, the content provider 102 may present information to the recipient 108 that indicates an amount of money spent each month or other time period, an amount spent based on a category, an aggregate amount billed from a particular creditor or a group of creditors, and/or any other desired grouping, categorization, calculation, etc. In some examples, the content provider 102 aggregates or organizes all of a recipient's bills into a single location. The recipient 108 may select a link for a creditor and be taken to a secure site to enter a payment. In some examples, the recipient 108 may pay bills directly through the content provider 102.

In some examples, content is pushed to a recipient 108 via the devices 110, 112, 114, 116. For example, offers may be presented to the recipient 108 that include offers the recipient 108 elected to receive, offers of organization(s) with which the recipient 108 interacts, and/or suitable offers determined based on the recipient's attributes including demographic information, financial information, education level, shopping habits, and/or other suitable attributes or characteristics that may provide insight into the recipient's likes and dislikes so that relevant content is shared with the recipient 108. The offer may include a barcode or other scannable a portion to enable the recipient to receive the offer (e.g., $5.00 off a $20.00 purchase). In the example, the recipient 108 may receive notification as to when an offer is expiring such as, for example, when the expiration date is approaching. Also, expired offers may be replaced by fresh or non-expired offers so the recipient 108 has an automatically regenerating stream of valid offers. In some such examples, the recipients may receive alerts when the recipients enter and/or are near a location for which they have an offer. Such alerts may be provided using functionality such as a Global Positioning System (GPS) of a mobile device associated with the recipient.

Figure 2:
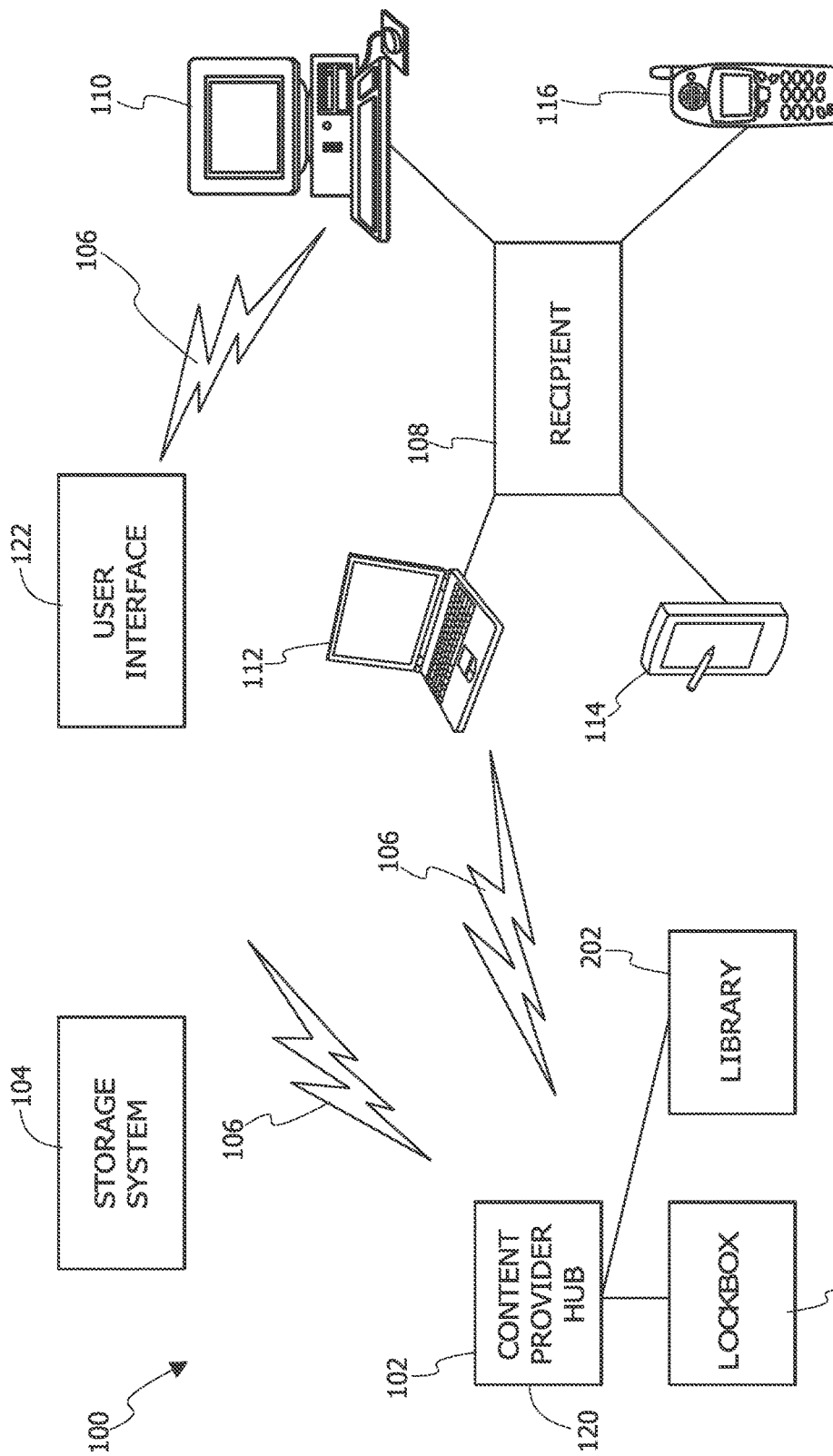
FIG. 2 shows further details of the example system of FIG. 1.

As shown in FIG. 2, in some examples, the content provider 102 includes a hub 120, which is communicatively coupled to the user 108 at a user interface 122 via communication channels 106. The hub 120 may be communicatively coupled to a plurality of content or document sources, and the hub 120 may perform one or more of the functions of the content provider 102 as detailed herein, including, for example, tagging content, analyzing content and/or delivery content, etc. The user interface 122 may be provided by the content provider, a third party, etc. In some examples, the hub 120 is a portion of the app that is installed on the recipient device 110, 112, 114, 116. The hub 120 is also communicatively coupled to the storage system 104. Thus, in this example, the content provider 102 interposes the recipient 108 and the storage system 104. Communications between the hub 120 and the storage system 104 are encrypted. The data, in some examples, is encrypted while at rest within the hub 120, on the recipient devices 110, 112, 114, 116 and/or during transmission over the communication channel 106. The configuration shown in FIG. 2 minimizes the creation of syndication by the content provider 102 to the various recipient devices 110, 112, 114, 116. In addition, the example of FIG. 2 enables the content provider 102 to plug future storage systems 104 into the hub 120 and to sync more than one storage system for one recipient and/or across a plurality of recipients. The example system 100 also enables the content provider 102 to recall content from one or more of the recipient devices 110, 112, 114, 116 on demand.

In some examples, the content provider 102 includes a secure storage or lockbox 124 and a library service 202. In the example shown in FIG. 2, the hub 120 stores metadata that is used to tag content for example, with descriptions of characteristics of content (including documents, video files, audio files, etc.) and/or portions of content. The hub 120 also stores rules required for syndication of content between the recipient 108/user interface 122 and the storage system 104. In this example, metadata is communicated between the hub 120 and the recipient 108. The metadata is encrypted by the hub 120 and decrypted by a security key found with the app and at the recipient 108. The hub 120 includes entitlement data such that the hub 120 can identify which devices are authorized to view what content. Unauthorized devices will be denied access to unauthorized content. In addition, in some examples, content can be destroyed at the hub 120, or elsewhere, if a security breach has been suspected and/or occurred. Thus, when a device key does not match an authorization key for content, remedial actions are taken to ensure the security of the content.

Users, i.e., recipients can upload content to the hub 120 by, for example, electronic mail, facsimile, or any other suitable communication means. Once uploaded, the content is processed by the hub 120 including, for example, tagged with metadata, cleansed and approved. Depending on the type of content (as identified, for example, by metadata), the content may be directed by the hub 120 to the storage system 104 for storage at, for example, a recipient identified cloud. The transmission to the storage system 104 may use the particular storage provider, i.e., the specific cloud's software development kit, for pushing content to authorized devices. In addition, content such as, for example, sensitive documents including, for example, birth records, financial statements, insurance policies, and other personal or otherwise private, confidential content may be stored in the lockbox 124. The lockbox 124, in this example, is stored or otherwise supported by the content provider 102, e.g., by servers at the content provider 102. Also, the lockbox 124 stores content that is not pushed or otherwise transmitted to the cloud, i.e., to the storage system 104. Recipients have encrypted access to the content in the lockbox 124 via the hub 120.

In some examples, the content provide 102 includes the example library 202 having non-transactional content such as content that is not a bill, invoice, financial statement, etc. Non-transactional content may include, for example, magazines, newspapers, other periodicals, catalogs, retail content, books, and/or other content. The content provider 102 may organize the content into categories, may update content, delete old content and/or make other automatic adjustments to the content.

Figure 3:
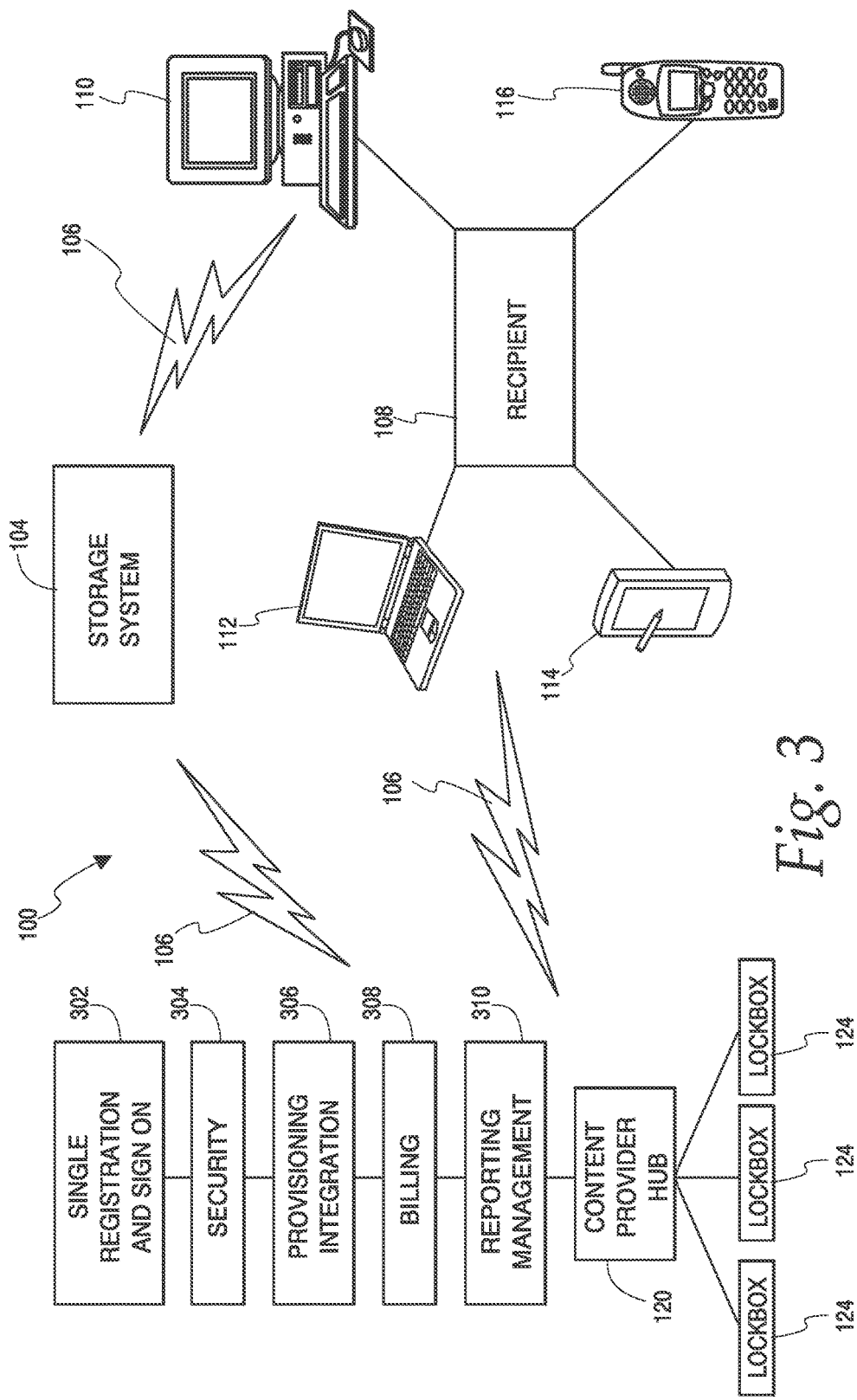
FIG. 3 shows further details of the example system of FIG. 1.

FIG. 3 is an example that shows further details of the example security features of the example hub 120. The example hub 120 may host a plurality of lockboxes 124. The lockboxes 124 may be identified by geographic region and, therefore, have characteristics and/or features that are in compliance with the particular local laws (e.g., privacy laws) of the particular region. FIG. 3 also shows different features and services provided by the content provider 102 and the corresponding app including, for example, a single registration and login or sign-on 302, security features 304, provisioning integration 306, billing features 308 and reporting management 310. Further details of these aspects are provided herein.

Figure 4:
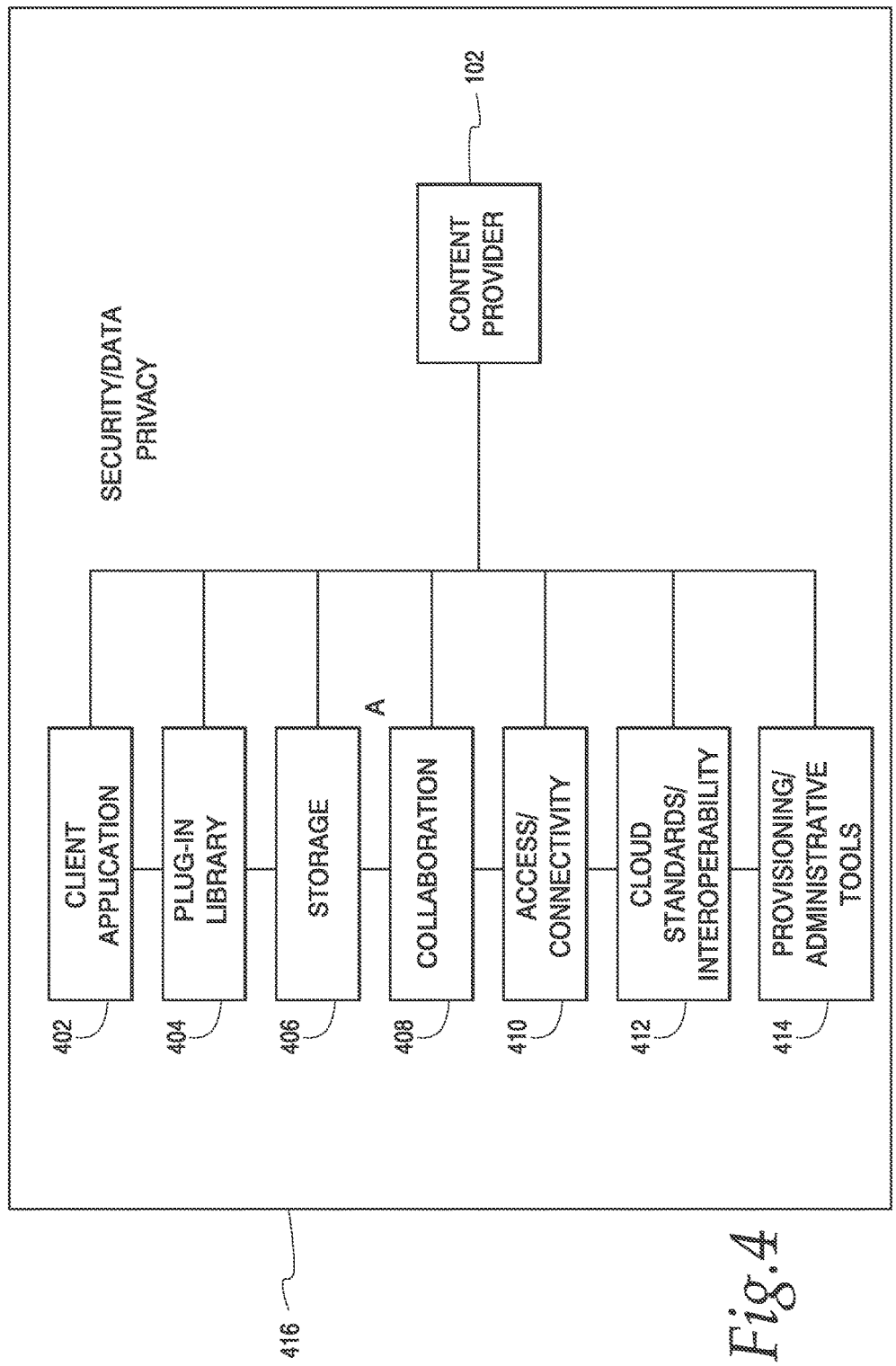
FIG. 4 is a schematic view of example service components of the example system of FIG. 1.

FIG. 4 is an illustration of several of the example service components provided by the example content provider 102. As shown in FIG. 4, the example content provider 102 provides the client and/or customer application 402, i.e., the app described above. The app provides a central portal that the recipient can use to interact with the content provider 102 and the storage systems 104. The content provider 102 further provides a plug-in library 404. The app and/or additional applications and content are available to the recipients through a graphical user interface, all of which may be downloaded or otherwise obtained through the plug-in library.

The content provider 102 also provides recipient storage and provisioning 414. The storage 406, which may be for example online storage, enables recipients to maintain and manage individual files, data, objects or other content such as, for example, in the lockbox 124 described above. The recipients may have the ability to self provision more space.

There are also collaboration services 408 provided by the content provider 102. In some examples, recipients may operate widgets or other software programs to collaborate and generate content. The widgets may include, for example, uploading files, annotating content, and/or social media integration.

In addition, the content provider 102 provides access and connectivity 410. For example, the content provider 102 may interpose the recipient 108 and the storage system 104 and facilitate communications and data transfer therebetween. Also, as noted above, the content provider 102 is in compliance with multiple cloud standards to enable interoperability 412 between a plurality of recipients and a plurality of cloud services.

The content provider 102 further provides, in some examples, provisioning and administrative tools 414 that provide control of recipient profiles, access to technical support, management of privilege, and authorization to the hub 120 and specific content. In addition, the content provider 102 maintains security and data privacy via an application of a security framework 416 and data privacy standards that may be implemented at each stage to cover service components 402, 404, 406, 408, 410, 412, 414 of the content provider 102.

Figure 5:
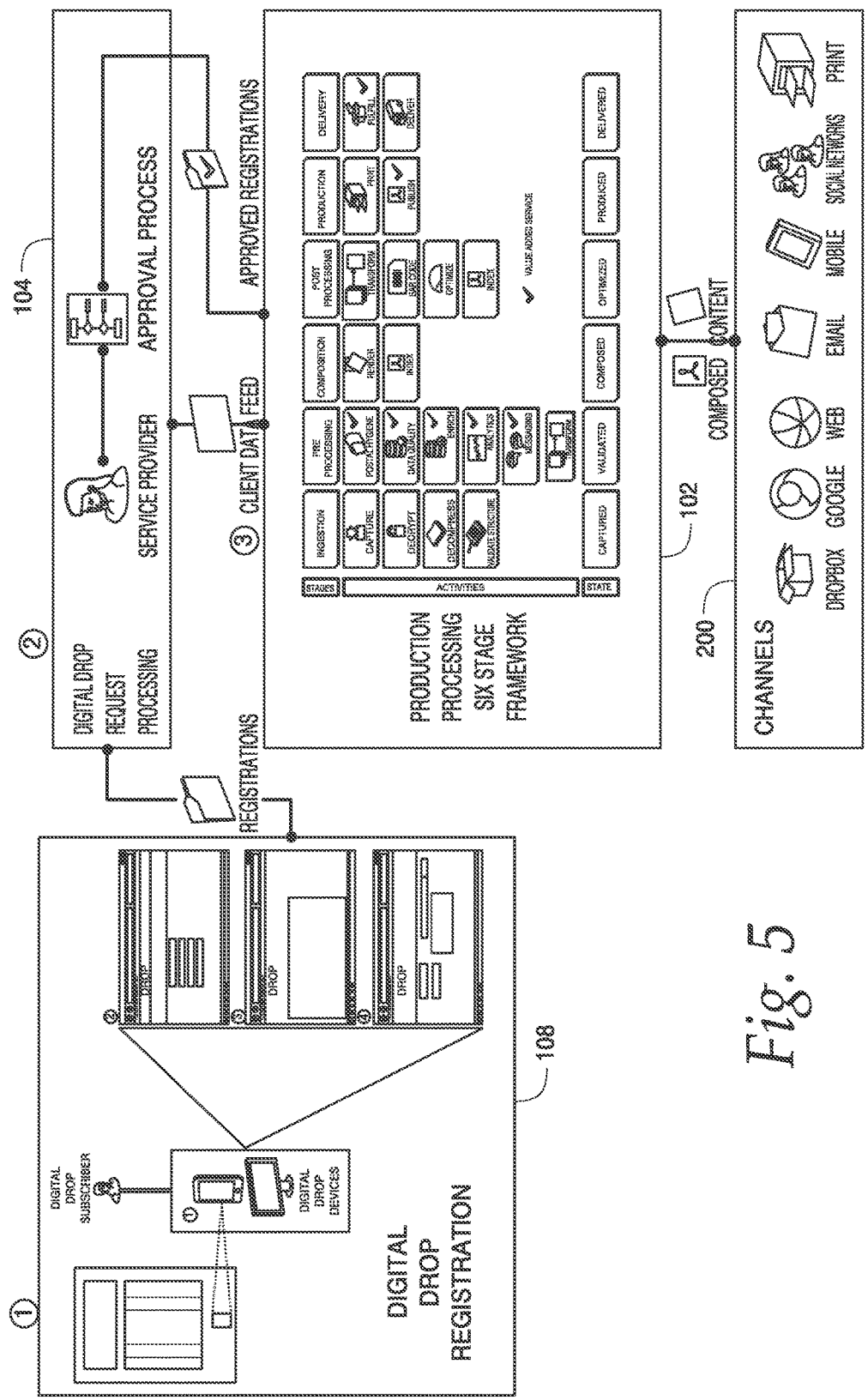
FIG. 5 is a block diagram showing further details of the example system of FIG. 1.

FIG. 5 illustrates further details of the example system. For example, when the recipient 108 completes the registration process, the storage system 104 determines if the registration request is approved from the content provider 102. If approved, the content provider 102 implements the example content delivery processes disclosed herein including content processing such as, for example, content ingestion, preprocessing, composition, post processing, production and delivery, which are detailed more below. In addition, the content processing and operation of the content provider 102 provide touchpoints 200 (e.g., interfaces to certain brands, products, services, etc.), which are extracted from data provided by the clients. The touchpoins 200 are representative of the organizations from which the recipient 108 elected to receive content via the example system 100 and/or organizations that may otherwise be relevant or of interest to the recipient 108 based on the a recipient identity, recipient profile and/or the content tagged or otherwise related to the recipient. The touchpoints are processed across one or more channels.

Figure 6:
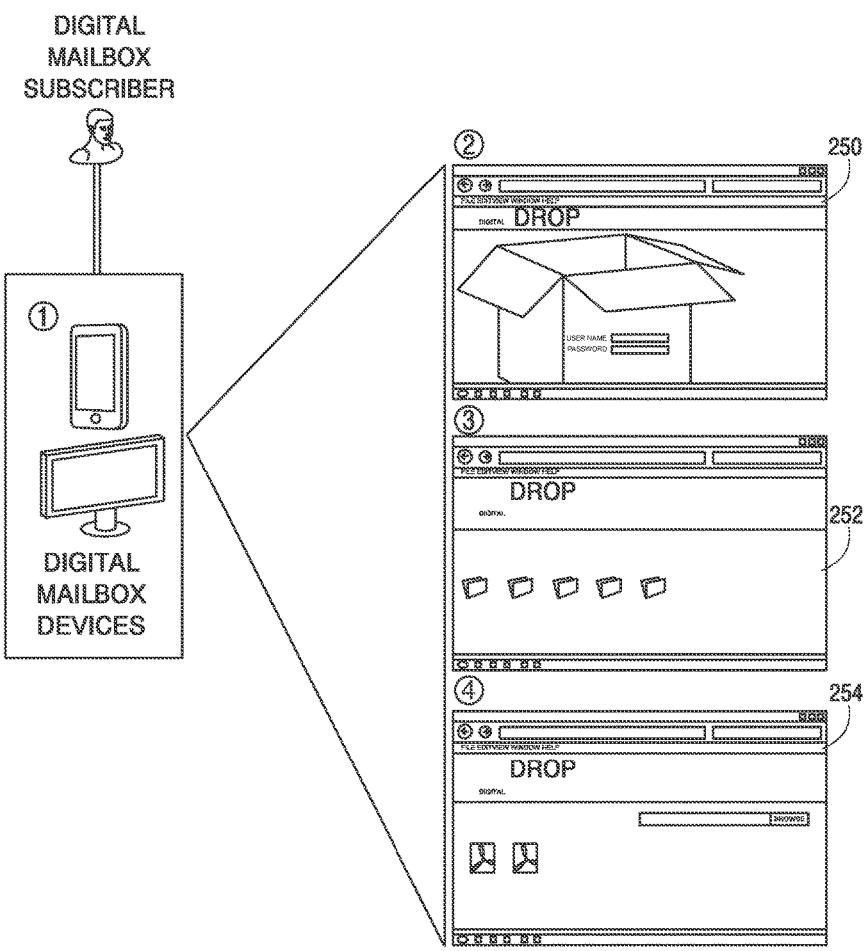
FIG. 6 shows example login interfaces and screenshots of an example operation of the example system of FIG. 1.

FIG. 6 shows an example login interface 250 that the recipient 108 uses to access the example system 100. Once logged in, the recipient can review folder(s) 252 and specific content (e.g., files) 254, organize or re-organize the content, create new folders, upload new content, delete content, etc.

Figure 7:
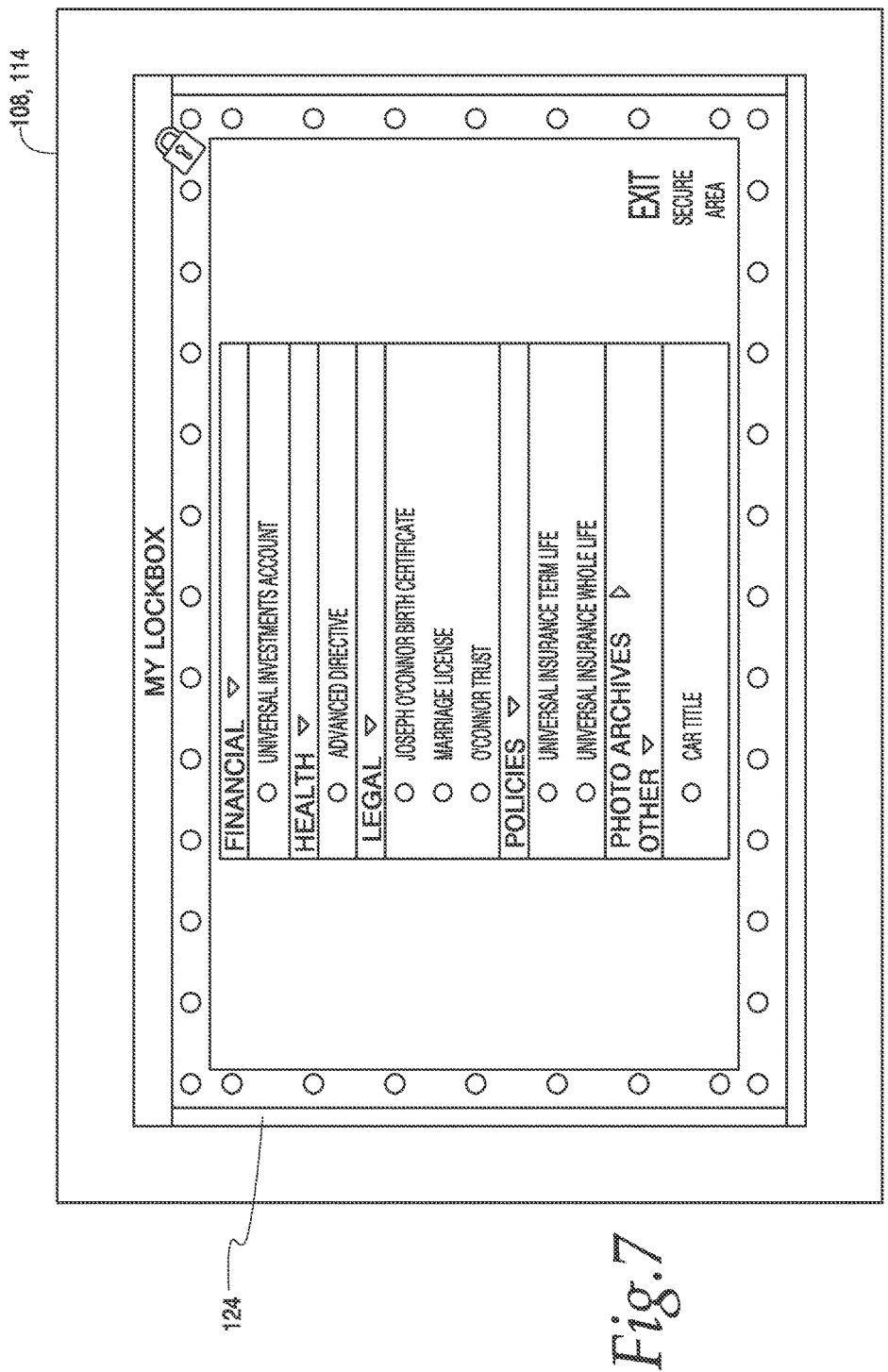
FIG. 7 is an example screenshot of an example operation of the example system of FIG. 1.

FIG. 7 shows an example lockbox 124. The lockbox 124 may be used for highly sensitive content including, for example, insurance policies, wills, birth certificates, etc. The lock box may use a dual key encryption. In some examples, the content provider 102 cannot read a document once uploaded into the lockbox 124 for added security. The recipient 108 may elect who is eligible to view content in the lockbox. The eligibility may be determined on a content-by-content basis. The content in the lockbox 124, as in the library 290 or other services of the example system 100, may be organized, updated, etc. There may also be redundant backup files created for the content in the lockbox 124. Also, as with other aspects of the example system 100, content may be added via an email, fax, photo transmission or other suitable mode of communication.

Figure 8:
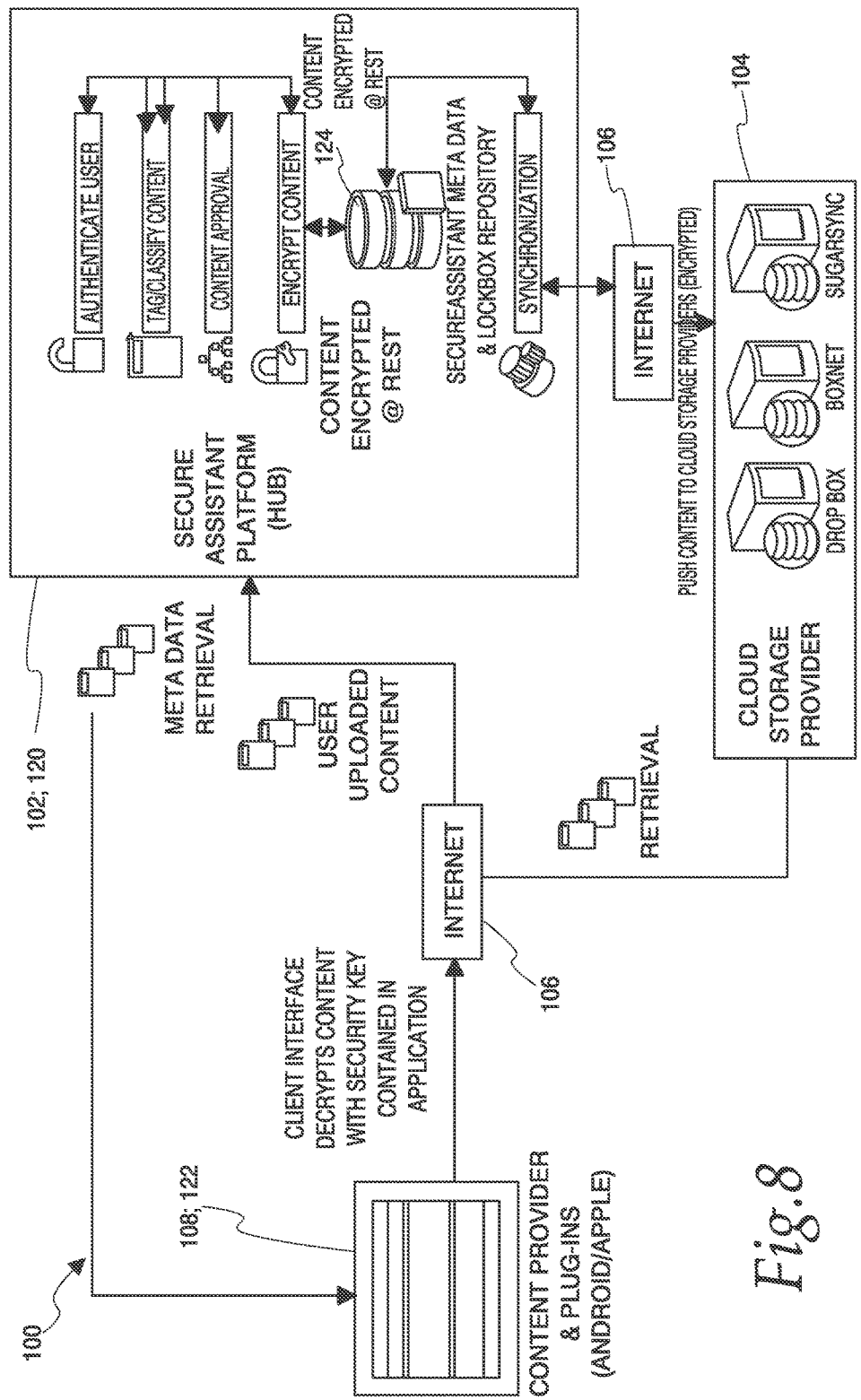
FIG. 8 is a block diagram illustrating example relationships between the components of the example system of FIG. 1.
Figure 9:
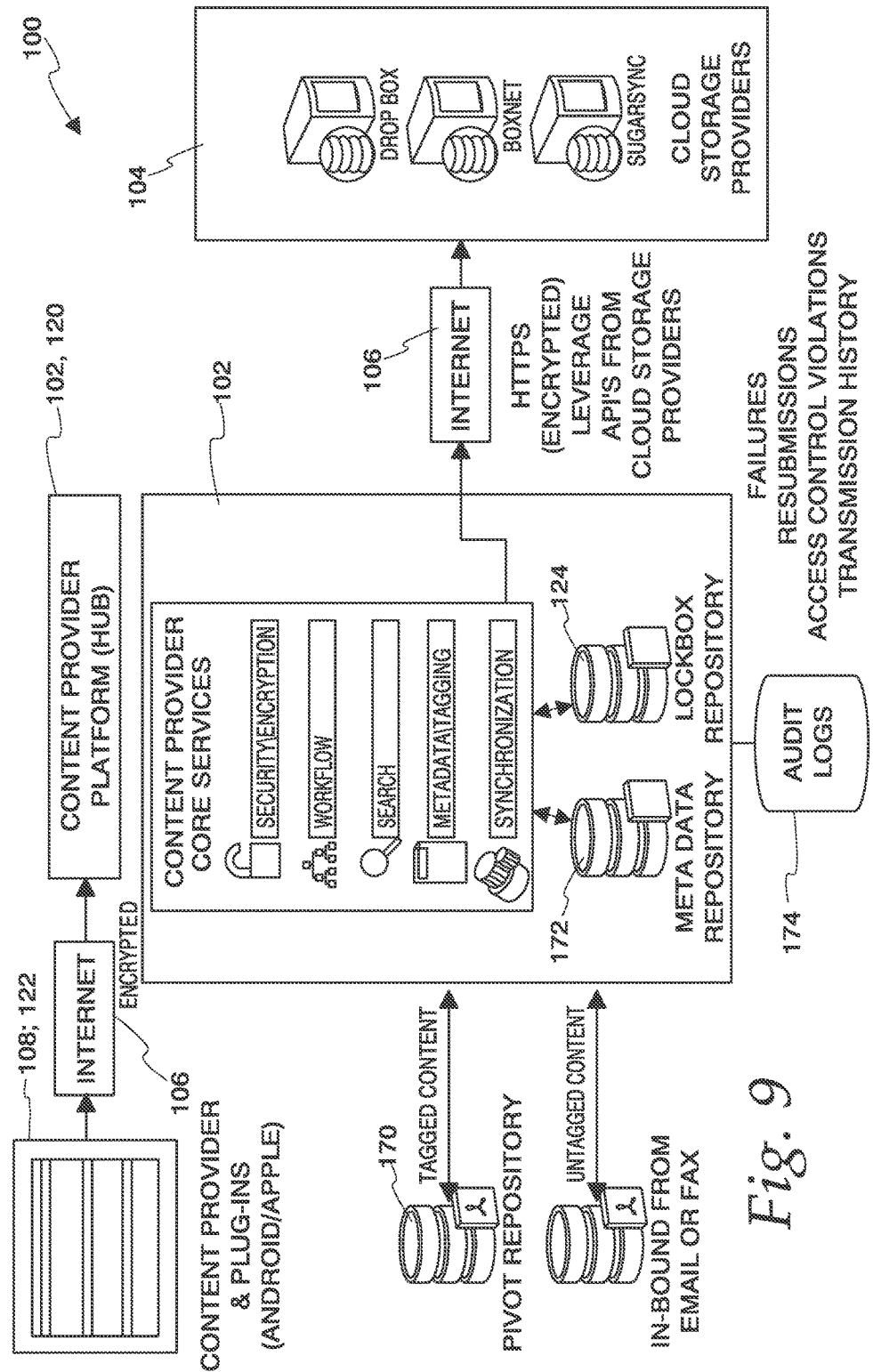
FIG. 9 is a block diagram illustrating example relationships between the components of the example system of FIG. 1.
Figure 10:
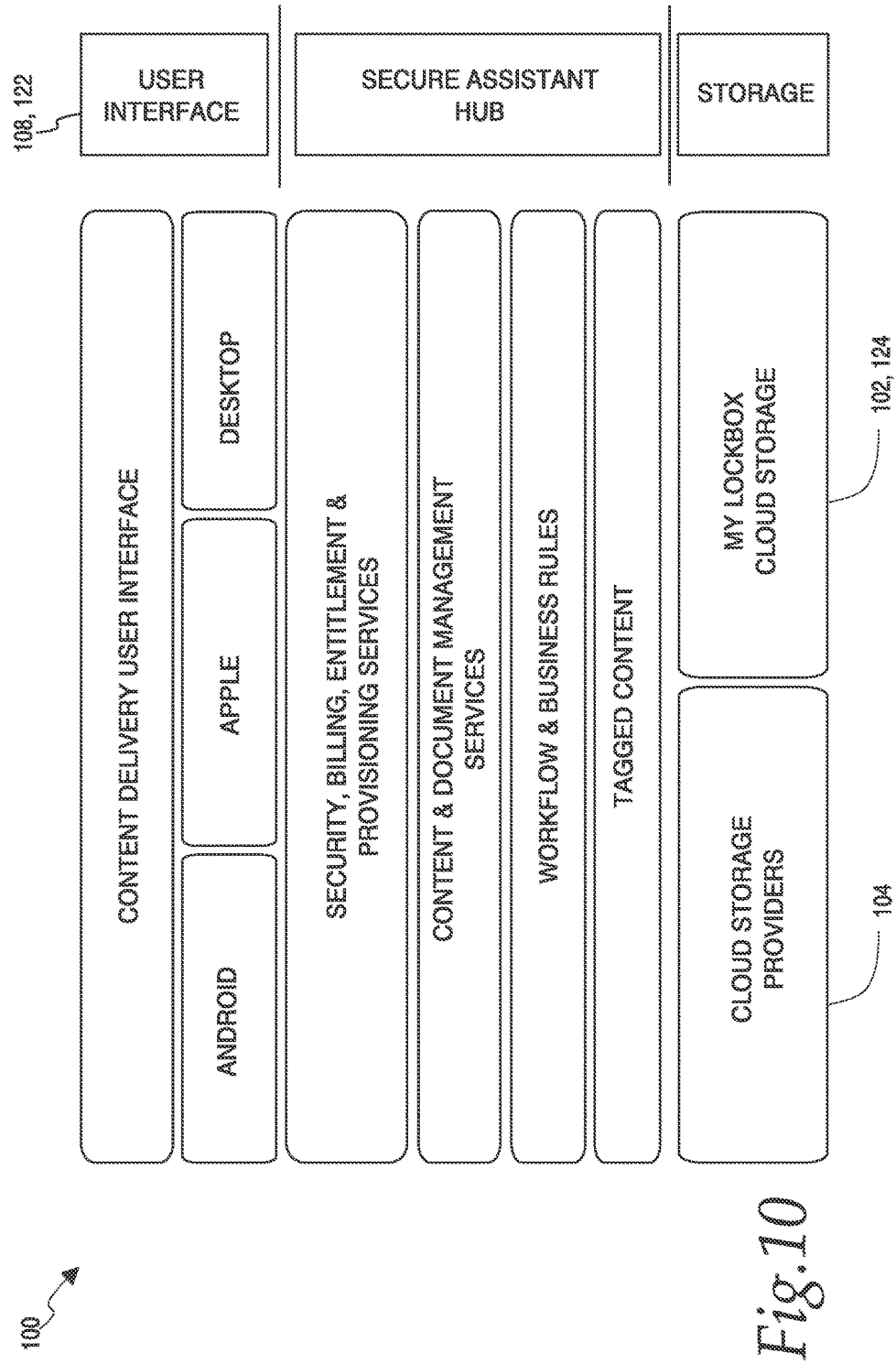
FIG. 10 is a block diagram of details of an example user interface, example content provider and example storage schemes of the example system of FIG. 1.

FIGS. 8-10 show different aspects of the relationships and interactions among the components of the example system 100. The relationships between the content provider 102, the recipient 108 and/or the storage system 104 are described above. In addition, FIG. 8 shows that, in some examples, the hub 120 of the content provider 102 performs the user authentication services, content tagging, classification, approval and encryption services and synchronization services disclosed herein. In some examples, the user authentication services, content tagging, classification, approval and encryption services and/or synchronization services disclosed herein may be performed automatically and/or manually.

FIG. 9 shows that the hub 120 also provides security, workflow and searching services. In addition, FIG. 9 shows that tagged content may be received at the hub 120 from a pivot repository 170, and untagged content may be received from, for example, an in-bound email or fax. Thus, in some examples, the content is received at the hub 120 pretagged. That is the document or content source provides tagged content. In other examples, the content is received at the hub 120 untagged, and the hub 120 may perform the tagging operation. The tagged and/or untagged content is processed by the hub 120 and, the content, a portion of the content, metadata associated with the content, etc. are stored in one or more of a metadata repository 172, the lockbox 124 and/or one or more storage system(s) 104. Furthermore, the hub 120 may store audit logs 174 related to, for example, failure(s), resubmission(s), access control violation(s), transmission history and/or any other history of the system 100.

FIG. 10 shows a block diagram of details of the user interface 122 of the recipient 108, the hub 120 of the content provider 102 and the storage schemes including the storage system 104 and the lockbox 124 of the content provider 102. As shown in FIG. 10, the user or recipient interface 122 may be incorporated into one or more devices (e.g., mobile and/or non mobile devices) that may run different operating software including Android devices, Apple devices, and/or any other suitable device using any suitable platform by Apple, Google or any other organization. The interface 122 is the gateway the recipient uses to access the example system 100 and particularly, the above-described app. The interface 122 enables the recipient to receive, view, and sort content on one or more devices. The app decrypts all content received from the hub 120 for viewing. The app may be extended further with one or more hardware and/or software module(s) (e.g., plug-ins) that enable access to additional features such as, for example, the lockbox 124, analytical services, etc.

The example hub 120 of the content provider 102 provides security, billing, entitlement and provisioning services. The hub 120 and the app hosted by the hub 120 are Payment Card Industry (PCI) compliant to adhere to industry security standards such as, for example, encryption in flight, encryption at rest, dual key encryption and/or other security measures. The entitlement and self provisioning services include, for example, storage allocation and plug-in purchasing. The hub 120 also provides content and document management services including, for example, tagging content and activating rules and workflows to insure content delivery is timely and secured. Workflow and business rules support movement of metadata and tagged digital content to the recipients. Workflows also support document deletion, updating and synchronization. The example hub 120 also intelligently tags and enriches content prior to transmission to client applications.

FIG. 10 also shows the incorporation of the lockbox 124 storage and the storage system(s) 104 including third party cloud storage providers into the example system 100. The storage features store content and syndicate content across multiple devices through one or more syndication application program interfaces (API) offered by the storage providers.

Figure 11:
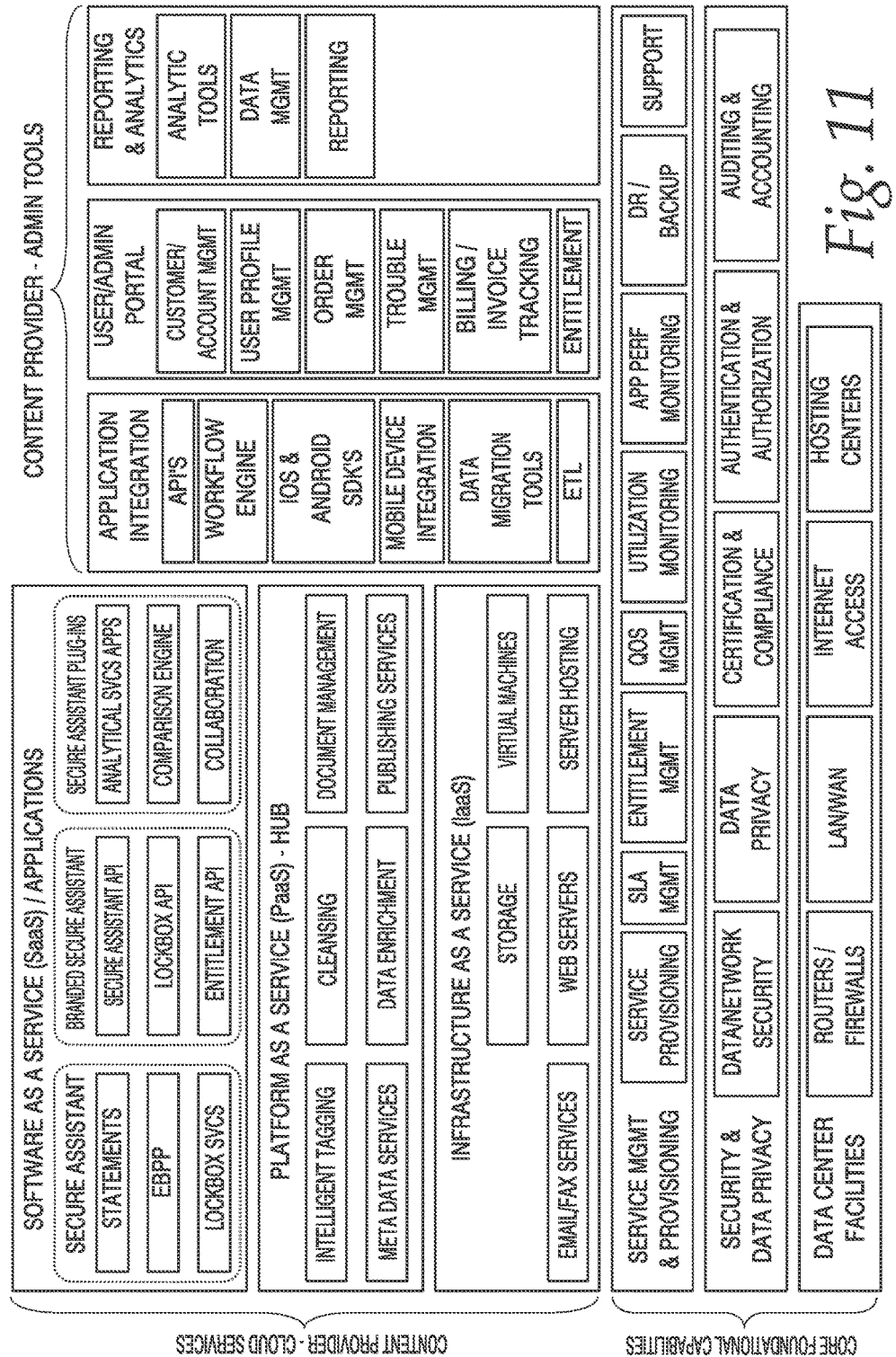
FIG. 11 is a block diagram of an example extensible framework to implement the example system of FIG. 1 and the example processes.

FIG. 11 outlines an extensible framework to implement the example systems disclosed herein (e.g., system 100) and example processes disclosed in connection with the flow charts below. The framework enables third party integration and business-to-business skinning capabilities. The framework includes cloud services, administration tools and core foundational capabilities. The cloud services include software as a service (SaaS) and/or other software applications and plug-ins including for example software services related to statements, electronic bill presentment and payment (EBPP), lockbox services, APIs, lockbox API, entitlement API, analytical services, a comparison engine and/or collaboration services. The cloud services also include platform as a service (PaaS), which in some examples is embodied in the example hub 120. The platform as a service features intelligent tagging, other metadata services, cleansing services, data enrichment, document management and/or publishing services. The cloud services also include infrastructure as a service (IaaS), which in some examples includes emails/fax services, storage, web servers, virtual machines and/or server hosting.

The administrative tools shown in the framework of FIG. 11 include application integration that includes APIs, a workflow engine, mobile device integration include Apple's iOS operating system and Android's SDKs, data migration tools and/or extract, transform, load (ETL) processing. The administrative tools also include a user or recipient administration portal that provides customer or recipient account management, user/recipient profile management, order management, trouble management, billing invoice tracking and/or entitlement services. In addition, the administrative tools include reporting and analytics that includes analytic tools, data management and/or reporting.

FIG. 11 also shows that the framework includes core foundational capabilities. The example core foundational capabilities includes service management and provisioning capabilities including, for example, service provisioning, software licensing agreement (SLA) management, entitlement management, quality of service (QoS) management, utilization monitoring, application performance monitoring, disaster recovery (DR) and backup services and/or support services. The core foundational capabilities also include security and data privacy services including, for example, data and network security, data privacy, certification and compliance services, authentication and authorization services and/or auditing and accounting services. In addition, the core foundational capabilities also include data center facilities. The data center facilities include, for example, router(s), firewall(s), local area network(s)/wide-area network(s), internet access and/or hosting center(s).

Figure 12B:
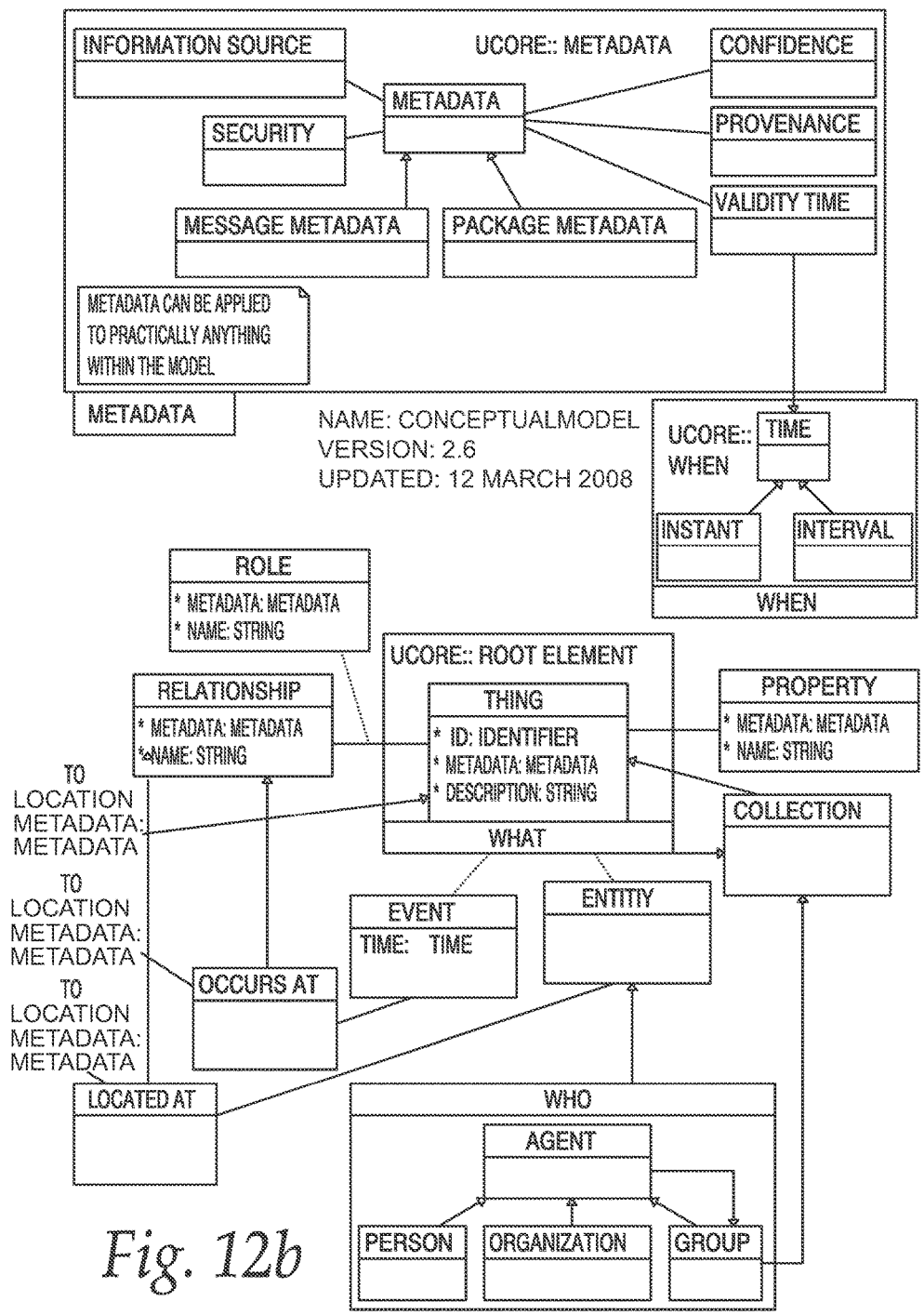

FIGS. 12a and 12b are block diagrams of a data model used in the example systems and methods disclosed herein. In some examples disclosed herein, the Universal Core (UCORE) model is leveraged to facilitate the sharing of data and provide standardization. The example data model includes a focus on messaging and location based services that indicate who received what and when. The examples leverage existing cloud storage models for synchronization and may be built upon open cloud standards and/or open API standards. In addition, the examples ensure a high degree of cross platform portability such as, for example, across extensible markup language (XML), Appel's mobile operating system iOS, the Java programming language and/or software platform and/or any other suitable platform(s). In addition, the example models disclosed herein tag and encode ingested data into a common format. Also, other features include utilization of vocabulary of most commonly exchanged data (who, what, when, where), XML representation of tagged content, workflow and rules to enable tailoring to specific content areas, security markings to permit controlled access to content, and messaging framework to package (e.g., encrypt) and un-package (e.g., decrypt) the content consistently.

Figure 13:
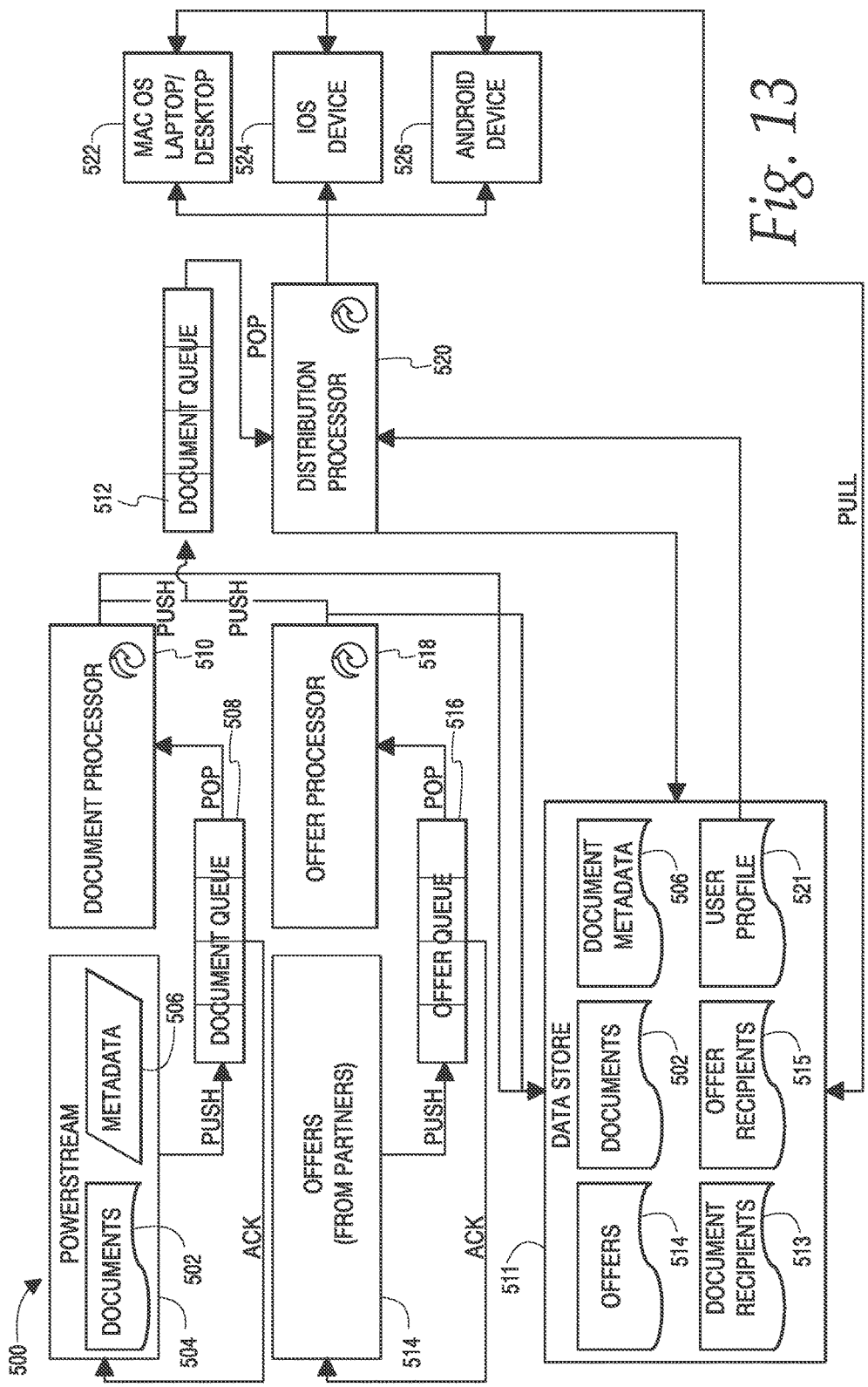
FIG. 13 is a block diagram of an alternative example system for providing digital content delivery in accordance with the teachings of this disclosure.

FIG. 13 illustrates another example system 500 for providing digital content delivery. FIG. 13 provides details of how information flows from one component of the example system 500 to another and the transformations, if any, such information undergoes in the process. Content and/or document(s) 502 are generated within a subsystem including a document source or content generator 504. The content generator 504 extracts metadata 506 from the documents. In some examples, the extracted set of metadata is pre-configured based on a type of content/document. The content generator 504 sends out or pushes a notification, and the notifications are funneled to a document queue 508. The document queue 508 is monitored by a document processor 510 that runs, for example, in the background. The document processor 510 picks up an item from the top or the beginning of the document queue 508 and processes the item. The example system 500 also stores the metadata of the document in a database 511. In addition, the example system 500 stores a link to the document being distributed. Also stored with the document or otherwise in relationship with the document is an identification of the consumers or recipients 513 to whom the document is intended to be delivered. The system 500 is able to link to the document at its source and does not need to create a copy of the document. The information is pushed to a distribution queue 512.

The example content provider 102 pushes offers, promotions and/or other marketing materials 514 into the system 500. The offers 514 may be pushed either via a user interface (i.e., manually) or via a defined end point (i.e., automatically) that the hub or app can subscribe to, and the offers 514 are ingested into the system 500. The offers 514 are pushed into an offer queue 516. An offer processor 518, which may run in the background, monitors the offer queue 514 and selects and processes an item from the beginning of the offer queue 514. The example system 500 also stores the offer information and information identifying the recipients 515 to whom the offer 514 is to be sent in the data store 511. The intended recipient(s) 515 of the offer 514 may be determined by a set of rules based on recipient preferences and/or qualifying rules identified by the client or partner making the offer 514. In addition, the offer recipients 515 may be the same as or different than the document recipients 513. The offer 514 and associated information is pushed or otherwise transmitted to the distribution queue 512.

A distribution processor 520, which is another service that may run in the background, monitors the distribution queue 512. The example system 500 identifies how the information (such as for example, either the document or the offer) should be sent. The distribution processor 520 uses recipient profile information 521 and determines the appropriate channel to which to send the information. This channel could be different based on the target devices that the recipient has registered (e.g., an Apple device 522, 524, an Android device 526, etc.). The channel may also change depending on, for example, the supported cloud sync providers with which the recipient has registered his/her account.

Figure 14:
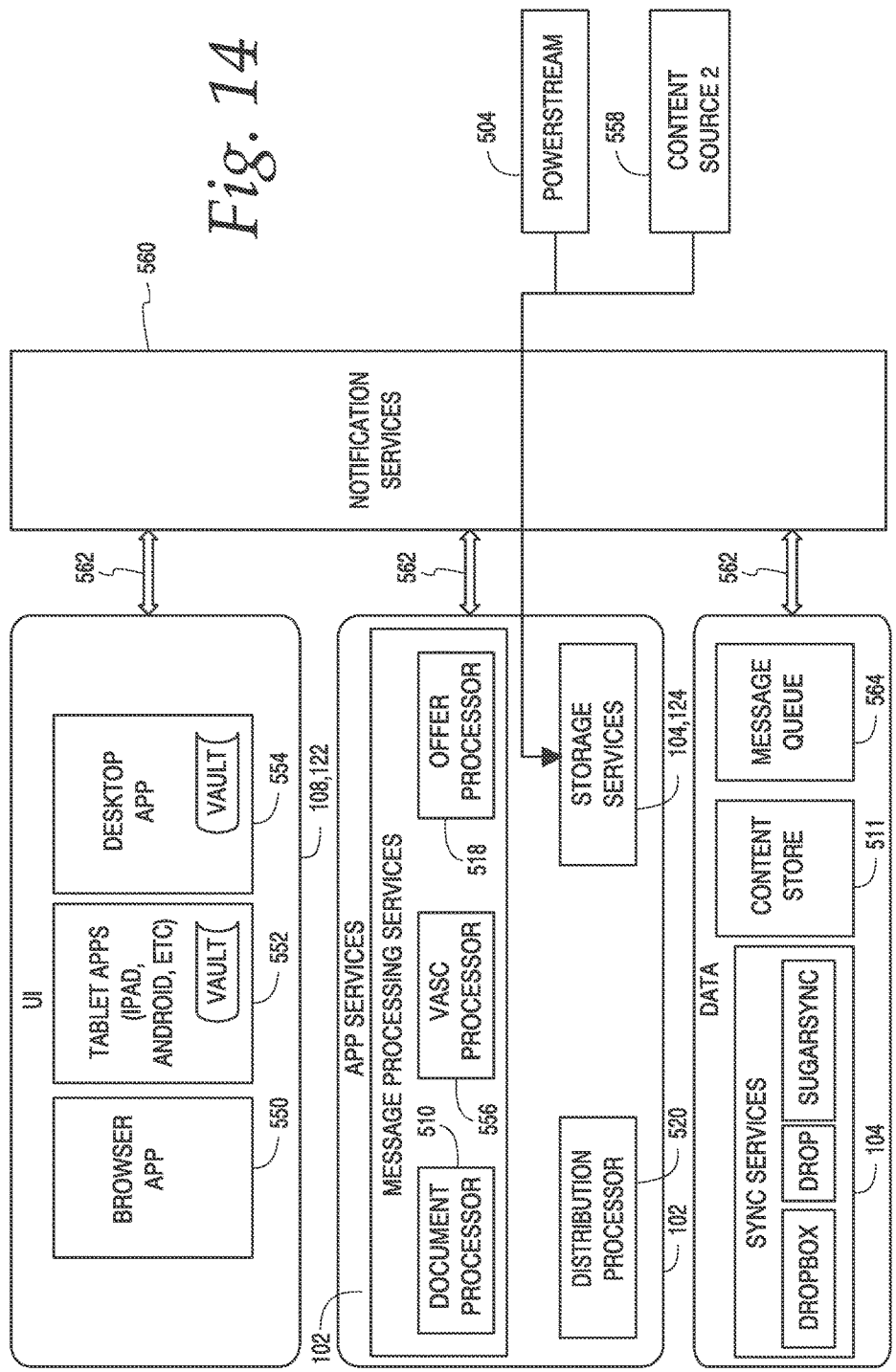
FIG. 14 is a block diagram of example logical architecture for the example systems and methods disclosed herein.

FIG. 14 illustrates example logical architecture for the example systems and methods disclosed herein. The architecture is logically separated into multiple tiers, and the key components in the system are implemented as a service over published end points to keep the system loosely coupled and enable the system to scale as much and where necessary. As noted above, the interface 122 at the recipient 108 device may include an app to access the example system(s) disclosed herein including, for example, a browser app 550, tablet app 552, desktop app 554 or any other suitable app developed for a recipient device. The content provider 102 runs an app service, for example, at the hub 120 that provides many of components and services described above. In addition, the content provider 102 operates a value added service capable (VASC) processing unit 556 that provides services related to tagging content with metadata. Also, as noted above, content enters the system through the content generator 504 (which may intake content from a third party and/or a client and not necessarily 'generate' the content). Additionally or alternatively, in some examples, the content may be provided by a secondary content source 558.

The system also includes notification services 560 that facilitate communication between the components and/or the tiers in the system. Communications occur over a bus 562 and enable for a publish-subscription ("pub-sub") architecture. In some examples, the system scales at an internet level and is designed to handle failures. Thus, key communication happens over the bus (a combination of multiple queues and notifications) and enables the system to recover from a failure of any component at a given point in time. For example, when component 1 wants to invoke a function in component 2, instead of directly calling component 2, component 1 places a message on the bus 562 in, for example, a message queue 564. The notification services 560 then notifies, via the bus 562, component 2 of which there could be multiple instances running. One of the instances will process the message. If the instance that processes the message dies before completing the process, the message will be returned to the queue 564.

The bus 562 may be implemented in different ways that are reliable, scalable and tolerant to hardware failure. In addition, the example system enables components to publish a message under a specific context (e.g., the queue 564). The system also enables components to receive a message based on a certain context and filter criteria, provides a reliable message box, is scalable efficiently to handle hundreds or a few thousands of messages in an hour, and/or communicates over standard protocols like HTTP.

In addition, in some examples, setting up an enterprise bus involves high cost from setup, maintenance and infrastructure perspectives. To keep costs low and enable a faster entry to market, some example systems may use third party web services such as, for example, Amazon's web services (AWS) including the Amazon Simple Queue Service (SQS) and the Amazon Simple Notification Service (SNS). During operation, any service wishing to send a message may publish a message conforming to a pre-defined schema. Any service wishing to subscribe to a message type may poll a specific queue periodically and then act depending on the results of the poll. Also, in a different implementation option, the subscribers can listen to a specific notification from SNS and not poll periodically. In such examples, whenever a message is published, a notification will be generated by publishers or content providers calling a service that will abstract out the details of publishing to a queue and then raise a notification. In addition, this example helps the system capture any business process in the form of either automated or human workflows.

Figure 15:
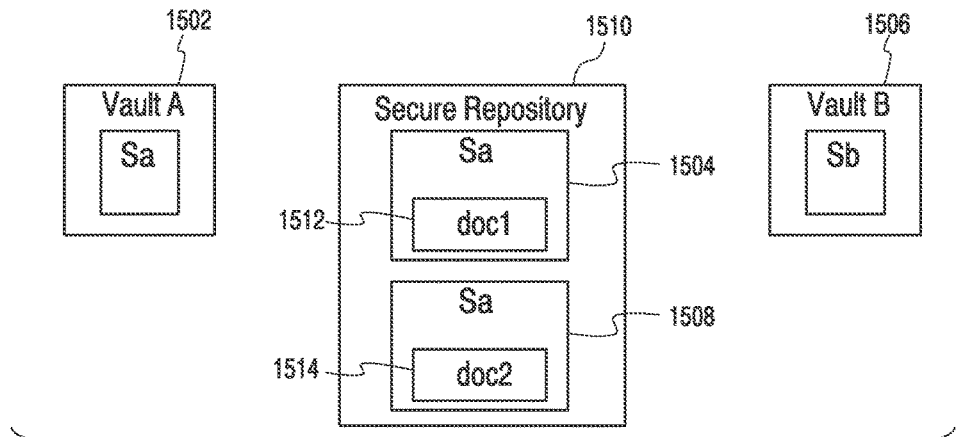
FIG. 15 is a block diagram of an example lockbox feature.

FIG. 15 provides further details of an example lockbox feature. The lockbox feature enables recipients to store documents in an encrypted form that is accessible only by that recipient. No one else, including the content provider (e.g., 102) is able to decipher this encrypted content. The example system assumes that there is no need for these documents to be available online, nor do the documents need to be shared with other trusted viewers/recipients. In some examples, the documents are be encrypted on the device and stored locally at the recipient. The sync providers, if available, can then sync the documents to other devices of the recipient. In those examples where a sync provider is not available for the recipient, the document is saved on the server to be made available to the other devices of the recipient. If the document is stored on the server, the document is stored in an encrypted form, a key is created based on the password for lockbox, and the document is encrypted on the device using an algorithm such as, for example, the AES algorithm (symmetric). The encrypted document is then posted to the server. When the document is to be viewed, the encrypted document is pulled from the server and then decrypted using the same algorithm and key.

The lockbox feature of FIG. 15 shows that a first recipient 1502 (e.g., Vault A) includes a decryption key, Sa 1504. A second recipient 1506 (e.g., Vault B) includes a second decryption key, Sb 1508. In this example, the first and second recipient 1502, 1504 may be the same entity using different lockboxes or different levels of security. In some examples, these are different entities. A lockbox 1510 (e.g., secure repository) stores a first document 1512 that is encoded with the first encryption Sa and a second document 1514 that is encoded with the second encryption Sb. The first recipient 1502 is able to view the first document 1512, while the second recipient 1506 cannot. Likewise, the second recipient 1506 is able to view the second document 1514, while the first recipient 1502 is not. The first recipient 1502 may enable the second recipient 1506 to view the first document 1512 by sharing the encryption key Sa.

Figure 16:
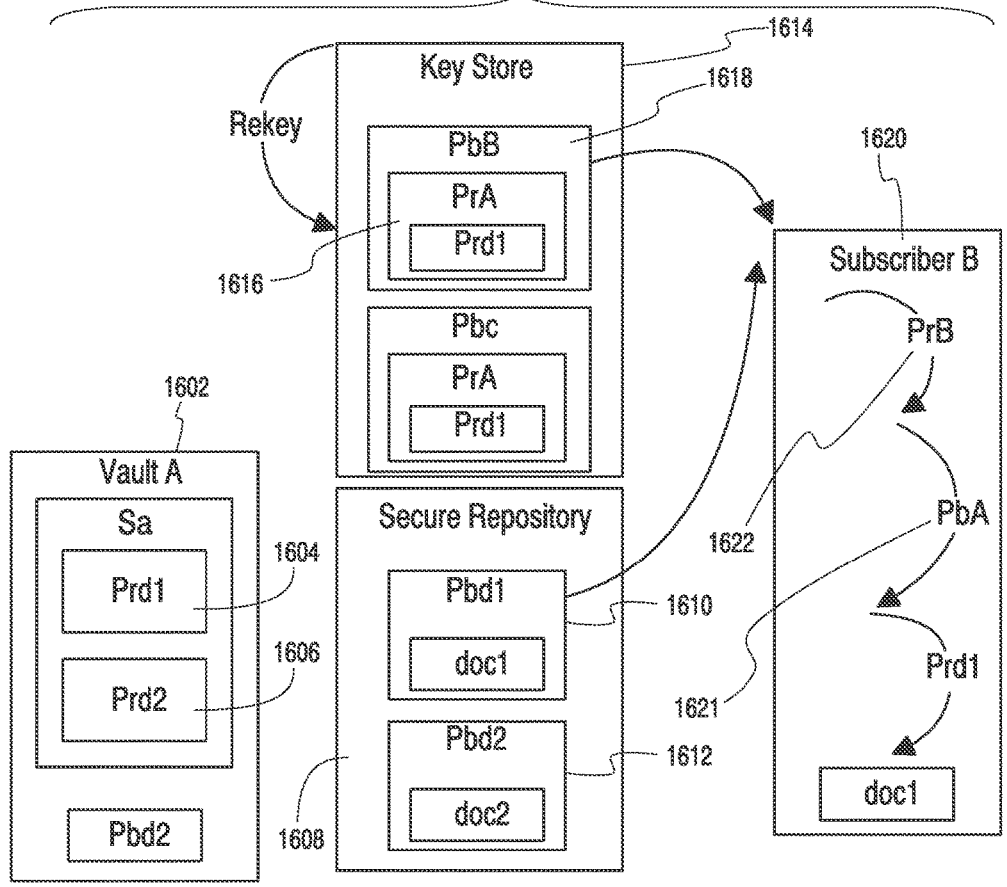
FIG. 16 is a block diagram of an alternative example lockbox feature.

If the recipient chooses to change the lockbox password, the encrypted documents are decrypted and then re-encrypted with the new password and new encryption key. This process is wrapped in a reliable compensating logic so the documents are not lost. FIG. 16 and Equation 1 below show the operation of the lockbox with a password change.

$$S_a(doc1) \xrightarrow{S_a} doc1 \xrightarrow{S_a^1} S_a^1(doc1) \qquad \text{Eqn. (1)}$$

When the recipient decides to change his or her password for the lockbox, each document is transformed in accordance with Equation (1). $S_a$ represents the old password, and $S_a^1$ represents the new password.

A different approach as shown in FIG. 16 is used where there is a need to share documents with one or more other recipient(s). The approach shown in FIG. 16 includes not only encryption of the documents, but also key management of the documents. A first recipient 1602 (e.g., Vault A) includes a first private key for a first document 1604 (e.g., Prd1) and a second private key for a second document 1606 (e.g., Prd2). The private document keys are unique for each document. A lockbox 1608 (e.g., secure repository) includes a first public key 1610 (e.g., Pbd1) for the first document 1604 and a second public key 1612 (e.g., Pbd2) for the second document 1606. A key store 1614 manages what keys, public and private, are mapped to what documents and what keys are mapped to what recipients. For example, there is a first private key 1616 (e.g., PrA) for subscriber or recipient A (i.e., the first recipient), and a second private key 1618 (e.g., PrB) for subscriber or recipient B 1620 (i.e., a second recipipent). The recipient private key is unique for each recipient. There is also a first public key 1621 (e.g, PbA) for the first recipient 1602, and a second public key 1622 (e.g., PbB) for the second recipient 1620. A specific combination of keys is required for a recipient to view a document. For example, in this example, the second recipient 1620 needs the second private recipient key 1618, the first public recipient key 1620 and the first private document key 1604 to view the first document.

Figure 17:
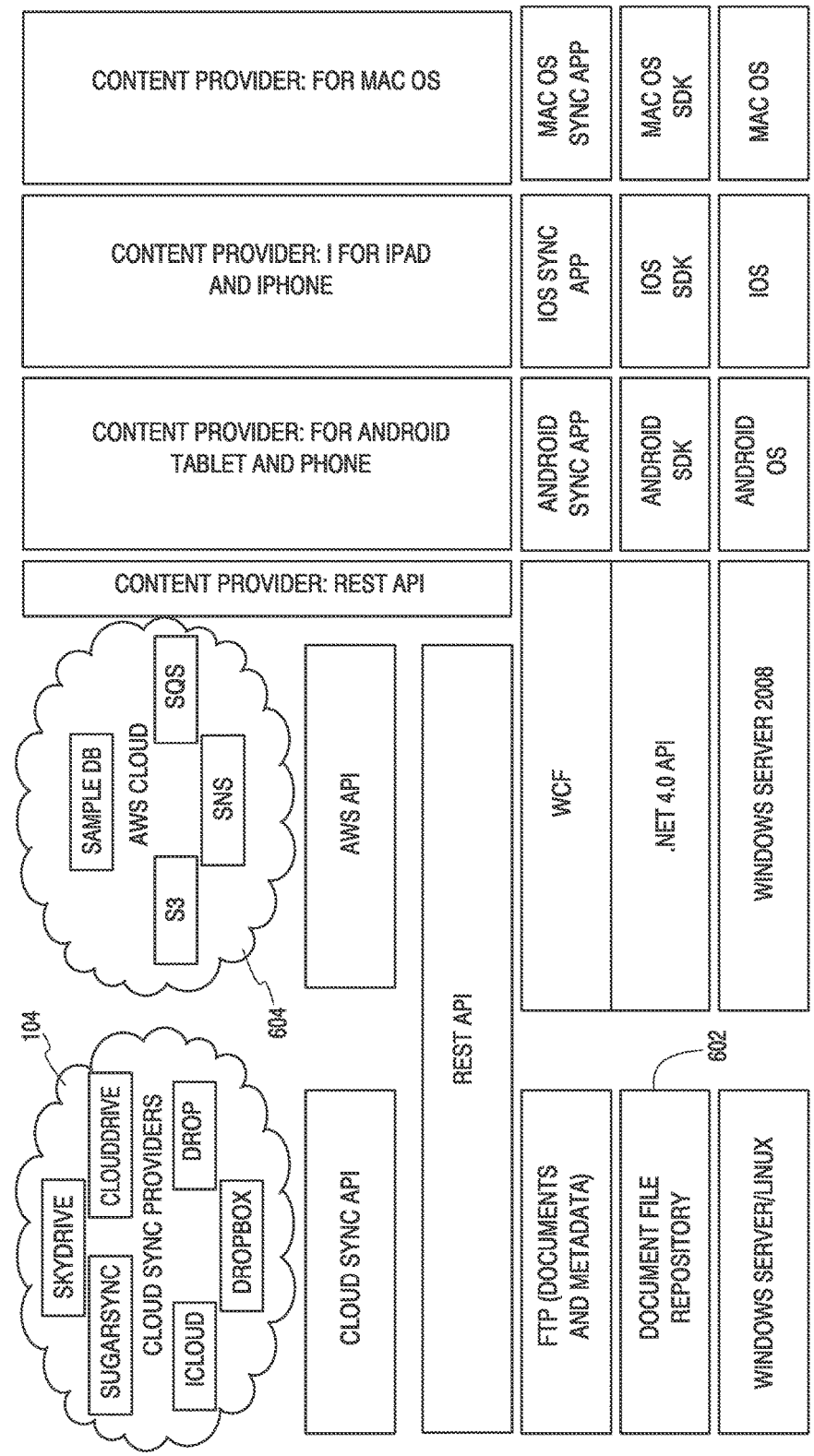
FIG. 17 is a block diagram of example system architecture.

FIG. 17 shows another example outline of system architecture. Many of the features of FIG. 17 have been described above and will not be repeated here. The example system includes a document file repository 602. Documents and/or other content produced by the content provider are available from the document file repository. The documents and/or other content are available over file transfer protocol (FTP). In some examples, the content generator 504 (FIG. 13) makes these documents and/or other content and the related metadata available in a standard format.

The example system also includes the storage system or cloud sync providers 104, which enable a recipient to sync his/her document(s) and/or other content across multiple devices seamlessly without user/recipient interaction. The storage system 104 includes support in terms of access with the API. The example system further includes representational state transfer (REST) services, where the different components communicate over HTTP in a RESTful manner (i.e., in a manner that is compliant with REST constraints). In such examples, communication is kept simple though there are multiple sub-systems that are involved in this example system.

The example system may also incorporate third party web services 604 such as, for example, the AWS services described herein, which are a set of services from AWS that include, for example, storage services such as, for example, S3 and Simple DB for storage of data and metadata, SQS for managing messages and SNS for notification services. The example system also includes sync apps to install the applications of the sync providers, which are targeted to different operating systems and devices.

Figure 18:
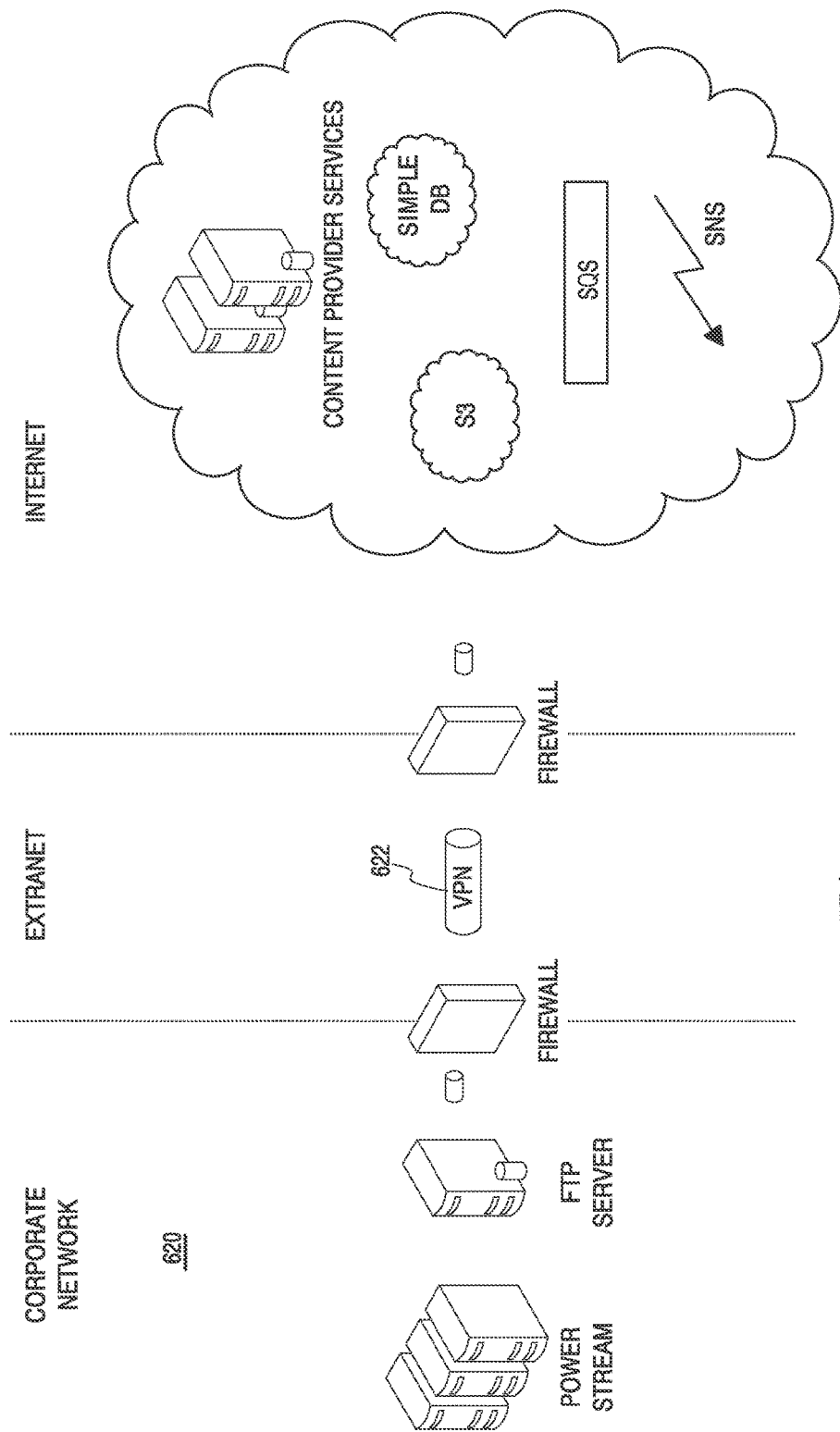
FIG. 18 is a block diagram of example deployment architecture.

FIG. 18 provides a schematic overview of example deployment architecture of the example system. The architecture assumes that the content generator and/or provider 504 is on a corporate network 620 and a virtual private network (VPN) tunnel 622 will be enabled by the security team for the services in the cloud to interact with. The services do not need to interact with the actual content generator 504. Rather, the services are able to subscribe to the documents, metadata and notifications published by the content generator 504.

Figure 19:
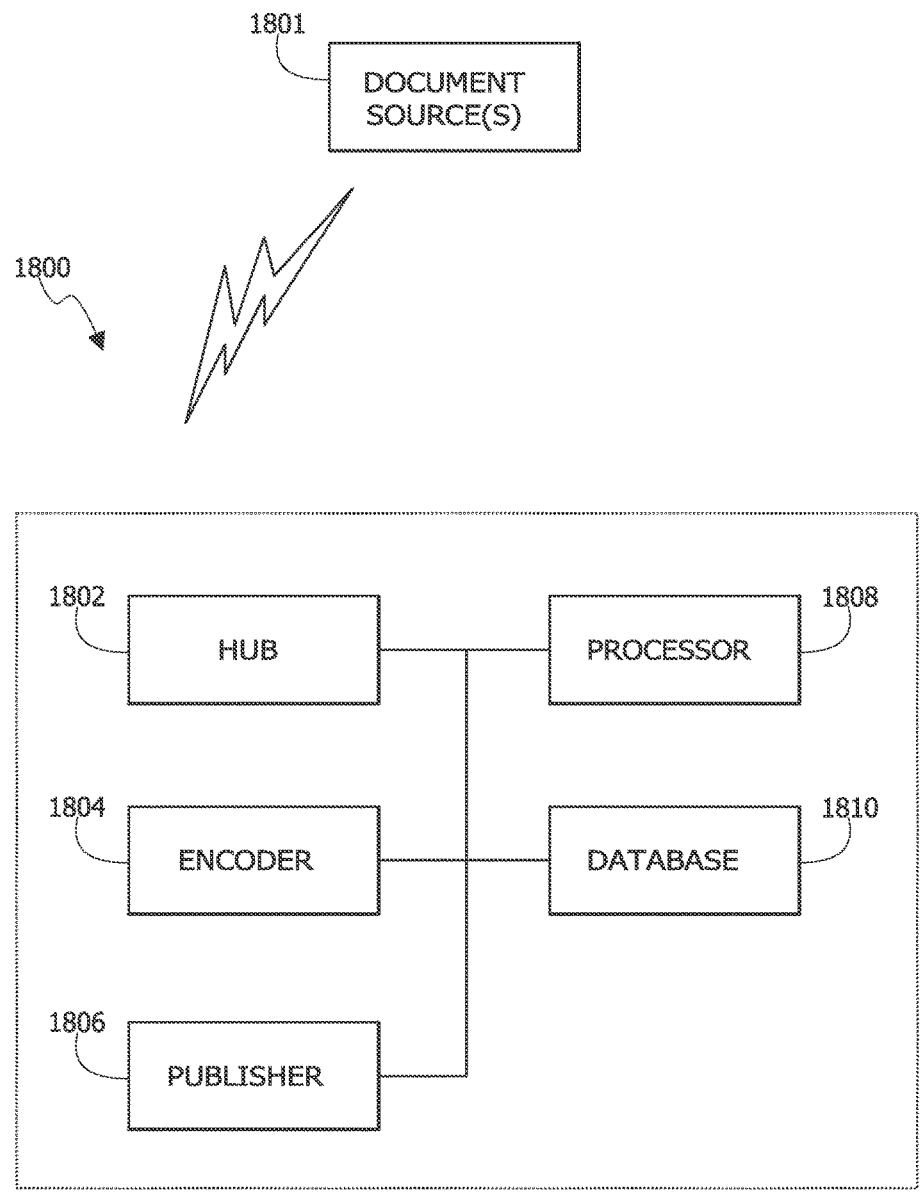
FIG. 19 is an example block diagram of an example system to implement the examples disclosed herein.

FIG. 19 shows an example system 1800 including one or more content or document source(s) 1801, a hub 1802, which may be incorporated with the content provider disclosed above, an encoder 1804, a publisher 1806, a processor 1808 and a database and/or a data store 1810.

In the example system 1800, the hub 1802 receives a document from a first and/or second document source 1801. In some examples, the first document source may be a bank and the second document source may be a phone company. The document may be a bill, a statement, an offer, a publication, etc. The processor 1808 determines the document type and classifies the document with a tag and/or maps the document based on the type of document received. For example, if the document is a bill, the document may receive a first tag and, if the document is a magazine, the document may receive a second tag. The example processor 1808 identifies the intended recipient and classifies the document with another tag and/or maps the document based on the intended recipient.

In some examples, the example processor 1808 scans the document and/or extracts and/or maps data from the first document based on first content of the first document. In some examples, the example encoder 1804 encrypts the document and/or the data, etc., and the example publisher 1806 publishes the document for receipt by the intended recipient. The example encoder 1804 also may be used to implement the example lockbox, encryption and security features disclosed above. In some examples, the processor 1808 performs an analysis on the first document, the first data and/or data from multiple documents. In some examples, the example processor 1808 generates a report associated with the analysis. The report may include spending habits of the recipient, trends, and/or other desired metrics, analysis, data, etc.

Prior to granting access to the document and/or the data, the example processor 1808 verifies the identity of the intended recipient. The processor 1808 may verify the identity of the recipient by, for example, the recipient's access device, password, etc. associated and/or entered by the recipient.

In some examples, the hub 1802 receives and grants a request from the recipient to modify the presentation of the document(s) and/or the data. For example, the recipient want additional or alternative analysis or data presented and/or may want additional or alternative features displayed on the user interface. The processor 1808 is used to implement any such modification requests.

The example database 1810 is used to store the documents and data described herein. In some examples, the example database 1810 is a cloud storage as disclosed herein.

While an example manner of implementing the example content delivery systems is illustrated in FIGS. 1-19, one or more of the elements, processes and/or devices illustrated in FIGS. 1-19 may be combined, divided, re-arranged, omitted, eliminated and/or implemented in any other way. Further, the example elements, devices and/or systems of FIGS. 1-19 may be implemented by hardware, software, firmware and/or any combination of hardware, software and/or firmware. Thus, for example, any of the example elements, devices and/or systems of FIGS. 1-19 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example elements, devices and/or systems of FIGS. 1-19 are hereby expressly defined to include a tangible computer readable storage device or storage disc such as a memory, DVD, CD, Blu-ray, etc. storing the software and/or firmware. Further still, the example content delivery systems disclosed herein may include one or more elements, processes and/or devices in addition to, or instead of, those illustrated in FIGS. 1-19, and/or may include more than one of any or all of the illustrated elements, processes and devices.

Flowchart representative of example machine readable instructions for implementing the example content delivery systems of FIGS. 1-19 are shown in FIGS. 20-31. In this example, the machine readable instructions comprise a program for execution by a processor such as the processor 1012 shown in the example processor platform 1000 discussed below in connection with FIG. 34. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 20-31, many other methods of implementing the example content delivery systems alternatively be used. For example, the order of execution of the blocks may be changed, and/or some of the blocks described may be changed, eliminated, or combined.

As mentioned above, the example processes of FIGS. 20-31 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 20-31 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

Figure 20:
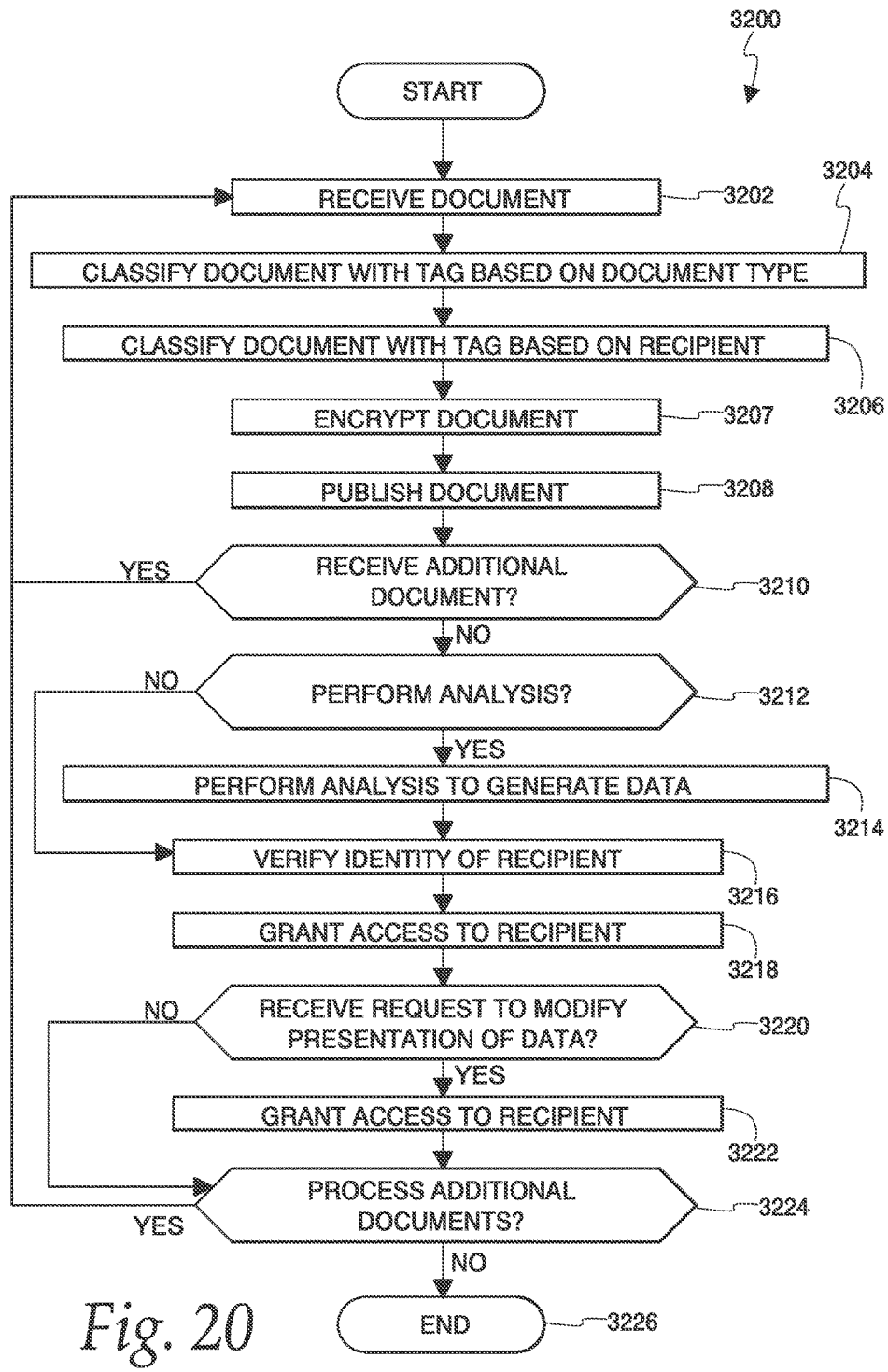
FIG. 20 is an example flow chart of an example process to implement the examples disclosed herein.

FIG. 20 shows an example method 3200 publishing and/or providing access to content in accordance with the teachings of this disclosure. The example process 3200 includes receiving a document (block 3202). In some examples, the document is received from a first document source. Also, in some examples multiple documents are received from the first document source or from different document sources. The example process 3200 includes determining the document type and classifying the document with a tag and/or mapping the document based on the type of document received or the content of the document (block 3204). For example, as noted above, if the document is a bill, the document may receive a first tag and, if the document is a magazine, the document may receive a second tag. The example process 3200 also includes identifying the intended recipient and classifying the document with another tag and/or mapping the document based on the intended recipient (block 3206).

In some examples, the example process 3200 includes encoding or encrypting the document and/or the data parsed or extracted from the document (block 3207). The document and/or data may be encrypted such that the document and/pr data is only viewable by the intended recipient. In addition, the example process 3200 includes publishing the document for receipt by the intended recipient (block 3208.

The process 3200 determines if additional documents/ content are received (block 3210). If additional contents/ documents are received, the process continues with receiving the document (block 3202). If additional documents/ content are not received (block 3210), the process 3200 determines if analysis of the documents and/or any data contained therein or parsed or extracted therefrom is to be performed (block 3212). If analysis of the documents, content and/or data is to be performed (block 3212), such analysis is performed (block 3214). The results of such analysis may be presented as raw data, synthesized data, one or more reports and/or calculations and/or other value-added metrics, data, actionable insights, information, etc.

If the analysis is not to be performed (block 3212), or after the analysis is performed (block 3214) the process 3200 progresses to recipient verification (3216). Prior to granting access to the document and/or the data, the example process 3200 verifies the identity of an intended recipient (block 3216). This ensures that any confidential and/or otherwise sensitive information is only shared with the intended recipient. The processor 1808 may verify the identity of the recipient by, for example, the recipient's access device, password, etc. associated and/or entered by the recipient (block 3216). The process of verifying an identity of an intended recipient (block 3216) may occur earlier in the process 3200 and/or concurrently with other elements of the process 3200. With the identity of the recipient verified (block 3216), the recipient is granted access to the document, content, data and/or analysis (block 3218).

In some examples, the example process 3200 receives a request from the recipient to modify the presentation of the document(s) and/or the data (block 3220). If the process 3200 determines that a modification request is received (block 3220), the process 3200 implements the modification and grants access to the recipient to the modified presentation (block 3222). After modification (block 3222) or if no modification request is received (block 3220), the example process 3200 determines if there are additional documents to process (block 3224). If there are additional documents to process (block 3224), the example process 3200 returns to receive the document (block 3202). If there are not additional documents to process (block 3224), the example process 3200 ends (block 3226).

Figure 21:
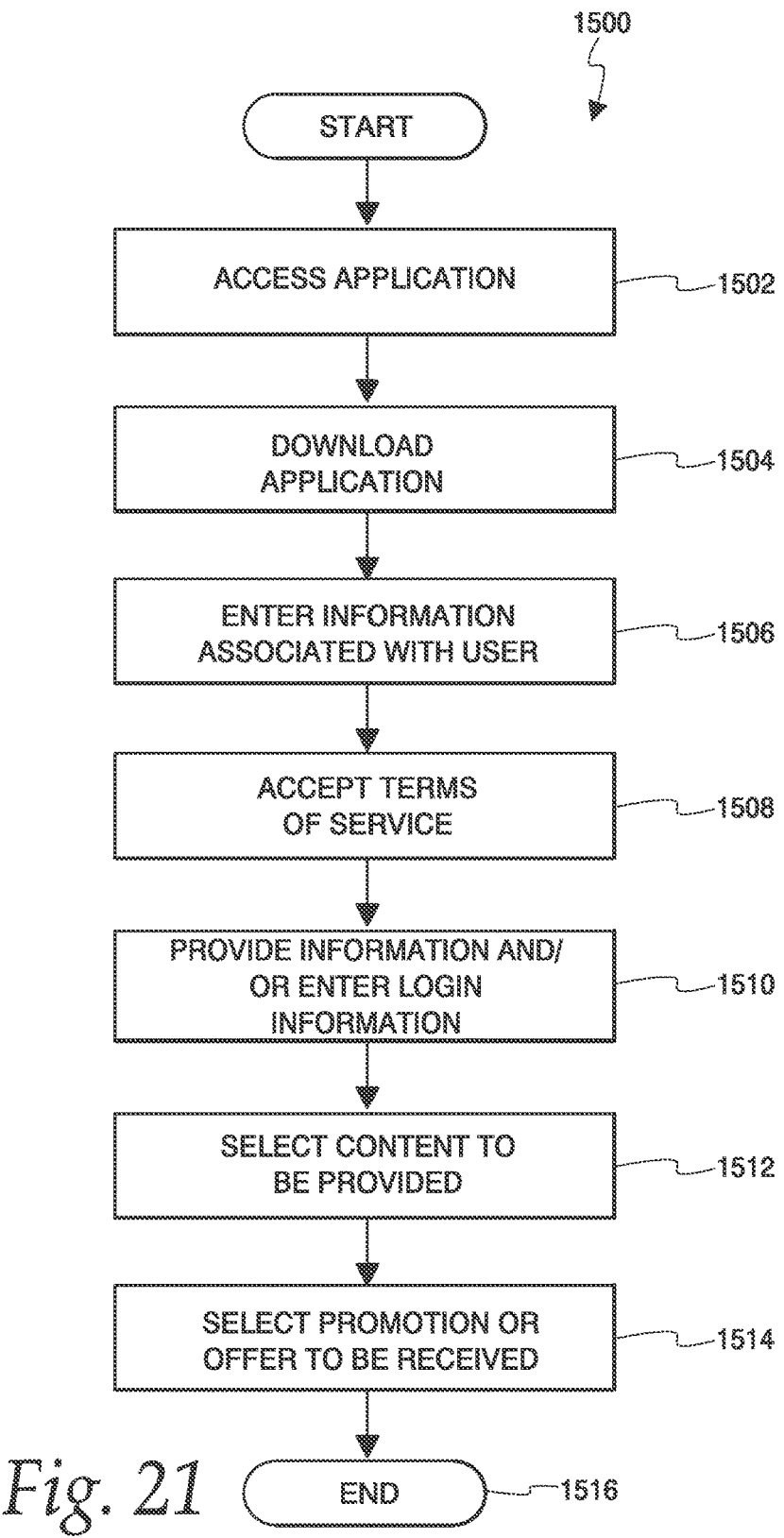
FIG. 21 is a flow chart representing an example user or recipient registration process in accordance with the teachings of this disclosure.

FIG. 21 shows an example method 1500 of registering a user or recipient 108 for the content delivery systems disclosed herein. The recipient 108 accesses the app via, for example, a uniform resource locator (URL), a quick response (QR) code or any other gateway to otherwise access the content delivery system app (block 1502). The recipient 108 then downloads the app to his or her one or more devices (block 1504). The recipient 108 enters personal information including, for example, one or more of name, username, address, password, etc. (block 1506). The recipient 108 then reviews and accepts the terms and conditions of the app (block 1508). The recipient 108 then provides the information (e.g., cloud name and/or address, username, password and/or other credentials) for the storage system 104 that the recipient 108 uses or wants to use (block 1510).

In addition, the recipient 108 selects the content provided by the content provider 102 that the recipient 108 desires to view, transmit or otherwise use with the example system 100 (block 1512). For example, if the content provider 102 provides the recipient 108 with bank statements, bills or other documents from various organizations, the recipient 108 may select those banks, utilities and/or other organization(s) for receipt of the related content through the example system 100. Thus, instead of, for example, receiving a bank statement via physical postal delivery or electronic mail, the recipient 108 would receive the content via the example system 100. In some examples, the recipient 108 may elect for the content provider 102 to provide content via the example system 100 even if the content provider 102 had not previously provided such content to the recipient 108 via the system 100 or via any other medium.

Also, in some examples, the recipient 108 is requested to select one or more promotions or other offers, if any, that the recipient 108 would like to receive (block 1514). Such examples may incorporate a GPS or other location identification service that determines a recipient's location and, based on such location, pushes location-specific offers, coupons, reminders or other content to the recipient 108. After the requested information is provided, the example process 1500 ends (block 1516).

Figure 22:
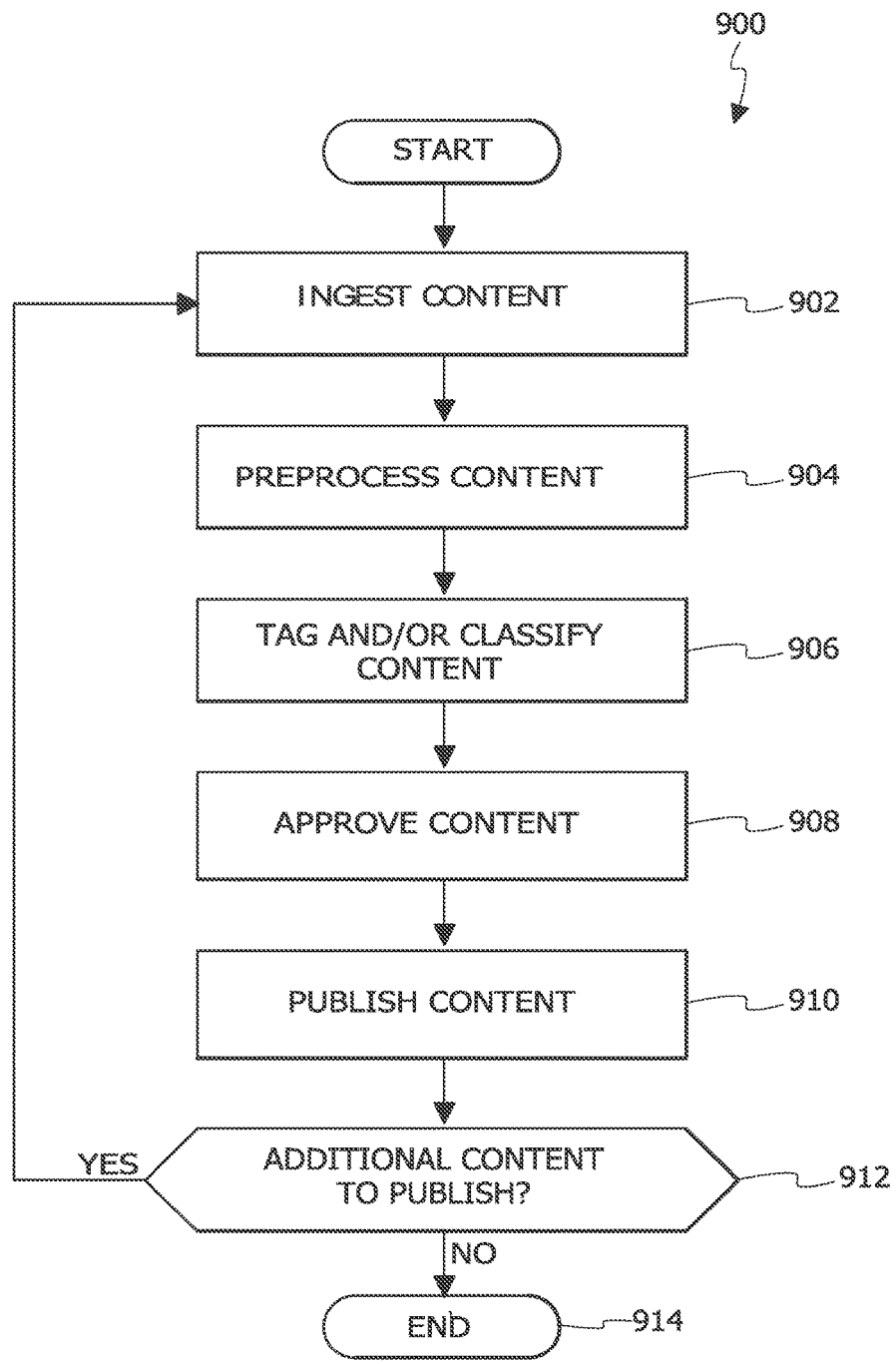
FIG. 22 is a flow chart representing an example process for publishing content in accordance with the teachings of this disclosure.

FIG. 22 illustrates an example process 900 for publishing content. As shown in FIG. 22, content is ingested (block 902) from, for example, the recipient 108, the content provider 102 or any other third party document source including, for example, document publishers and/or content delivery companies. Ingesting the content (block 902) includes authenticating the content, encrypting the content and/or staging the content for further processing. The example process 900 also includes preprocessing (block 904). Preprocessing the content (block 904) includes data validation and categorization of the content including sorting or grouping the content. The content may also undergo enrichment, transformation and/or analysis in preprocessing (block 904). FIG. 22 also shows that the example process 900 includes tagging and/or classification of the content (block 906). The content is tagged with metadata that details attributes or characteristics of the content, portion of the content, attributes related to the recipient, attributes related to the devices with which the recipient accesses the content and/or any other suitable information or characteristics. In some examples, the content is also indexed to facilitate access to the content.

The example process 900 also includes approval (block 908) of the content and the processing of the content and/or metadata. In addition, the example process 900 includes publication (block 910). With publication, the content may be transformed, synchronized, and made available for viewing by the recipient. The example process 900 also determines if there is additional content to be processed for publication (block 912). If there is additional content, the example process 900 returns to block 902 to ingest the additional content. If there is no additional content, the example process ends (block 914).

Figure 23:
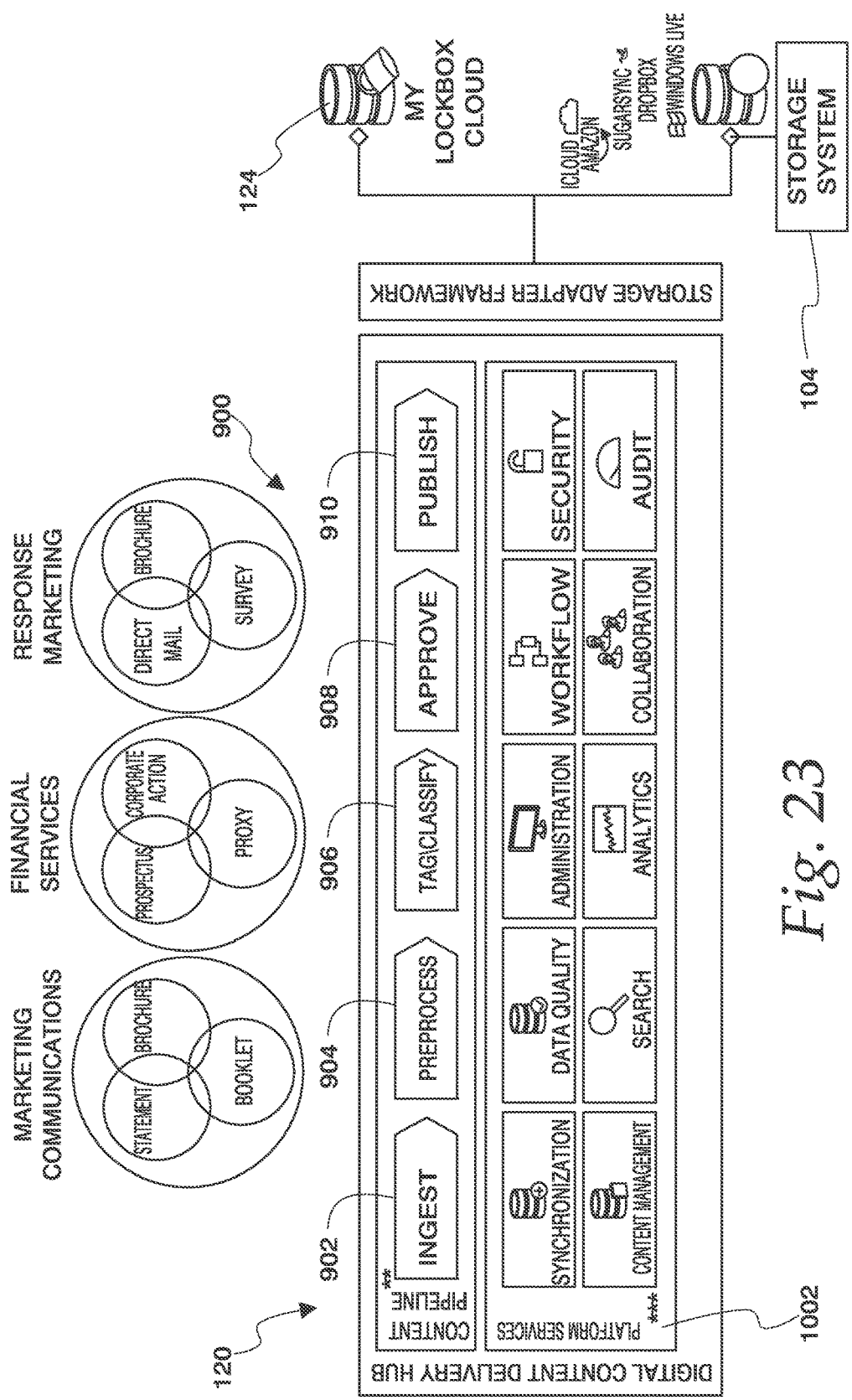
FIG. 23 illustrates additional details of the example process of FIG. 22.

FIG. 23 shows additional example details of the example process 900. For example, FIG. 23 shows that content including, for example, marketing communications, financial services and/or response marketing, may be processed according to the example process 900 at the example hub 120. Many of the example stages of the process 900 are managed by a platform services layer before the content is pushed or otherwise transmitted to the storage system 104 and/or lockbox 124. In some examples, the platform layer services manages and/or executes many functions including, for example, content synchronization, content management, data quality control, searching features, administrative tasks, content and/or data analysis, workflow management, collaboration, security, access control, reporting functionality, auditing, intelligent tagging, application of location based service codes, sorting and/or pushing content. In some examples, the example hub 120 manages and/or executes general information technology services including, for example, logging, content management, metadata management, workflows, data conversions and content publishing.

Figure 24:
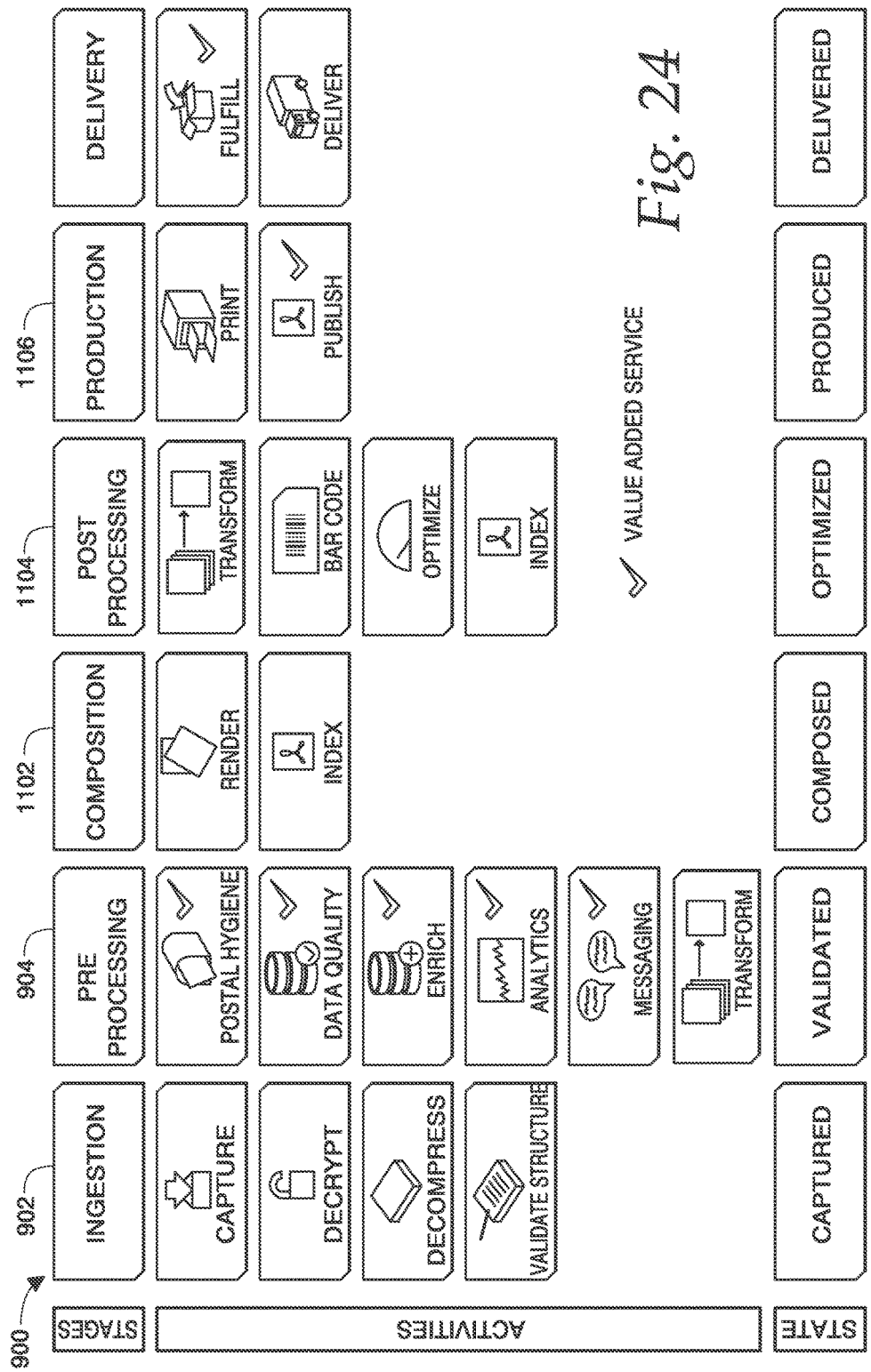
FIG. 24 illustrates additional details of the example process of FIG. 22.

FIG. 24 shows further details of the example process 900 including details of enterprise content management, which manages publishing activity. As shown in FIG. 24, the ingestion stage (block 902) includes the capturing, decrypting, decompressing and validating the structure of content. The ingestion stage results in captured content. The preprocessing stage (block 904) includes postal hygiene services, data quality control, enrichment of the content, and analysis of the content or portions thereof. The preprocessing stage results in validated content. The example process 900 also includes composition of the content (block 1102). During composition, content or portions thereof are rendered and/or indexed. The result of the composition stage is composed content. The example process 900 also include post processing (block 1104) during which content is transformed, optimized and indexed. Indexing may occur throughout the process 900. In some examples, indexing includes associating an identification code (e.g., a digital bar code or signature), with content or portions of content to facilitate identification and access of the content. The result of the post processing stage is optimized content. The example process 900 also includes a production (block 1106) which may include printing content or portions of content and the publication stage (block 910). In addition, as shown in FIG. 24, the example process 900 includes a delivery stage (block 1106), in which the content is delivered. In some examples, production, publication and/or delivery are combined in whole or in part.

Figure 25:
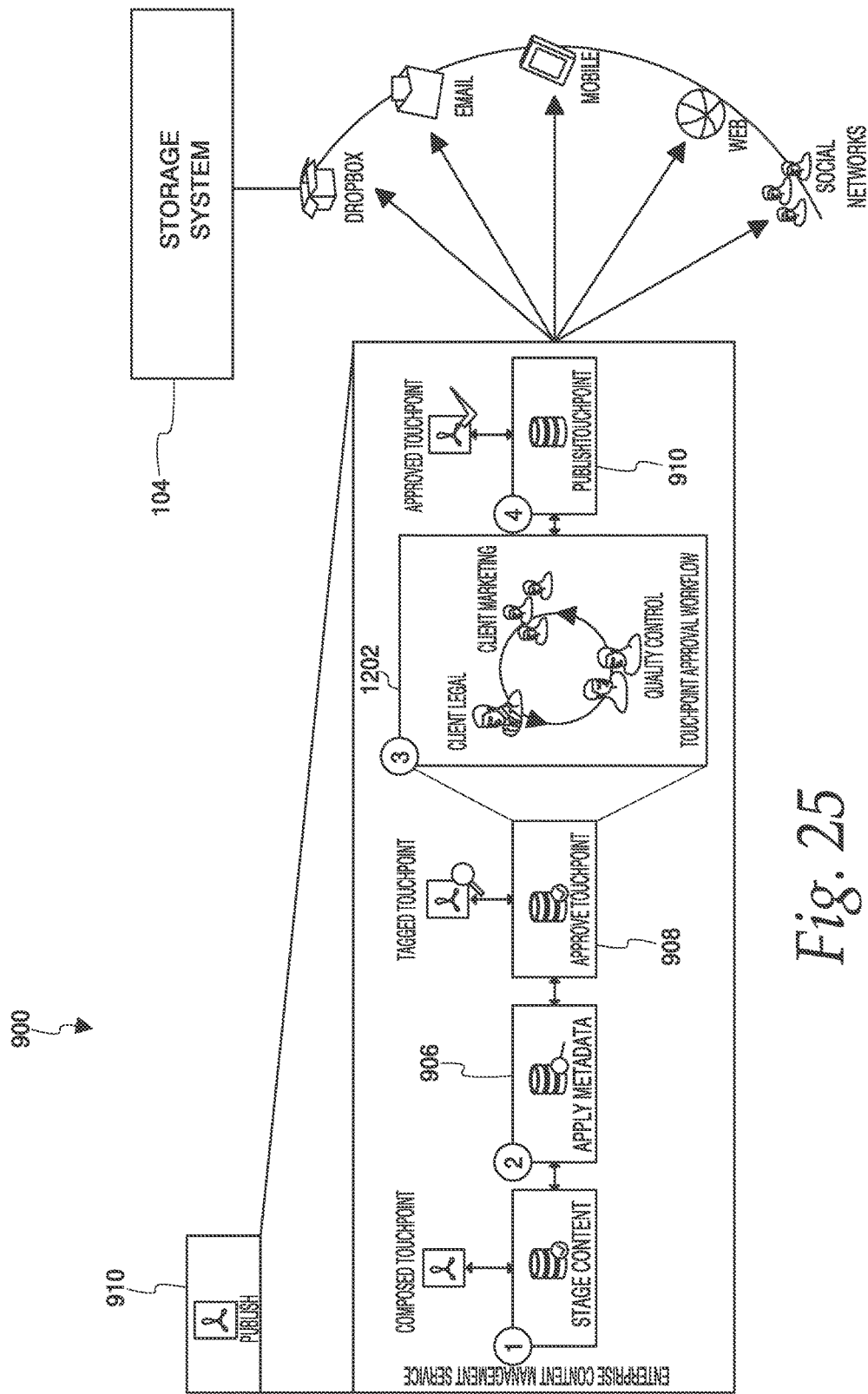
FIG. 25 illustrates additional details of the example process of FIG. 22.

FIG. 25 shows further details of the publication elements of the example processes disclosed herein. As shown in FIG. 25, the result of the production stage is produced content (block 910). The example enterprise content management provides a flexible, reliable secure platform for categorizing, publishing and tracking diverse communication types using configurable work flows. For example, as shown in FIG. 25, the content (e.g., a composed touchpoint) is staged (block 1202) for processing. Metadata is applied (block 906) to the touchpoint to enable search, categorization and analysis. The tagged touchpoint is reviewed and approved (block 908) for quality control and/or compliance with standards and/or other guidelines or requirements by, for example, the content provider 102 and, in some examples, one or more client(s) of the content provider including content producer(s) or organizations otherwise associated with the content. The approved touchpoint is published (block 910) which may include a push, pull or other transmission between the example system and one or more storage system(s) 104, email account(s), mobile device(s), web based recipient(s), social network(s) and/or other recipients using other communication modes.

Figure 26:
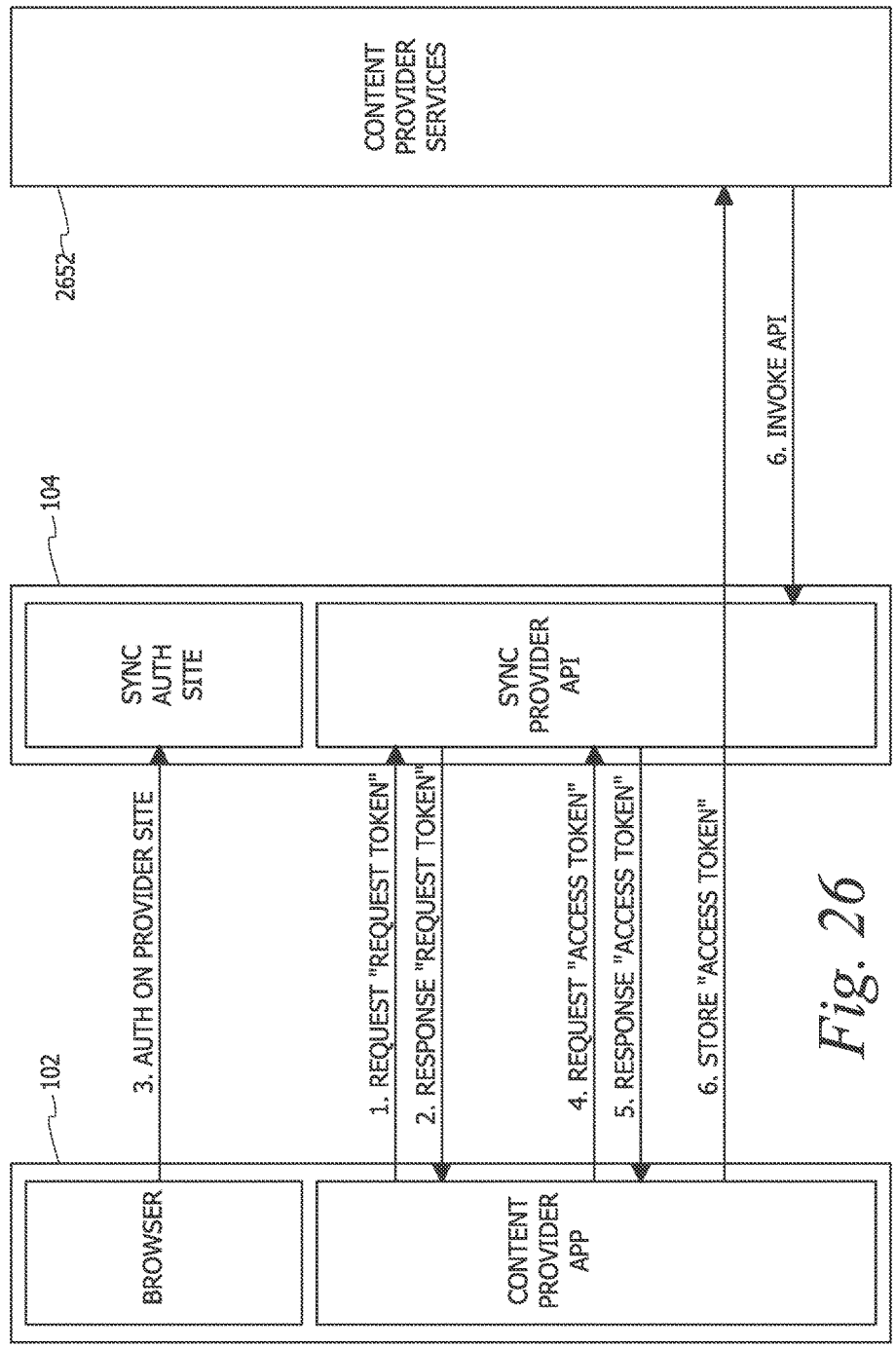
FIG. 26 is a block diagram of example communications with an example third party cloud provider.

FIG. 26 diagrams example communications related to operation with the cloud sync providers. The examples described herein enable recipients to work with content offline where relevant and possible and to continue to work with multiple devices and synchronize content across devices. These features are possible where the apps query the services in the cloud for the desired data. However, to optimize the data pulled over the network, the apps will cache the content locally and use the cached content to render the content to the recipient. Thus, when the device goes offline, the documents that have already been pulled will remain accessible. Further, in those examples where a desired document is to be accessed from a different device, such documents may be pulled again to the other devices automatically. In other words, the content is synchronized across multiple devices of the recipient. Instead of building the entire infrastructure for synchronizing services, the example system disclosed herein and, in particular the app operated by the content provider, leverages commercially available cloud sync providers of third parties such as, for example, DropBox and iCloud. Because these third party sync providers have a high adoption rate, each recipient can link their third party sync account with their respective account with the example content provider to enable the app operated by the content provider to leverage the sync services of the third party provider to which the recipient is subscribed. In addition, use of these third party services relieves the example content provider from having to develop and maintain all of the infrastructure needed to store and manage all of the content.

Specifically, as shown in FIG. 26, a content provider 102 sends a request (e.g., a request token) to the storage system 104 (e.g., the sync provider). The storage system 104 responds, and an authorization on the provider site is send from, for example, a browser of the content provider 102 to a sync authorization site of the storage system 104. An access request (e.g., an access token) is sent from the content provider 102 to the storage system 104, and a response is sent back. The content provider 102 communicates with content provider services (2652) to store the access token. The content provider services 2652 invokes the API.

Figure 27:
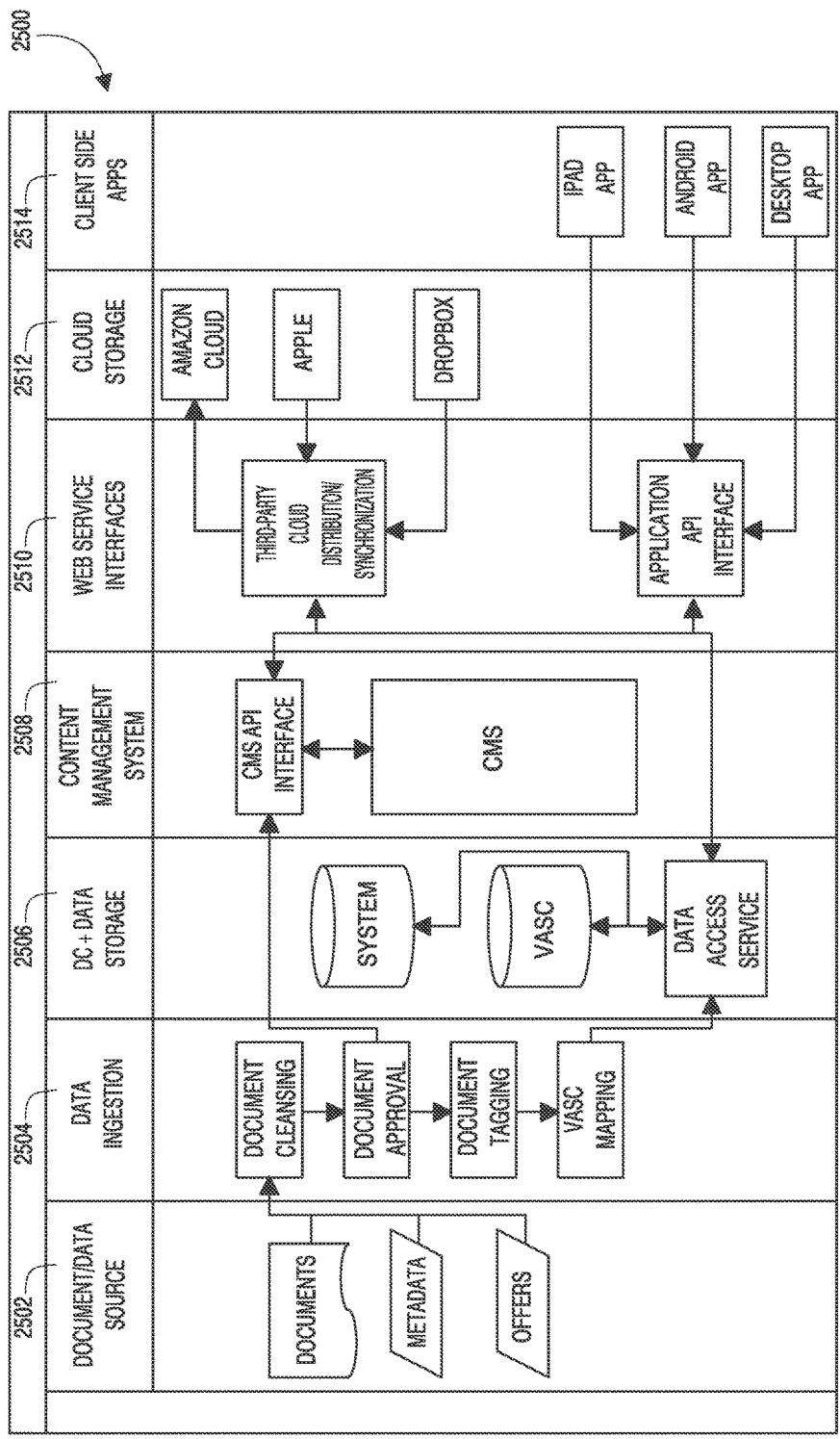
FIG. 27 is a block diagram of an alternative example system and/or process for providing digital content delivery in accordance with the teachings of this disclosure.

FIG. 27 shows a further implementation of an example process 2500 that includes converting documents such as, for example physical mail, into a tagged standard data exchange format that is deliverable to a device (e.g., a mobile device) using a web-enabled application and/or cloud sync technology. In some examples, the tagged data components are accessed, used and/or repurposed by the application features to provide the user and/or recipient with an enriched experience and/or more data than would otherwise be available if the user had received the static document content.

In some examples, the process 2500 provides a web and/or mobile based application that aggregates digital versions of commonly received physically mailed documents and delivers digital content to a digital mailbox application. In some examples, the example process 2500 enables the user to receive such digital content distributions in a secure, centralized location without pulling the information to the digital mailbox application.

In the illustrated example, the process 2500 includes document and/or data source processes 2502, data ingestion processes 2504, data storage processes 2506, content management processes 2508, webservice interfaces 2510, cloud storage processes 2512 and client side applications 2514. In some examples, the example process 2500 presents document-related content originally formatted for physical delivery. In some examples, to provide the user with additional information other than what was initially provided in the static document, the content includes business information, metadata, tags, interaction features, sharing features, analysis features and/or on-line archival features.

Figure 28:
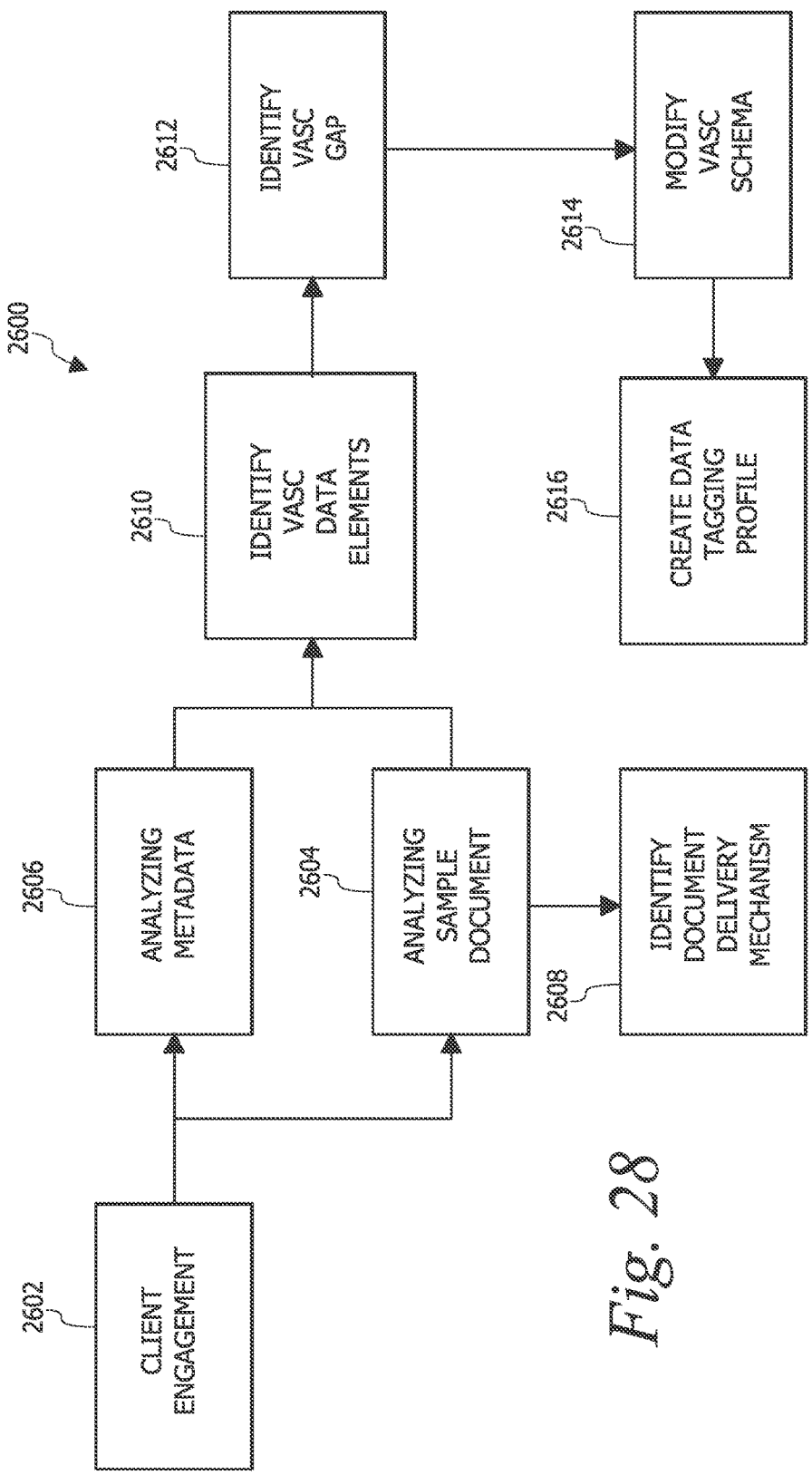
FIG. 28 is a flow chart representing an example process to implement the system of FIG. 27.

FIG. 28 depicts an example content creator registration, content distribution and/or onboarding process 2600. In some examples, the content provider may register as an input source in the example system. The content providers may include the creators of an account-specific document (e.g., a bill, a statement) and/or entities that provide marketing content and/or offers that are distributable using the examples disclosed herein. In some examples, registering enables document-specific content and/or business rules of the entity to be used when converting received documents into a standardized format. In some examples, content of the document is mapped to the associated field to enable the content to be tagged. In some examples, settings of a provider may be stored pending the receipt of content as part of the registration process.

In some examples, the process 2600 includes engaging, i.e., communicating with clients (document sources) (block 2602) to receive documents. The example process 2600 also includes analyzing a sample document 2604 to understand the content items that are available (e.g., parse the document to identify data), understand the relationship of the contents in the document, identify the source of the content items and/or the files format (e.g., a print ready file and/or a data file) and map the content to the existing data structure. The example process 2600 also includes analyzing metadata (block 2606).

In some examples, the process 2600 includes identifying document delivery mechanisms (block 2608), value added (VASC) data elements (block 2610) and gaps in VASC data (block 2612), which may include a mapping process and expanding and/or changing the data structure to include newly identified content item types. In some example, the VASC schema is modified (block 2614). Also, in some examples, a tagging/conversion profile may be created for the specific combination of creator and/or document type (block 2616).

Figure 29:
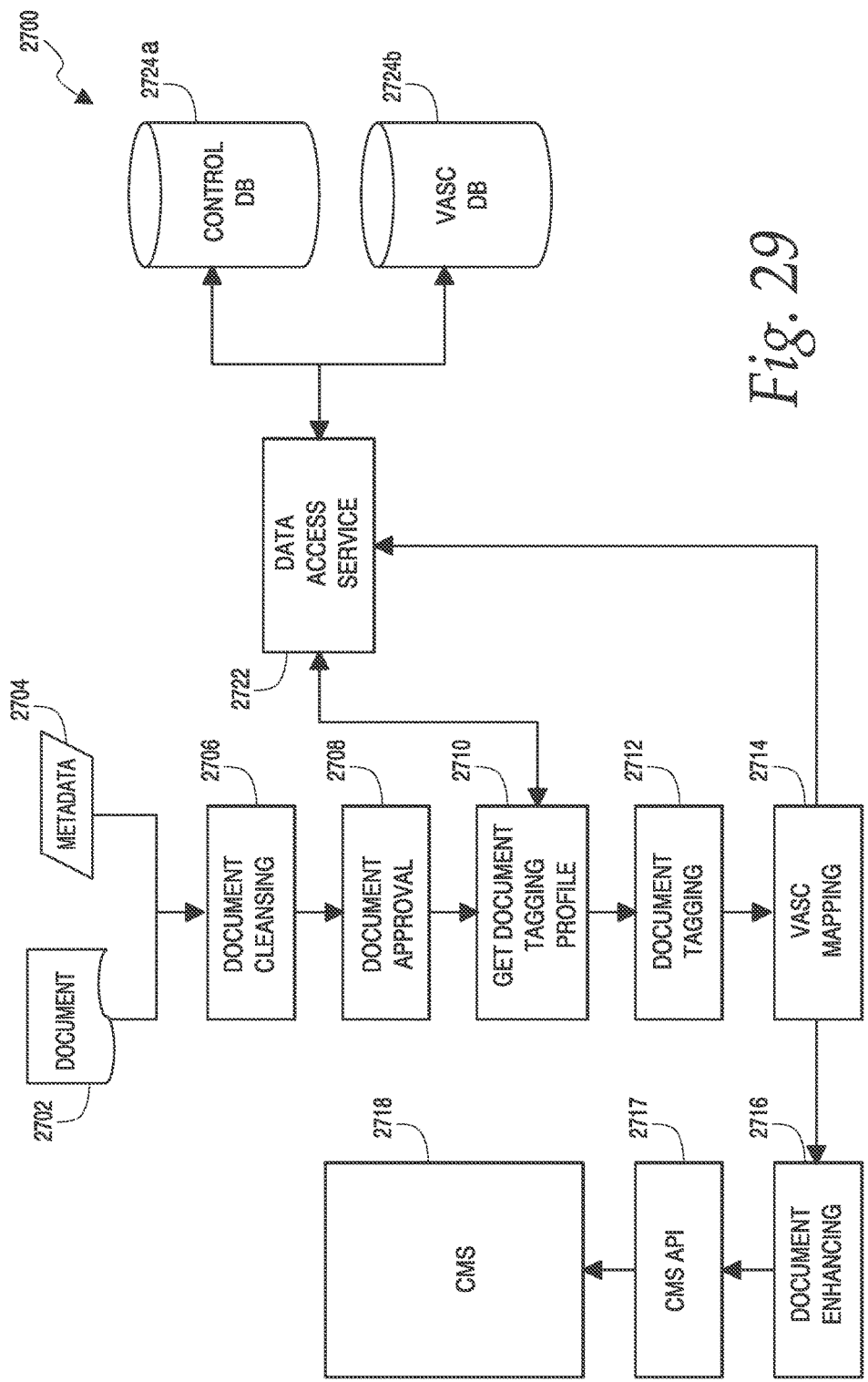
FIG. 29 is a flow chart representing an example process to implement the system of FIG. 27.

FIG. 29 is an example process 2700 by which content is submitted to be distributed via the example distribution methods. In the illustrated example, the process 2700 may be used regardless of the status of the creator and/or sender. In some examples, the process 2700 begins with the receipt of various electronic file types from the creator/sender using any supported data transfer method.

In some examples, after receiving the content (e.g., documents) (block 2702) and/or data (bock 2704), the process 2700 standardizes the content and/or data to ensure the content has been received in the expected format, which may include document cleansing (block 2706) and document approval (block 2708). If the content is approved, the content under goes the onboarding processes described in the process 2600, which may includes, for example, developing or accessing of a tagging profile (block 2710), document tagging (block 2712), VASC mapping (block 2714), and document enhancing (block 2716), content management services API 2717 and/or the content management services 2718. However, if the content is not approved, the content moves to an exception workflow. The approved and processed content is delivered to recipients in accordance with the security/data access features disclosed herein (block 2722) and aspects of then content, data, tagging, etc. are stored (blocks 2724a, 2724b)

In some examples, the content is converted into a data structure and made available to the distribution engine by accessing the document, extracting content items from the document and mapping the content items to the appropriate position in the data structure. In some examples, an identification and/or value may be created and/or associated with the document and the recipient. In some examples, business rules may be used to determine if additional processing takes place. For example, new offers will be linked to any user account that has opted into receiving offers from a sender. In some examples, a data service will determine the recipient of new content.

The data and/or content may be enhanced from the original formatted document to include additional information and/or to enable the data and/or content to be compatible with the data structure. In some examples, the original document is modified to include metadata, etc. associated with the document content. If available, the original document may be loaded for storage and/or user access. The original data, the metadata, etc., may be associated with a key and/or identification code associated with the recipient. The data and/or content may be accessible using any device.

Figure 30:
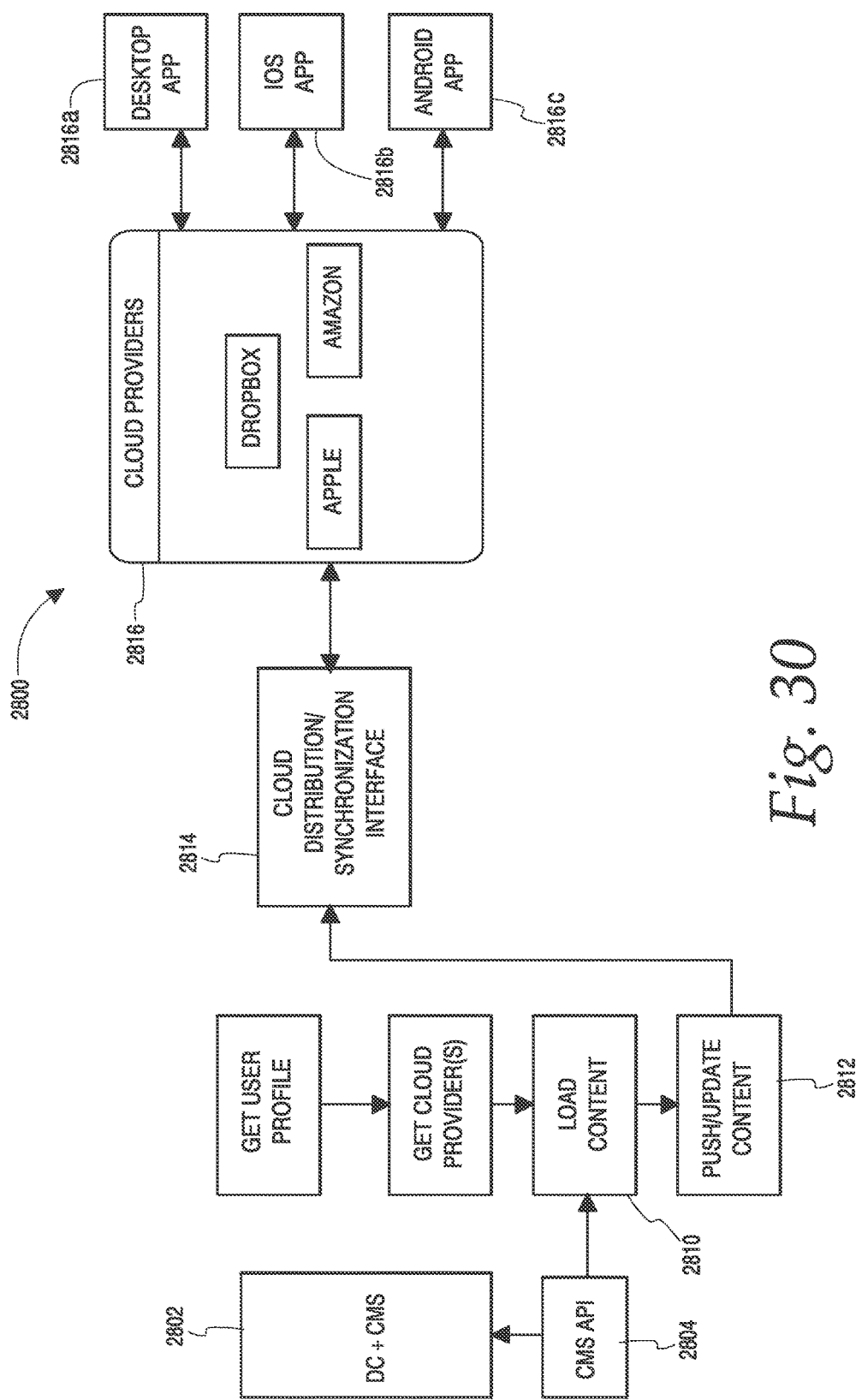
FIG. 30 is a flow chart representing an example process to implement the system of FIG. 27.

FIG. 30 depicts an example process 2800 of making content formats available to user applications for consumption, viewing and/or use. In some examples, structured content is loaded into the system database for storage and user access. The arrival of the structured contents may cause and/or trigger procedures in the Control Database to make the content available to the appropriate user application. In some examples, services in the digital content+Data Access Service processor communicates (block 2802) with the application at the time the application is activated. For example, the digital content processor provides APIs (block 2804) for compatible applications to access and use structured content in real time.

In some examples, formatted content (e.g., pdf format), which may or may not include additional information, is pushed to a recipient using a commercially available cloud storage and synchronization application (e.g., a cloud provider, such as for example, DropBox, Box.net, or iCloud). In some examples, when a user registers for digital content services, the user may be asked to select which cloud provider the user would like to use and, once selected, the user enters the associated login information (e.g., credentials).

After the user registers, a process may begin that reviews the profile of the intended recipient (block 2806) including the selected commercial cloud provider (block 2808), the login credentials, etc. In some examples, the digital content system loads the content (block 2810), pushes content (block 2812) via, for example, a cloud synchronization interface (block 2814) into the user's cloud provider account (block 2716) to enable access using any user registered device (blocks 2816a, 2816b, 2816c).

Figure 31:
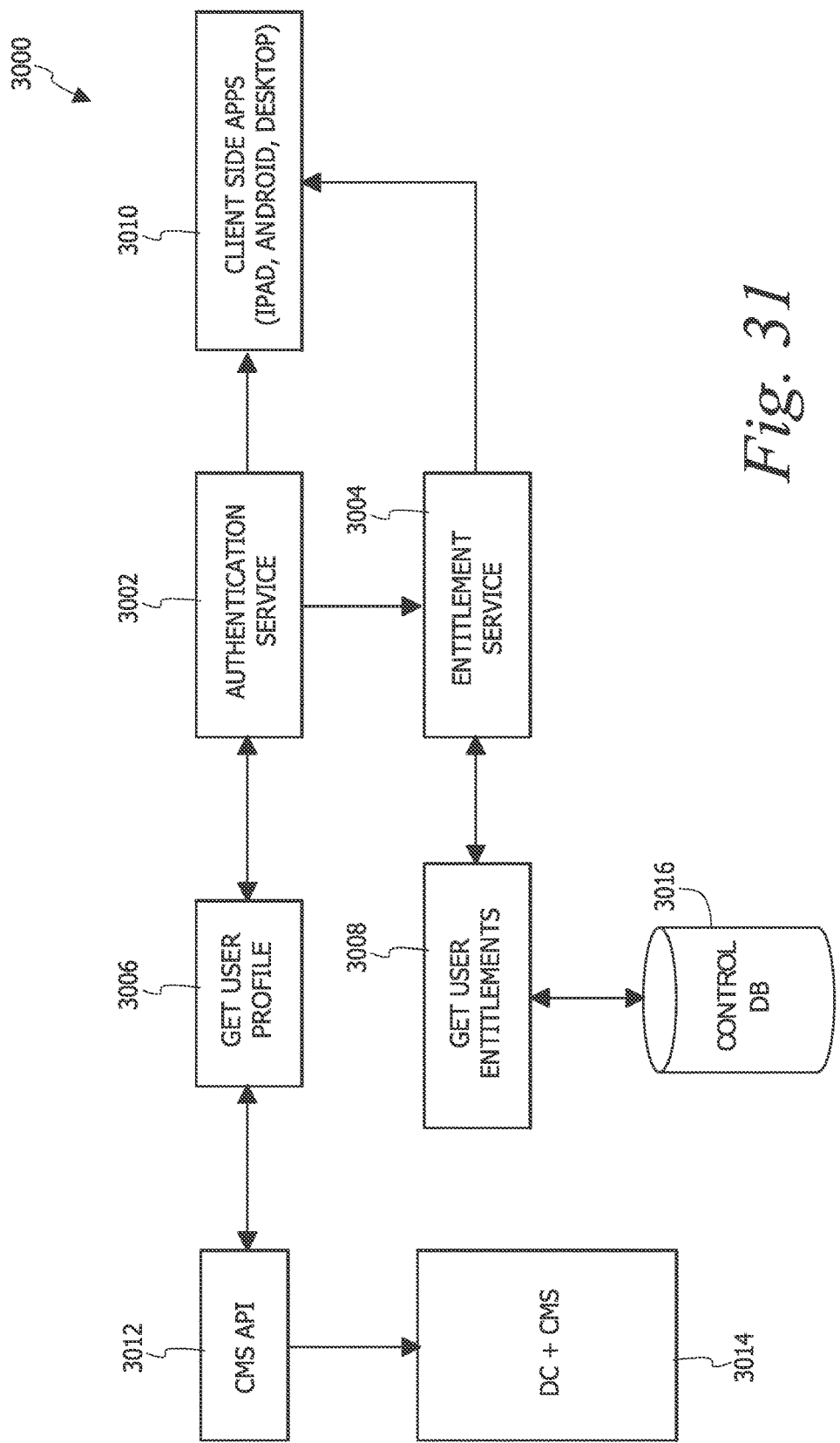
FIG. 31 is a flow chart representing an example process to implement the system of FIG. 27.

FIG. 31 depicts an example process 3000 of managing provisioning content to users to increase security, error recovery and/or forensics. The process 3000 may include authentication and authorization services (3002) and/or entitlement services (block 3004). In some examples, the process 3000 obtains a user's profiled (block 3006) and obtains uses entitlement controls (block 3008) specific to the user's profile to manage access to content at the client side apps (block 3010). The user application web services (block 3010) look for new content when connecting the device registration with the authentication service (block 3002). The authentication service (block 3002) validates the user profile and searches, e.g., via the API (block 3012) for content from the content management system (CMS) (block 3014) that matches the user profile. Matching content is accessible to the user device. Analytics captured on the platform and/or the user's device may be used for reporting and/or when content is accessed (e.g., the application content access activities) may be logged by the entitlement services process, and can be retrieved for reporting or forensics. In some examples, the process 3000 supports invalidation of content and removes it from user accounts and devices. For example, improperly provisioned content can be removed from user access by edits to the entitlement service, eliminating the ability for a user to access invalid content. In some examples, the entitlement service can remove invalid content from the content management system and/or direct the content to be removed from the user's commercial cloud account and from any application-controlled storage area on devices where the content has been stored. In some examples, transportation and storage of data is encrypted. Documents are registered to a specific registered account and can only be opened by a device registered to that user. In some examples, the example process 3000 stores the validation, authorization, and/or entitlement data (block 3016).

Figure 32B:
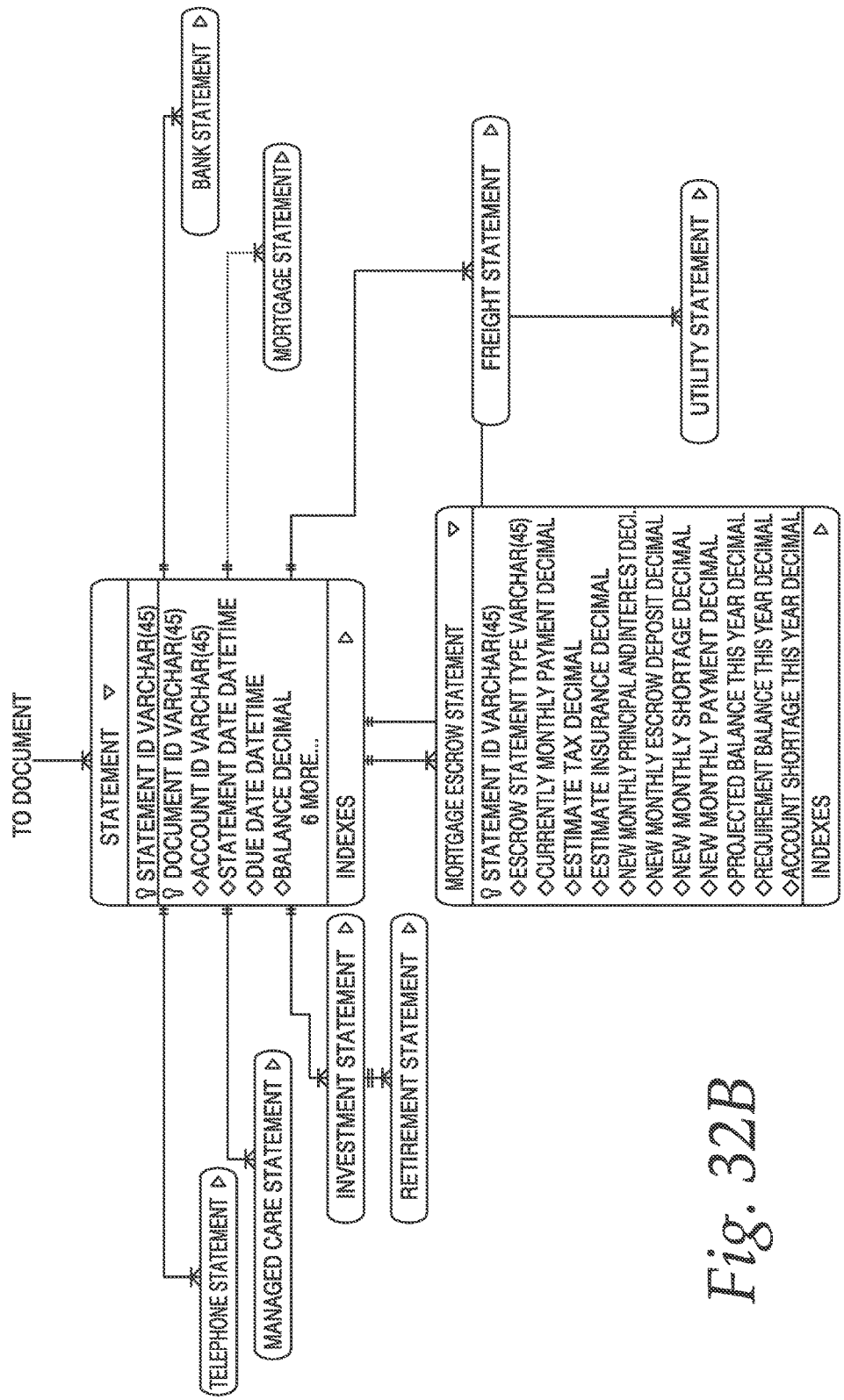
Figure 33A:
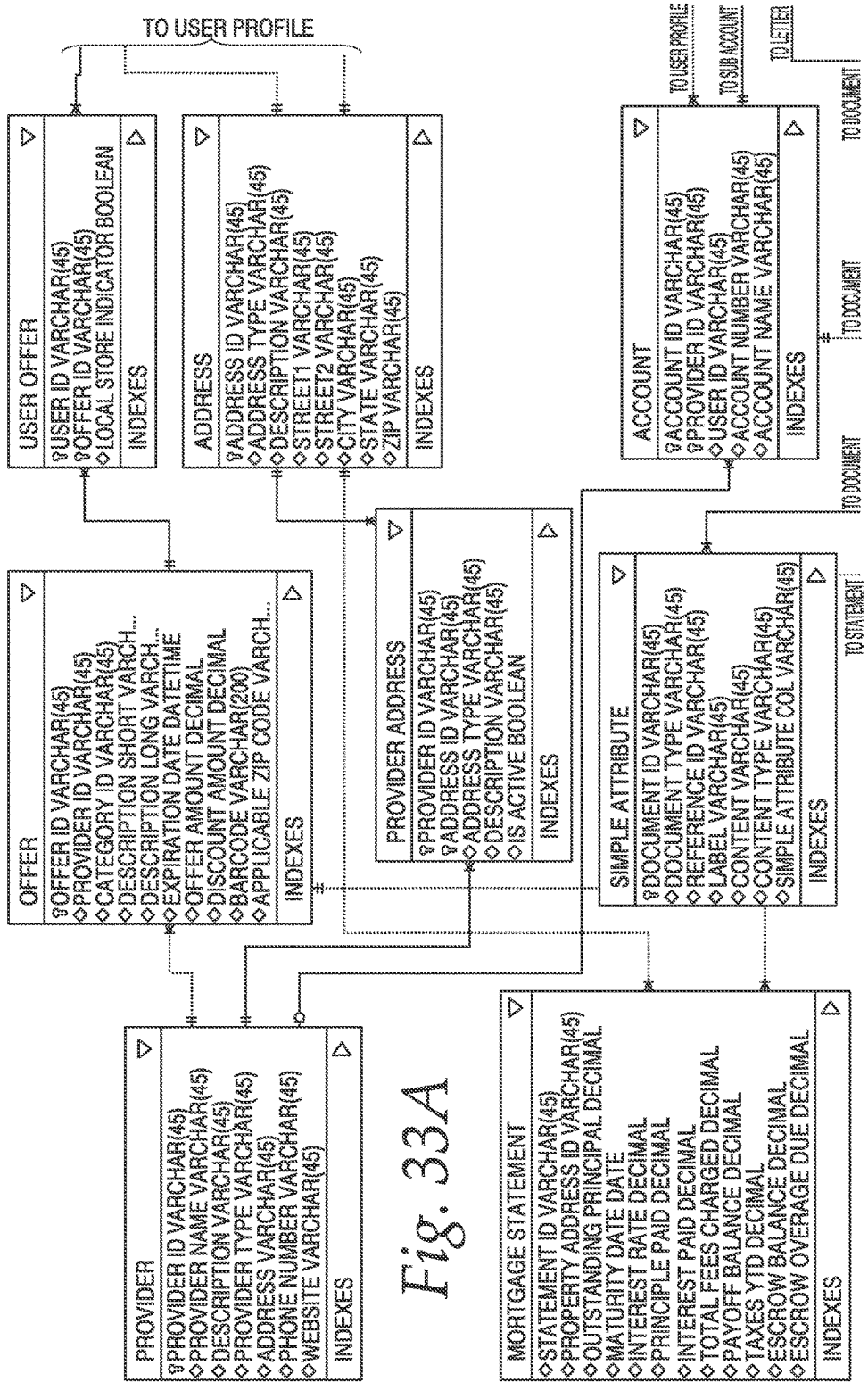
FIGS. 33A-33K are block diagrams of example data structures in accordance with the teachings of this disclosure.
Figure 33B:
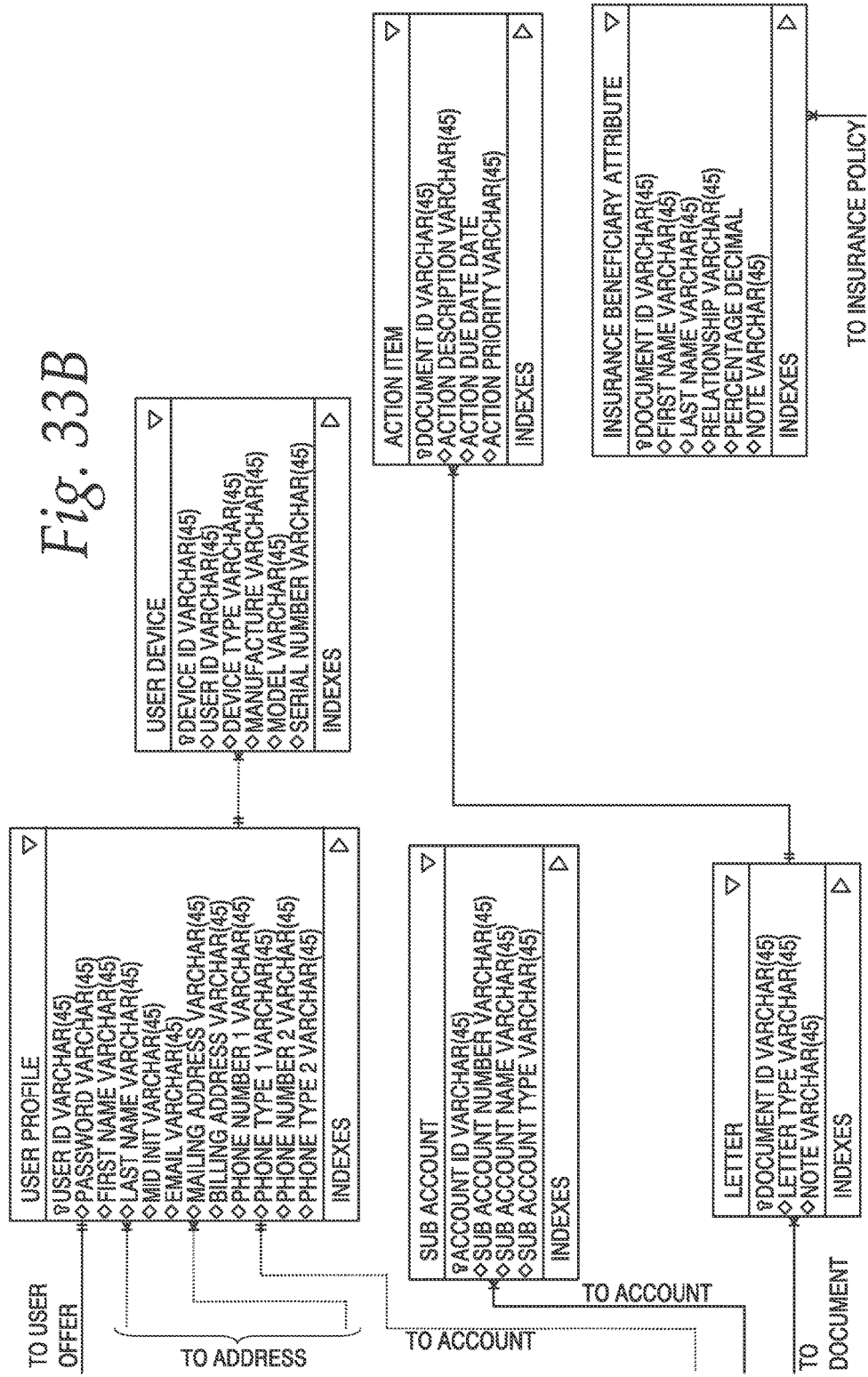
Figure 33C:
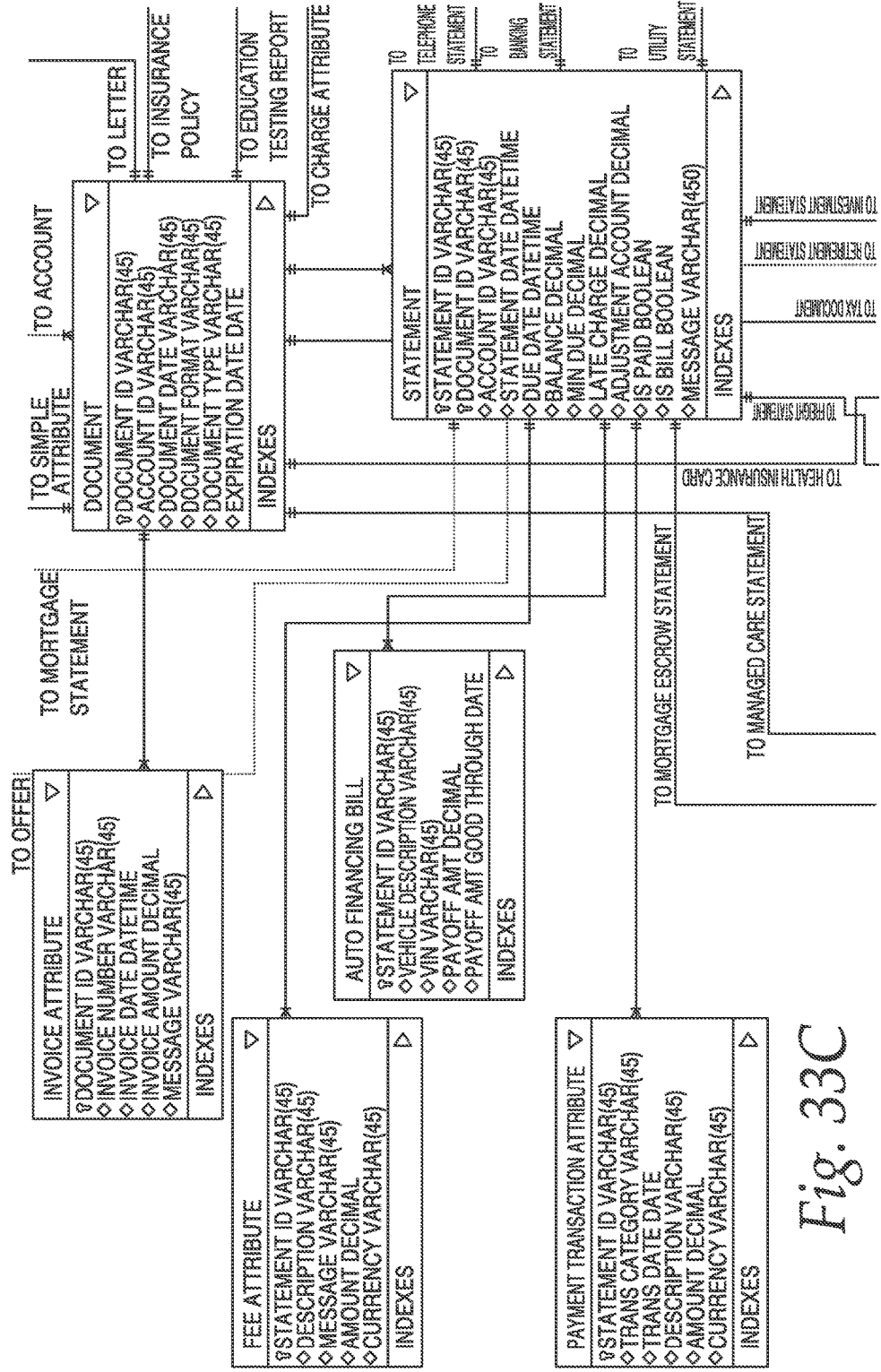
Figure 33D:
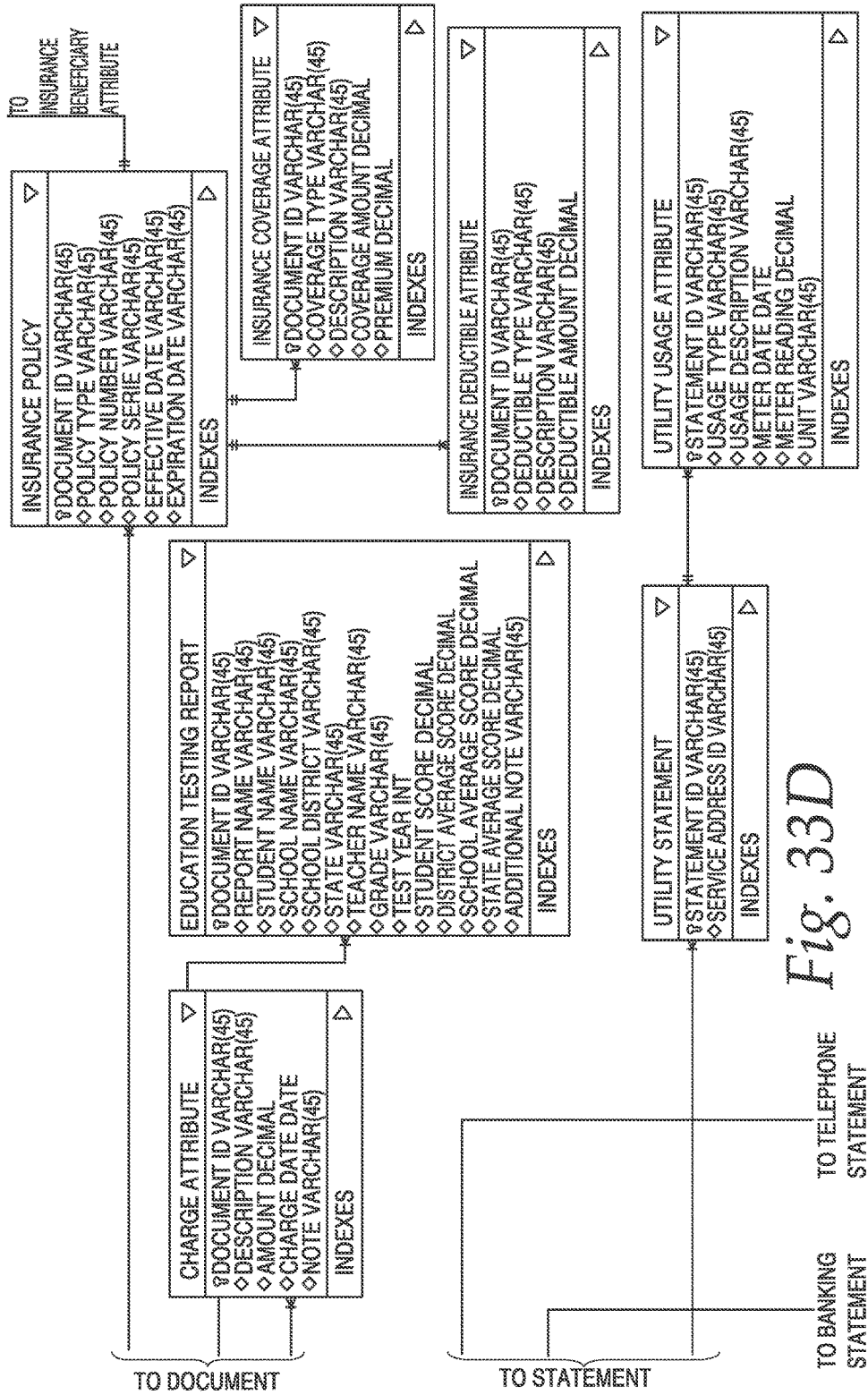
Figure 33E:
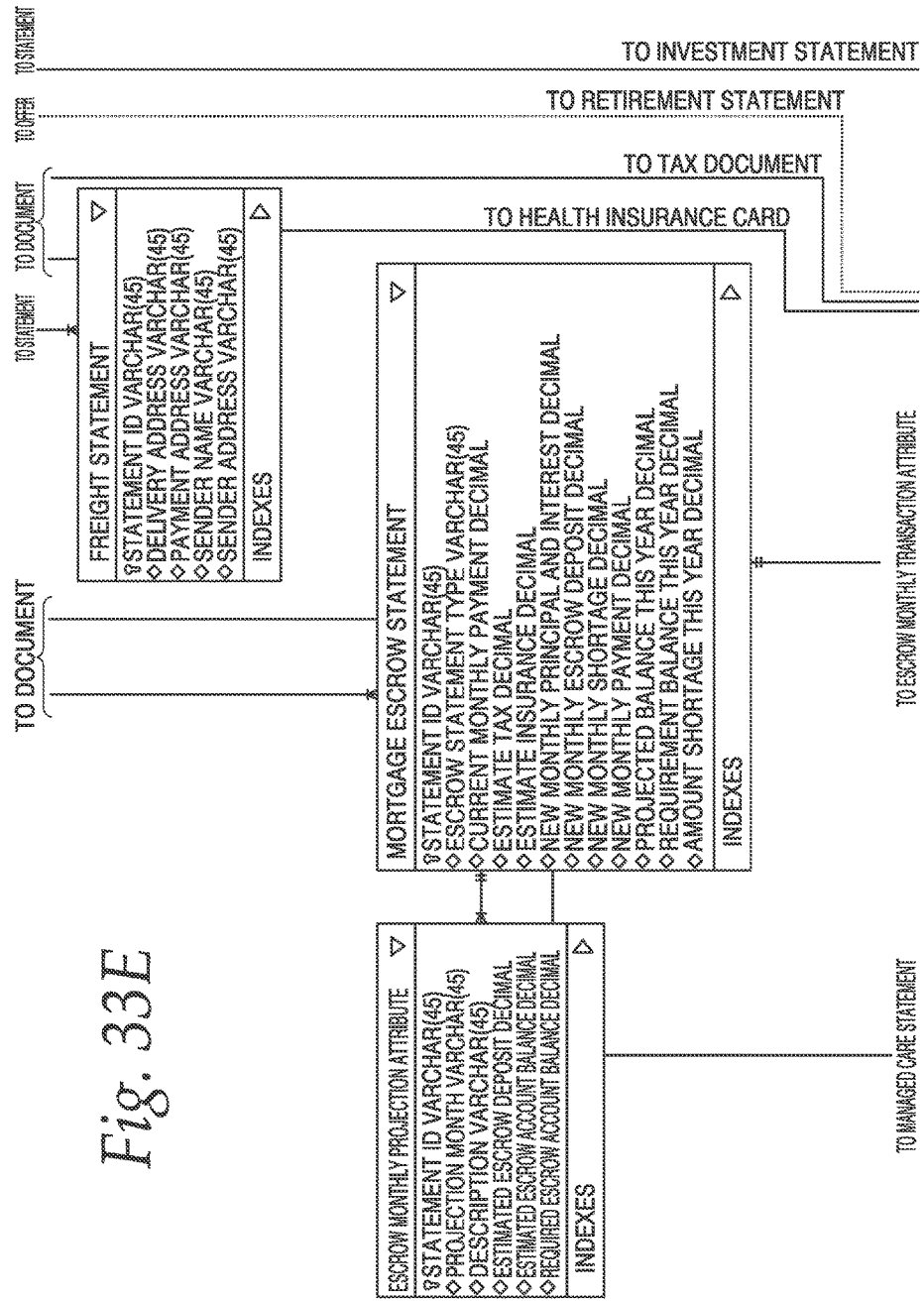
Figure 33F:
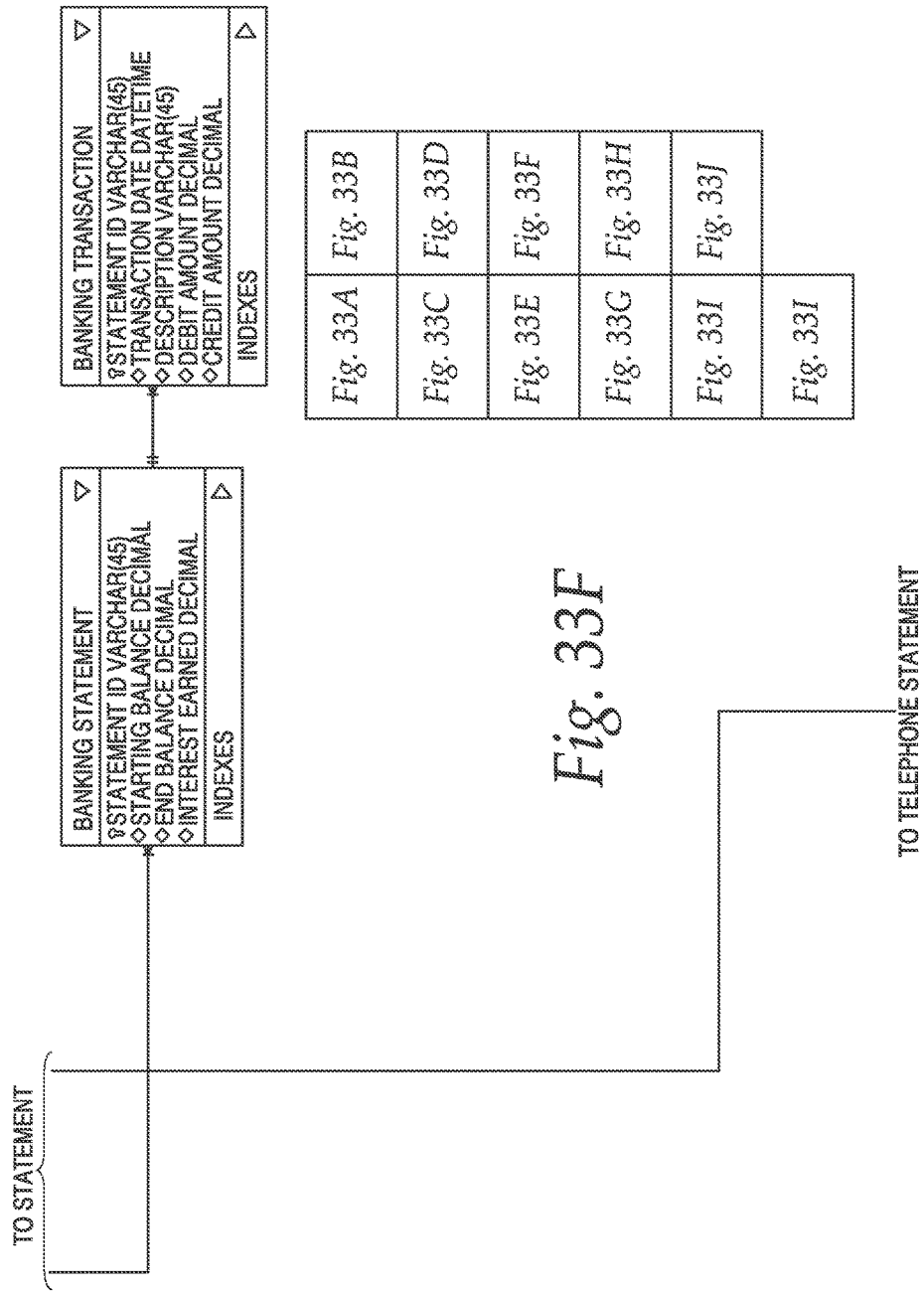
Figure 33G:
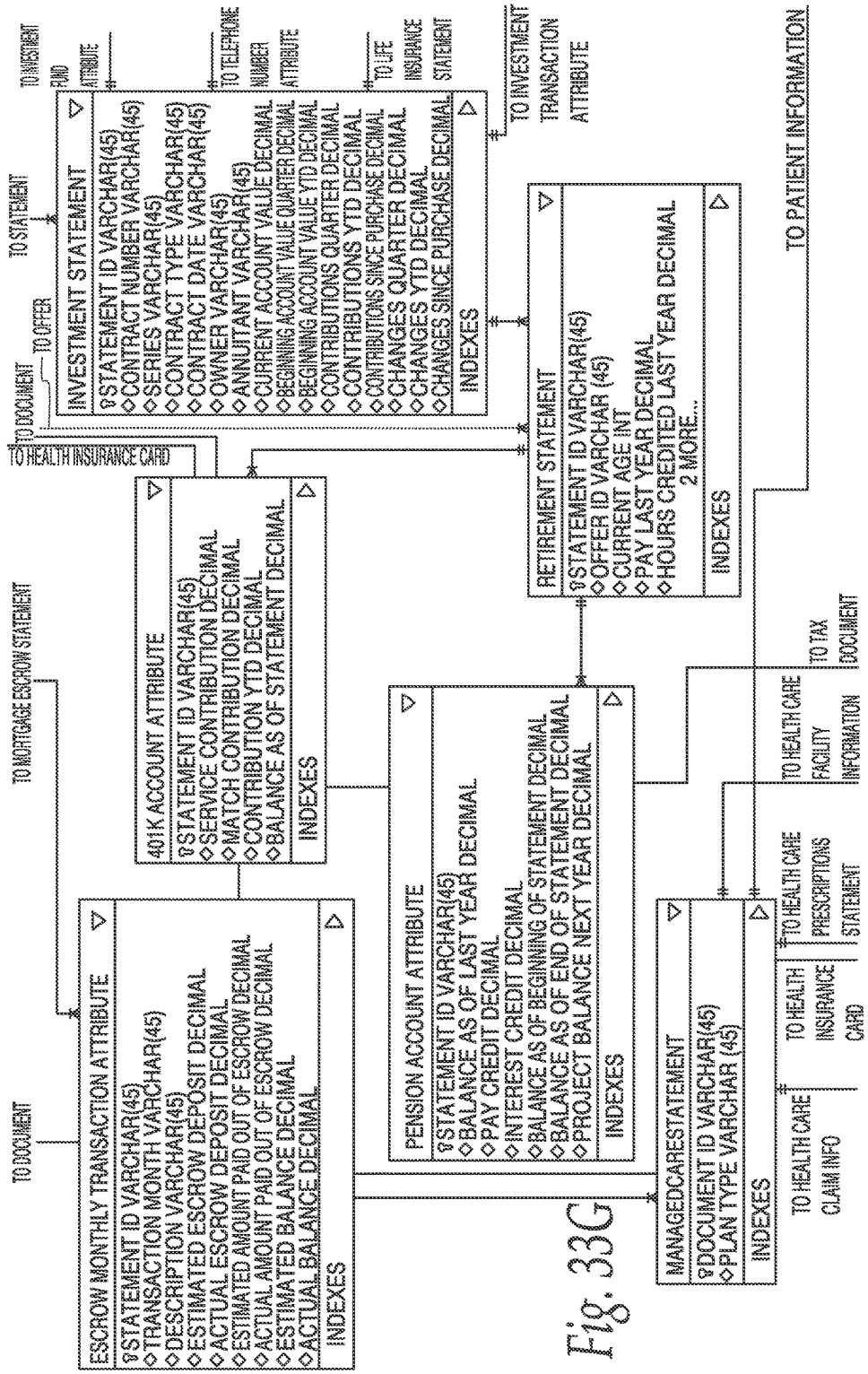
Figure 33H:
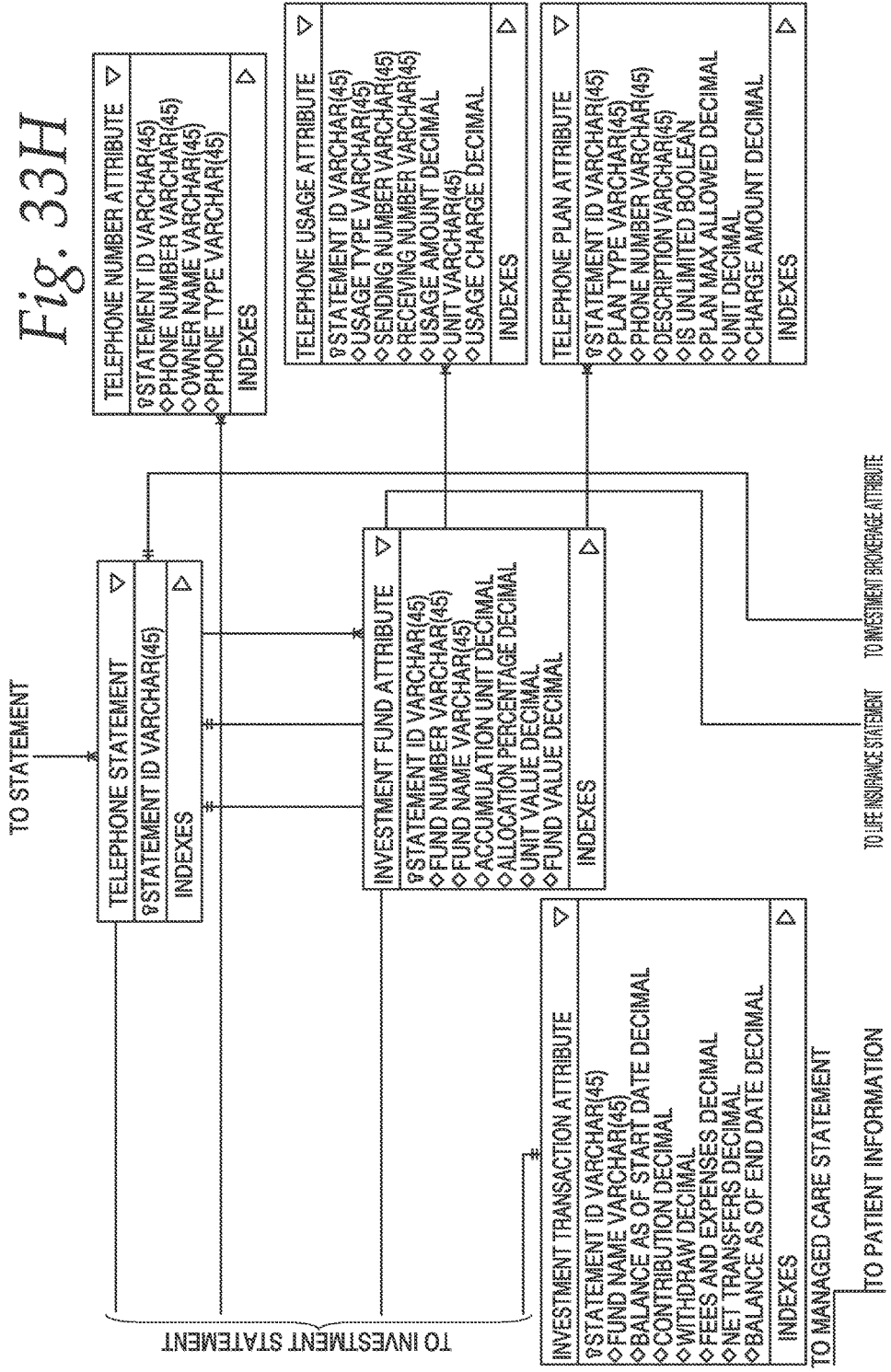
Figure 33I:
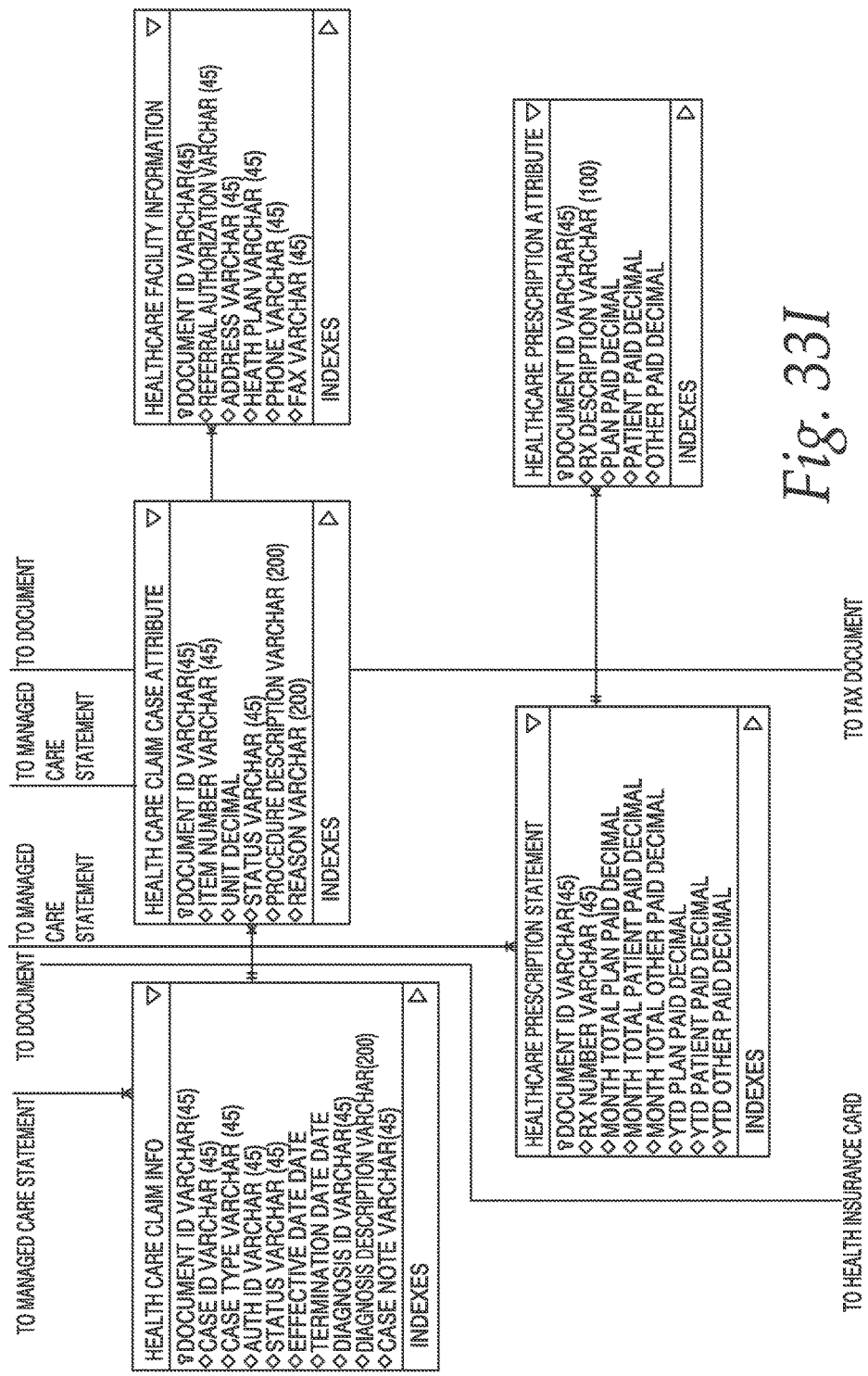
Figure 33J:
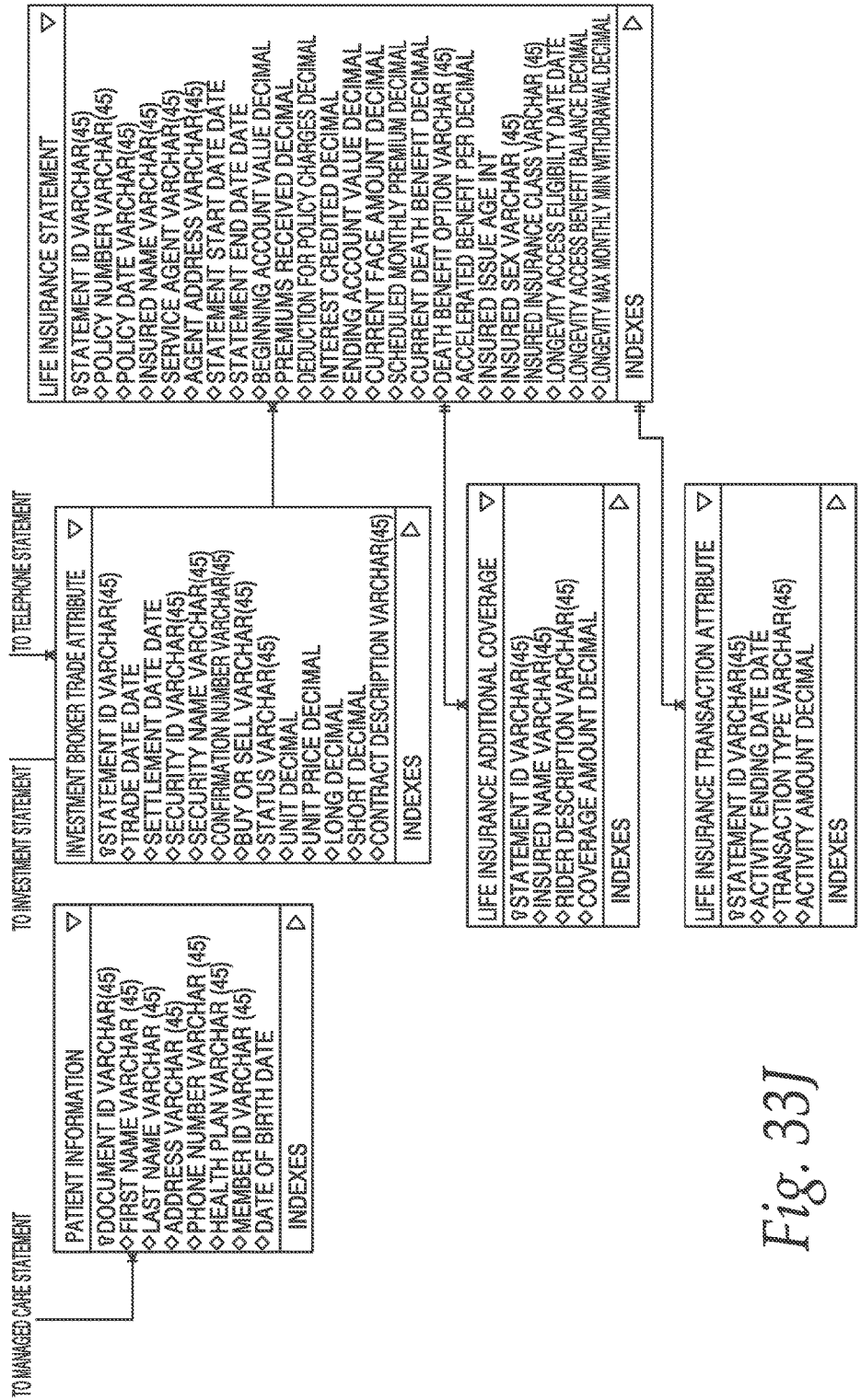
Figure 33K:
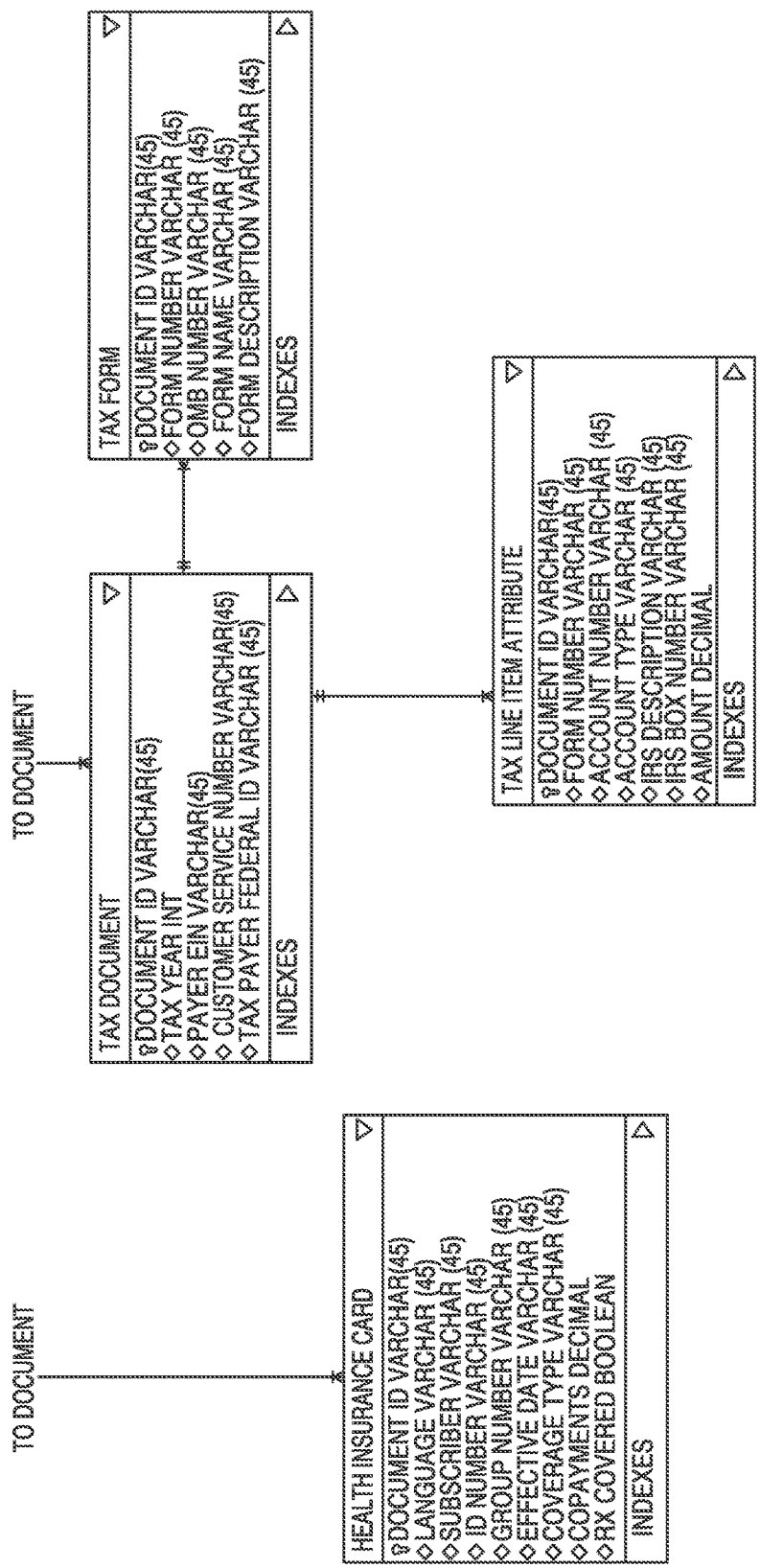

FIGS. 32A and 32B represent an example structure 2850 of mapping example documents such as bills, statement, notices, policies, etc. In some examples, the structure 2850 includes a data format standard that represents the relationship of content to how the content is organized and used electronically. The data structure 2850 may hold and/or store information about content and business rule decisions and maintain relationships between the recipient, sender and/or the data models. For example, the data structure 2850 may be a comprehensive structure that accounts for the types of content represented by physical mail.

In the illustrated examples, the data structure 2850 shows the relationship between the profile of a user of the example digital content delivery systems disclosed herein and the content items represented in the data structure. The example structure 2850 includes a hierarchical model that arranges the original content into an array of tables based on a functional description of the content. This arrangement enables software applications to perform analyses across multiple document types and versions. All content pieces from an original document may be linked via an ID.

In some examples, the data structure 2850 links a user profile ID with the main content header, and thus, to all content elements. In some examples, the profile includes personal information about the user for the purposes of managing authentication as well as linking to and accessing personal content from senders. The data structure 2850 may be updated dynamically with additional content from senders, results of actions taken by the user upon the content, or by processes accomplished in the application. The data structure 2850 can evolve or otherwise be altered based on analysis of additional document types, additional user actions, and/or additional processes from the application.

FIGS. 33A-33K show further details of example structures of mapping example documents such as, for example, bills, statements, notices, policies, recipient information, and source or provider information, etc. FIGS. 33A-K show the interrelation between the provider or source of documents, the recipients and the type of documents. The categorization and classification of source, the recipient, the document type and/or document contents illustrate the complexity of potential tagging schemes that may be used to describe documents and/or document content.

The details and breadth of the possibilities of data interaction also illustrate the potential for advanced data analysis to provide value added content to the recipient, which is content different than what appears on the face of the documents. The data and documents shown in this illustrated example maybe analyzed automatically in accordance with predetermined analysis protocols and/or analyzed at the request of the recipient and in accordance with the instructions from the recipient.

Figure 34:
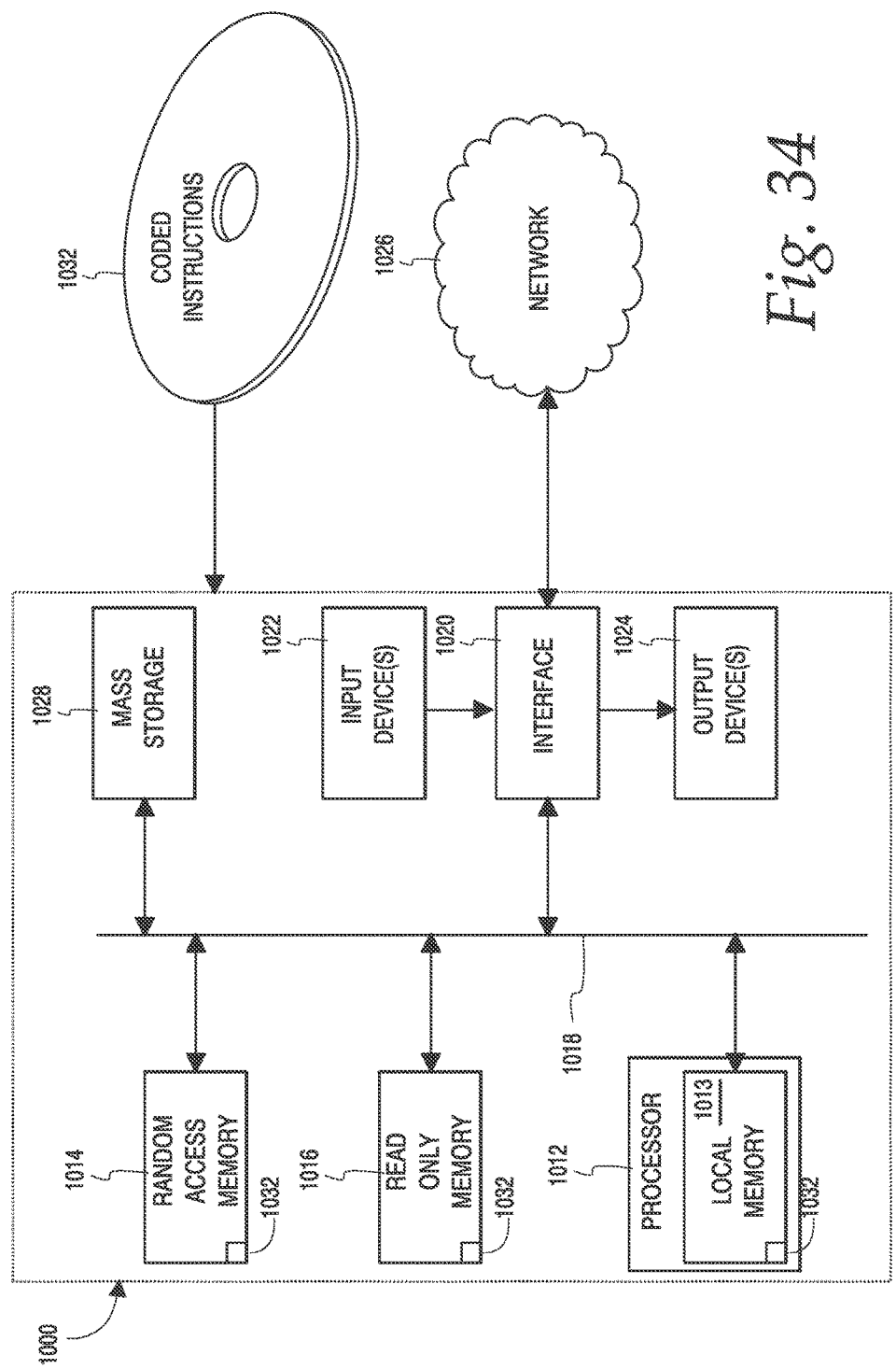
FIG. 34 illustrates an example processor platform that may execute the instructions of any preceding figure to implement any or all of the example methods, systems and/or apparatus disclosed herein.

FIG. 34 is a block diagram of an example processor platform 1000 capable of executing the instructions of FIGS. 20-31 to implement the apparatus or systems of FIGS. 1-19. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The computer 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement the storage devices described herein.

The coded instructions 1032 of the examples disclosed above and in the figures may be stored in the mass storage device 1028, in the volatile memory 1014, in the non-volatile memory 1016, and/or on a removable storage medium such as a CD or DVD.

Those of ordinary skill in the art will appreciate the numerous benefits provided by these disclosed examples. For example, hybrid clouds combine the features of public and private cloud models and integrate the benefits of virtualized architecture internally within an enterprise. In addition, the service delivery infrastructure is expandable and contractible automatically based on capacity needs. The services are architected so that a plurality of recipients shares underlying infrastructure resources, without compromising the privacy and security of any recipient's data. The system operates on-demand. The cloud services are available over the internet and can be consumed as and where needed. There may also be usage-based metering where billing is either based on the usage of computing resources or on a subscription-based model with or without long term contracts.

Also, there are many recipient benefits. The services disclosed here may be directly consumed by the recipient from the user-interface or an API. In addition, the content is more secure than standard email. The content cannot be blocked by a SPAM filter and is invisible to anti-virus software. The recipient may have a single mailbox for all desired communication. There is improved organization of documents with intelligent folder structure. Content resides and is synchronized across all of the recipient's devices. The content is more targeted and relevant. The document-level tagged data enables intelligent storage and search of content. The system provides security of PDF documents with functionality of accessing tagged data for other uses. In addition, there is an availability of accessing and utilizing tagged data rather than simply documents, which enables the recipient greater control over content using plug-in applications.

The examples disclosed herein are user friendly by facilitating user registration and use. For example, in some examples, a user may sign into the application using a sign in page. However, if the user does not have a user name and/or password, the user may register as a new user. In the registration process, the user may enter personal information and/or other information to complete the registration process. In some examples, the user may use an apple ID or other preexisting ID during the registration process.

Users may be presented with legal terms (e.g., terms and conditions) to review and accept to move forward in the application process. Users may select which accounts and/or bills they would like to receive with and/or using the application. The user may select which vendor (e.g., companies offering coupons) they would like to receive offers from, and the user registration process is completed.

In some examples, a user signs into the system using a login and password. The main screen may include recent communications and/or expiring offers. The time frame of the content viewable may be changed by the user depending on user preferences (e.g., a number of days, a number of weeks, etc.). A user may be able to view one or more user account(s) and/or metadata related to the user, his or her providers and/or document details. A user may select a particular account and/or bill, and the document (e.g., in .pdf format) for viewing. After and/or prior to viewing the particular bill or other document, the user may store this document in another area of the device (e.g., lockbox) and/or forward the document by e-mail, for example.

Documents may be stored in a dual key encrypted lock box. The lock box may include user created folders where the documents may be stored. Users may modify how they use the lockbox, their pin, the time out, etc. The user may exit the lockbox while still remaining in the application. Documents may be moved from other areas of the application into the lockbox.

Users may also view bills that are due, pay bills, and view vendor websites. Once paid, the bill may automatically and/or manually be marked as paid. In some examples, the billers (e.g., the utility company) may include videos or other information for user viewing.

User may also access offers (e.g., coupons) that have been sent to the user. The offers are searchable and, by selecting a particular offer, a screen may be opened that is scannable (e.g., bar code, a QR code, etc.) at the point of retail purchase (e.g., from a mobile phone). Offers may also be identified based on the location of the user and/or within a distance of the user's current location (e.g., using GPS functionality of the device).

Users may change the settings of the system. For example, the user may change a time out time, password settings, etc. Users also have access to value added data that does not appear on the face of a document. For example, aggregate amounts that a user owes (e.g., bills) versus what the user is worth (e.g., bank accounts) may be reviewed. The amount due may be updated based on the bills paid, etc. In some examples, alerts may be added to a particular bill indicating that there is a mismatch between a profile address and physical address provided. The user may update the address information using the example application and/or send an updated address to one or more of the providers, etc.

In some examples, VASC data records layout of a document and keeps track of data elements (e.g., name, address, transaction lines, etc.). The examples disclosed herein may extract data from documents by integrating the document, pulling data from the document and then formatting the extracted document into a known and/or standard format (VASC format). The formatted data is then searchable, useable, etc. For example, a bill, .pdf and/or other document may be scanned, identified, tagged, extracted and/or classified in a VASC format. For example, a user can aggregate data, analyze the data, search the data, filter the data, determine trends in the data, etc. In some examples, a third party can perform analytics on the data with or without the user's knowledge. In some examples, information obtained by the third party may be used for targeted mailing campaigns.

In some examples, a customer may provide the content provider (e.g., RR Donnelley) with a file and/or document to be tagged (e.g., data tagging, tagged with metadata). The content provider may extract and classify the tagged data into a useable, searchable, standardized format (e.g., VASC format).

In other examples, a customer (e.g., a tire shop) sends the content provider (e.g., RR Donnelley) a file in which data tags and/or metadata tags have already been added to the document. The content provider may then extract and classify the tagged data into a useable, searchable, standardized format (e.g., VASC format).

In other examples, the customer provides the content provider with metadata (e.g., the VASC data, the tagged data) without other documentation and then the content provider, using a template, incorporates the metadata into the template (e.g., a viewable document) for later use.

Additionally or alternatively, the content provider may extract and classify the tagged data into a useable, searchable, standardized format (e.g., VASC format).

In other examples, the customer provides the content provider (e.g., RR Donnelley) with the VASC data (e.g., metadata, the tagged data) and the content provider uses the VASC data to perform analytics and/or provide content.

In some examples, as disclosed above, the example disclosed herein aggregate information obtained from multiple sources and enables the user to access such information in a standardized format. The aggregated information may include personal information. In some examples, the recipient and/or the user receives the original document in an electronic format in addition to the additional information and/or functionality. In some examples, the data provided (e.g., the original document, additional information, etc.) can be presented in different formats to enhance a user's experience. Compatible plug-ins and/or software and/or applications may use data from an individual document, multiple documents, multiple document types, multiple senders, etc.

In some examples, an example data structure may be used to hold and/or store information relating to content, business rule decisions, relationships between the recipient, the sender and/or the data model. The data model may include data elements such as transactional communications, bills, statements, etc. In some such examples, providers can communicate content using defined but expandable categories to enable the content to be useable for other purposes.

The examples disclosed herein can be used to provide a standard method of categorizing, mapping and/or tagging elements of document content. The content may be associated with communications between a business and a consumer and/or a consumer and another consumer. Such an approach enables cost effective, efficient electronic communications by applications and/or programs. In some examples, the content and/or document elements are converted, tagged and/or mapped to data times to enable the content to be searched, filtered, manipulated, interacted with, etc.

In some examples, a third party, public cloud sync provider and/or data storage can be used to deliver content and enable the content to be synchronized across all user devices (e.g., user devices having the installed software). In some examples, encrypted content is delivered from a content creator (e.g., a provider) to a recipient and/or user using the recipient's public cloud account (e.g., DropBox, iCloud, etc.). Thus, the cloud solution and/or content can be synced across devices and available to the user's devices from a single transmission. In some examples, the cloud sync provider manages the devices different functionalities and/or abilities to locally store and/or synchronize content.

In some examples, the examples disclosed herein can identify individual content elements from a formatted document (e.g., a PDF) or other format (e.g., ASCII text or XML) and tag and/or map the elements according to the associated value. The values may be stored and/or ingested into a database.

In some examples, administrative access can be used to remove content from a user's device and/or the associated cloud account. For example, an expired offer and/or coupon may be removed. In some examples, a status of the content (e.g., accessed, not accessed, secured, not secured) may be monitored and provided and/or reported to the content creator and/or provider. Monitoring the status of content may be used during privacy investigations.

The examples disclosed herein relate to processes and/or applications that access data in the example digital content system and structured data provided by the digital content system. In some examples, a user and/or a device can connect to the digital content platform using APIs to authenticate the user and transfer content back and forth. The examples disclosed may be used with any hardware platform including desktop operating systems (Windows, Mac, etc) as well as mobile platforms (iOS, Android, etc.). The example digital content system interacts with cloud provider services to manage downloading content to local devices and/or view content held and/or stored in the cloud provider's cloud storage. In some examples, the access device (e.g., the user's mobile device) has a secure communication with the digital content platform, including 256 bit encryption. Content is uniquely keyed so that it can only be decrypted by a specifically registered device.

In some examples, a registration process for a user to sign-up and/or subscribe to the digital delivery service includes obtaining personal information to support matching of delivered content (e.g., deliver content associated with an individual to that individual) and/or colleting user's cloud provider credentials to document delivery via commercial cloud provider. In some examples, during the registration process, the user selects the content senders from whom the user wants to receive content digitally and/or select and/or "opt-in" to receive potential offers from marketers that are also registered with the digital content platform. In some examples, new and/or existing content is collected and/or displayed using a dashboard. The content may include bills, statements, policies, offers—for "at-a-glance" review, searchable fields, and/or intelligent searches using content metadata (VASC). In some examples, a user can select to view a formatted document (e.g., PDF, Word, Excel, etc) and/or content-as-data (e.g., content items, VASC data, etc.), to perform analysis, aggregation, and other logic-based functions within a single document's content or across the content from multiple documents.

In some examples, the examples disclosed herein presents content to the user in formats and/or layouts outside of the original document format. In some examples, as disclosed above, the user can perform actions based on the content, such as marking a bill as "paid" or saving custom views and/or sorts, etc. of content. In some examples, publications such as publications from a library may be displayed using the example platform. In some examples, a secure personal lockbox stores content that is uploaded by the user directly into the digital content management system. Additional security may be used and/or required to access this storage area. The example process may support third party plug-ins that conform to published specifications for data access (access to the VASC structure managed by the digital content platform and/or within the enhanced document) and/or presentation of offers for which the user has opted-in to receive.

Different third party cloud sync providers provide different levels of capability and different support via the API. Thus, each third party cloud provider may present specific issues and flexibility needs to optimize operation of the third party cloud provider with the example content delivery system offered by the content provider.

Maximizing use of the third party cloud sync providers without being locked into or otherwise dependent on the third party providers benefits recipients who do not have a sync provider and enable such recipients to use the content delivery system described herein without compelling the consumer to own a sync provider account.

If the example content delivery system offered by the content provider uses, for example, Amazon S3 for its primary storage, then the example system disclosed here is on par with providers like DropBox who also use S3 for storage needs.

In some examples, the content delivery system may utilize Apple iCloud for third party cloud services. The iCloud is walled and enables the different Apple devices of a recipient to sync data with one another. The data originates from one of these devices or is explicitly imported by the recipient into the system. Currently there is not a direct way to connect to the iCloud from an external service and push data into the iCloud without having an Apple device as an intermediary. Thus, the content delivery system operated by the content provider, when operating on an Apple device (such as, for example, an iPad and/or an iPhone), syncs data differently. Any data that the content delivery system accesses for the first time will be from the server. This data is then cached in a folder that is synced to iCloud. The benefit with this approach is that a document that is viewed by the recipient from one device will instantly be available on all other devices. Even if these devices go offline when the recipient wants to use them at a later point in time, those documents that were accessed earlier are instantly available in the offline mode. However, the user will access any new documents online. Thus, any offers and/or documents that become available for the recipient when he or she is offline will not be accessible until such time as the devices are back online.

In some examples, the content delivery system may utilize DropBox for third party cloud services. DropBox enables third party apps like the app for the example content delivery system described herein to access documents and data inside DropBox. DropBox requires the user to explicitly authenticate and authorize with DropBox, which is done via an OAuth 1.0 protocol. In such examples, the example content delivery system redirects the recipient to the DropBox authentication page. The recipient authenticates on the DropBox page with his or her credentials and the page is then dismissed. The recipient indicates via the example content delivery system that he or she has authenticated with DropBox and to go and connect to the DropBox system. The content delivery system then retrieves the authorization token to access DropBox content, which only needs to be done once, and the token can be stored by the content delivery system for further use. The retrieved token is to be stored and managed on the server side to enable for the server to make calls to the DropBox account. In some examples, the examples disclosed herein supports communications to request, receive and store an access token from DropBox. DropBox supports multiple ways of invoking its API. However, for consistency, the REST API and either (JavaScript Object Notation) JSON or XML is used as the message format. Once the access token is received, the DropBox API enables use of the token successively from any server. The host from which the requests are originating is not tracked.

In some examples, the content delivery system may utilize Box for third party cloud services. Box enables third party apps like the app for the example content delivery system disclosed herein to access documents and data inside Box. Box requires the recipient to explicitly authenticate and authorize with Box, which is done via the OAuth 1.0 protocol and is similar to that described in the DropBox section above. Also, Box supports access to API using their REST API with XML as the message format.

In some examples, the content delivery system may utilize Sugar Sync for third party cloud services. Sugar Sync enables third party apps like the app associated with the example content delivery system disclosed herein to access documents and data inside Sugar Sync. Sugar Sync requires the recipient to explicitly authenticate and authorize with Sugar Sync, which also is done via the OAuth 1.0 protocol, and again is similar to that described in the DropBox section above. Furthermore, Sugar Sync supports access to API using their REST API with XML as the message format.

In some examples, the content delivery system may utilize Windows Live Sky Drive for third party cloud services. The Sky Drive API is currently in beta and is not enabled to be used in production or customer facing applications. Sky Drive supports authentication and authorization over OAuth 2.0 and has REST API with JSON as the message format.

In some examples, the content delivery system may utilize Amazon Cloud Drive for third party cloud services. Depending on the configurations of Amazon Cloud Drive, access and interoperability therewith may align with the example provided above.

The example systems disclosed herein also include security and encryption features. In some examples, the details of these features are determined based on business requirement such as, for example, encrypting the content at rest, determine from whom the documents need to be protected, any requirements or idiosyncrasies of the third party cloud provider, the use of keys, who is to receive the key, if duplicate content is to be stored and/or if the content is to be stored internally by the content provider. Also, the server side data is available only to service accounts and operations on the web services are wrapped inside access control rules defined by the system.

In some examples, the example system will use custom authentication where the recipient registers with the content provider and the user ID and password are managed by the content provider. In some examples, open ID authentication is used. In such examples, the system enables recipients with accounts with providers such as Google, Yahoo, and Facebook etc. to use the same credentials to register and authenticate. Thus, there will be one less user ID and password pair to remember for the recipient.

The examples disclosed herein also incorporate a recipient or user profile. The example content provider maintains profile information for each recipient including information such as, for example, attributes like a contact number, a postal address, and other suitable information.

There are other attributes and benefits of the example systems and methods described above. The content provider may link to content and/or a document at the source and does not need to create a copy of the content and/or document. The content generator will make the content and/or documents and related metadata available in a standard format. The content generator operates on the corporate network and the related VPN tunnel is enabled by the security team for the services in the cloud to interact with. There is no need for documents in the lockbox to be available online, nor do the lockbox documents need to be shared with other trusted viewers.

The examples disclosed herein improve customer experience, has a high degree of standardization and reuse, implements a sustainable architecture, has an ease of maintenance and higher service quality, has the ability to run on less technology and drives product innovation.

With respect to the recipient experience and core capabilities surrounding workflow, vault, registration and cloud sync features, the examples disclosed herein deliver a highly flexible front-end that can run on iOS, Android, MAC, and Window Devices while maintaining a consistent user experience across the platform. The example workflows and use cases disclosed herein are unique to how a person set ups his or her profile and determines the type of content he or she would like pushed to his or her mailbox/device. Recipients have control over the user ID and password for encrypting their content. Recipients have control over the type of data they would like access to from the content provider. The examples disclosed herein track and store access violations and transmit communications such as emails and/or alerts if a recipient fails to login successfully after a threshold number of attempts. The examples disclosed herein include logic for using VASC data that are unique. In some examples, the business logic will be represented using Objective C and/or HTML/HTML5.

With respect to iOS and Android SDK's devices, the examples disclosed herein leverage a standard set of software development kits to insure that the content provider is 100% compatible to run on mobile devices and meets regulations of Apple and Android Marketplace for the app operated by the content provider to be placed onto the iTunes and Android marketplace sites. In some examples, Objective-C and iOS 5 SDK's are used for coding the application. These products are provided out of the box for free to developers by Apple. The examples disclosed herein may leverage the Xcode development environment for testing and compiling the applications. In some examples, an Android Application interface and programming logic will use Google's Android API's, and the recipient or user interface may be a mixture of HTML5 and off the shelf components needed to complete the UI experience.

With respect to cloud and security provider APIs, the examples disclosed herein are able to integrate several cloud providers for storing and retrieving application meta-data and digital assets. In some examples, third party products are leveraged such as Cyber-Ark, and Simplified Provisioning for security and access control to the content provider application via the cloud. In some examples, the hub 120 is architected to run on a third party service such as, for example, Amazon's Cloud architecture, and the client user interface will run on Mac, Windows and/or several mobile devices. In some examples, the client application may handle decryption of packages (documents and other assets sent from the hub to the client interface). Also, in some examples, the content provider leverages nothing less than AES 256 Bit encryption on content. Also, in some examples, the content provider allocates about 5-10 MB of local storage on mobile devices for backup, logs and client front-end data elements.

In addition, in some examples, the content provider leverages an agile development approach to developing the example systems and methods disclosed here. This enables flexibility in moving recipient requested features into product bills, for example, and rapidly increasing the number of product enhancements introduced to the market.

With respect to data extraction, conversion, workflow, business rules, and/or notifications, the example systems and methods disclosed herein deliver a detailed set of metadata to support the use cases and VASC requirements of the content provider front-end for statement, bill and/or other document processing services. In some examples, the system leverages in-house tools (of the content provider) for data cleansing and extraction of metadata (such as for example, PowerStream, Solimar, and/or Rubika). In some examples, the content provider stores metadata in a common XML format that is VASC compliant. Also, in some examples, the content provider uses extract, transform and load (ETL) tools to perform data extraction and data conversions. In some examples, the content provider uses a document management system for staging and storing recipient content uploaded into the vault or for use within the content provider. In some examples, content management systems are used to store and encrypt data. In addition, notifications may be transmitted from the document management or content management platform. In some examples, the system(s) and/or method(s) disclosed herein leveraged notification services that can be sent from the Enterprise Services Bus via a web service call. Also, in some examples, products that have functionality for registration, user entitlement, document and content management include Alfresco, Documentum, and/or Apprenda, which may be incorporated into the disclosed systems. In other examples, Acxiom, which is a marketing technology and services company, may be incorporated into the platform for billing and/or data transmission from the content generator to the hub. Also, as noted above, the Amazon Cloud Services may be incorporated herein to leverage Amazon's EC2 and other data services products to deliver data from the hub to the client device. The example content delivery system, in some examples, creates hooks into cloud storage providers to distribute data from the hub to cloud storage providers' infrastructure. Also, in some examples, the example system incorporates a customer service and support structure to support the various client inquiries In some examples, the content and metadata requirements are broadened. This enables the processing of new formats and genres, born-digital content, email archiving, and additional audio, drawing and/or video. Furthermore, additional and more descriptive metadata, linkages to catalogs, books, coupons, affiliates, etc. may be generated and utilized. More sophisticated rights management and/or more access restrictions may be implemented. Also, auxiliary content such as, for example, contextual material, licenses, donor agreements, collection objects, documentation, and/or repository agents may be incorporated herein.

In some examples, the metadata storage database includes objects modeled as related files. File metadata may include, for examples, administrative data (e.g., owners, projects, payment dates, owner IDs, etc.), technical data (e.g., format mime-type and/or format specific data), role purpose and/or quality data, descriptive metadata, access restrictions data (e.g., public, myself-only and/or associations), MD5 file digest and byte count data and/or any other data related to any other attribute of the content, the recipient and/or the system.

Some examples incorporate a consistency validation service that provides, for example, continuous monitoring for file system and database consistency. Such example monitoring services crawls the file system and confirms that every customer/recipient file has an associated metadata record. The example system also may crawl the metadata records table and confirm that every file referenced exists in the file system. In addition, the consistency validation service may confirm that the MD5 checksum for each file is the same as recorded in the database and may report errors to administrators.

In some examples, the delivery and access services incorporate real time web delivery. Images may be delivered as JPEG, JPEG 2000, TIF, GIF or any other suitable format. Streaming delivery service including RealAudio may be available. Also, file delivery as PDFs, WORD files, Excel and/or any suitable format is provided by the example systems. In addition, asynchronous delivery service (hub to client) and archival masters (metadata) are also provided in some examples.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

The invention claimed is:

1. A computer implemented method of providing information, the method comprising the step of:
    causing a non-transitory programmable device to undertake the steps of
        receiving first data from a first data source, wherein the first data include first print commands interpretable by a printer to render a first printed document for an intended recipient;
        receiving second data from a second data source other than the first data source wherein the second data include second print commands interpretable by a printer to cause the printer to render a second printed document different than the first printed document for the intended recipient;
        classifying, using the programmable device, the first and second data with one or more tags associated with the intended recipient;
        in response to the first and second data being classified with the one or more tags, deriving, using the programmable device, third and fourth data from the first and second data, respectively, wherein the third and fourth data represent content information in the first and second documents, respectively;
        deriving fifth data from at least some of the content information represented by the third data and at least some of the content information represented by the fourth data;
        storing the fifth data in a storage device;
        receiving a user request to access data in the storage device;
        verifying that the user request is associated with the intended recipient;
        granting access to the fifth data if the user request is associated with the intended recipient; and
        instructing an output device associated with the user request to output a representation of the fifth data at a location remote from the programmable device and accessible to the intended recipient.

2. The computer implemented method of claim 1, wherein the fifth data is different than both the third data and the fourth data.

3. The computer implemented method of claim 1, wherein the third data comprises a first numeric value, the fourth data comprises a second numeric value, and the step of causing the non-transitory programmable device to undertake the step of deriving the fifth data includes the step of causing the non-transitory programmable device to undertake the step of summing the first numeric value and the second numeric value.

4. The computer implemented method of claim 1, wherein the first data includes identification information associated with the intended recipient.

5. The computer implemented method of claim 4, wherein the step of causing the non-transitory programmable device to undertake the step of determining whether the user request is associated with the intended recipient includes the step of causing the non-transitory programmable device to undertake the step of using the identification information to make such determination.

6. The computer implemented method of claim 4, wherein the identification information includes first identification information, the second data includes second identification information, and the first identification information and the second identification information are substantially identical.

7. The computer implemented method of claim 1, further causing the non-transitory programmable device to undertake the step of incorporating the first data into a template to create a viewable document.

8. The computer implemented method of claim 1, wherein the user request comprises a first user request and the step of causing the non-transitory programmable device to undertake the step of deriving the fifth data includes the step of causing the non-transitory programmable device to undertake the step of deriving the first data in response to receiving a second user request.

9. The computer implemented method of claim 1, wherein the second data is derived in accordance with a profile of the intended recipient.

10. The computer implemented method of claim 1, further causing the non-transitory programmable device to undertake the steps of receiving sixth data from the first document source, deriving seventh data using the sixth data and at least one of third and the fourth data, and instructing the output device to output a representation of the seventh data.

11. The computer implemented method of claim 1, wherein the print commands constitute a page description language.

12. The computer implemented method of claim 11, wherein the page description language is AFP.

13. The computer implemented method of claim 11, wherein the page description language is PDF.

14. A computer implemented method of providing information, the method comprising the step of:
    causing a non-transitory programmable device to undertake the steps of
        receiving first data at a first time, wherein the first data include first print commands interpretable by a printer to render a first printed document for a first intended recipient;
        receiving second data at a second time other than the first time, wherein the second data include second print commands interpretable by a printer to cause the printer to render a second printed document different than the first printed document for a second intended recipient different than the first intended recipient;
        classifying, using the programmable device, the first and second data with first and second tags, respectively, associated with the first and second intended recipients, respectively;
        in response to the first and second data being classified with the first and second tags, deriving, using the programmable device, third and fourth data from the first and second data, respectively, wherein the third and fourth data are different at least in part than the first and second data, respectively, and the third and fourth data represent identification information associated with the first and second intended recipients, respectively, and content information in the first and second documents, respectively;
        storing the third data and the fourth data in a storage device;

receiving a user request to access data in the storage device;

verifying that the user request is associated with the first intended recipient or the second intended recipient;

granting access to the third data if the user request is associated with the first intended recipient;

granting access to the fourth data if the user request is associated with the second intended recipient; and instructing an output device to output a representation of the third or fourth data at a location remote from the programmable device and accessible to the first or second intended recipient, respectively.

15. The computer implemented method of claim 14, wherein the step of causing the non-transitory programmable device to undertake the steps of receiving the first data and receiving the second data includes the step of causing the non-transitory programmable device to undertake the steps of receiving the first data from a first data source and receiving the second data from the first data source, respectively.

16. The computer implemented method of claim 14, further causing the non-transitory programmable device to undertake the step of deriving user identification information from the user request, and wherein the step of causing the non-transitory programmable device to undertake the step of determining whether the user request is from the first intended recipient or the second intended recipient includes the step of causing the non-transitory programmable device to undertake the steps of determining if the user identification information matches the third data or the fourth data, respectively.

17. The computer implemented method of claim 14, further causing the non-transitory programmable device to undertake the steps of receiving fifth data and deriving sixth data from the fifth data and the content information in the second data.

18. The computer implemented method of claim 17, further causing the non-transitory programmable device to undertake the step of outputting a representation of the sixth data if the user request is from the first intended recipient.

19. The computer implemented method of claim 18, wherein the step of causing the non-transitory programmable device to undertake the step of deriving the sixth data includes the step of causing the non-transitory programmable device to undertake the step of deriving the sixth data in response to receipt of a further user request.

20. The computer implemented method of claim 19, wherein the third data includes a first numeric value, the fifth data includes a second numeric value, and the step of causing the non-transitory programmable device to undertake the step of deriving the sixth value includes the step of causing the non-transitory programmable device to sum the first numeric value and the second numeric value.

21. The computer implemented method of claim 19, further causing the non-transitory programmable device to undertake the step of incorporating the first data into a template to create a viewable document.

22. The computer implemented method of claim 14, further causing the non-transitory programmable device to undertake the step of receiving fifth data at a third time that is associated with a profile of the first intended recipient.

23. The computer implemented method of claim 22, wherein the step of causing the non-transitory programmable device to undertake the steps of receiving the first data and receiving the fifth data includes the step of causing the non-transitory programmable device to undertake the steps of receiving the first data from a first source and receiving the fifth data from a second source, respectively, wherein the first source and the second source are different.

24. The computer implemented method of claim 14, wherein the print commands constitute a page description language.

25. The computer implemented method of claim 24, wherein the page description language is AFP.

26. The computer implemented method of claim 24, wherein the page description language is PDF.

* * * * *

UNITED STATES PATENT AND TRADEMARK OFFICE
CERTIFICATE OF CORRECTION

| | | |
|---|---|---|
| PATENT NO. | : 10,043,022 B2 | Page 1 of 1 |
| APPLICATION NO. | : 13/786087 | |
| DATED | : August 7, 2018 | |
| INVENTOR(S) | : Anthony J. Reedy et al. | |

It is certified that error appears in the above-identified patent and that said Letters Patent is hereby corrected as shown below:

In the Claims

In Claim 8, Line 6, "the first data" should read -- the fifth data --.

In Claim 14, Line 32, "data-in" should read -- data in --.

Signed and Sealed this
Ninth Day of October, 2018

Andrei Iancu
*Director of the United States Patent and Trademark Office*